(12) United States Patent
Suzuki

(10) Patent No.: US 8,503,770 B2
(45) Date of Patent: Aug. 6, 2013

(54) INFORMATION PROCESSING APPARATUS AND METHOD, AND PROGRAM

(75) Inventor: Hirotaka Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 12/763,253

(22) Filed: Apr. 20, 2010

(65) Prior Publication Data

US 2010/0278419 A1 Nov. 4, 2010

(30) Foreign Application Priority Data

Apr. 30, 2009 (JP) ................................ P2009-110292

(51) Int. Cl.
*G06K 9/00* (2006.01)

(52) U.S. Cl.
USPC .......................................... 382/160; 382/190

(58) Field of Classification Search
USPC ........................... 382/156–160, 180, 190, 228
See application file for complete search history.

(56) References Cited

U.S. PATENT DOCUMENTS

| 7,657,836 B2 * | 2/2010 | Pan et al. ...................... 715/723 |
| 2005/0125223 A1 | 6/2005 | Divakaran | |

FOREIGN PATENT DOCUMENTS

| JP | 2000-299829 | 10/2000 |
| JP | 2005-189832 | 7/2005 |
| JP | 2008-185626 | 8/2008 |

OTHER PUBLICATIONS

Dai, et al. "Replay scene classification in soccer video using web broadcast text", IEEE, pp. 1-4, 2005.*

L. Xie, et al., "Learning Hierarchical Hidden Markov Models for Video Structure Discovery" Advent Technical Report, 2002-006, Columbia University.

Stefan Ruger, et al., "Putting the User in the Loop: Visual Resource Discovery", Jan. 1, 2006, Adaptive Multimedia Retrieval, pp. 1-18.

R. Leonardi et al., "Semantic Indexing of Soccer Audio-Visual Sequences: A Multimodal Approach Based on Controlled Markov Chains", IEEE transactions on Circuits and Systems for Video Technology, vol. 14, No. 5, May 1, 2004, pp. 634-643.

J. Assfalg et al., "Soccer Highlights Detection and Recognition Using HMMs Multimedia and Expo", IEEE International Conference on Lausanne, Switzerland, 26-29, Aug. 2002, pp. 825-828.

J C. Van Gemert, et al., "Robust Scene Categorization by Learning Image Statistics in Context" computer Vision and Pattern Recognition Workshop, 2006 Conference on New York, pp. 105-105.

Torralba, et al., "Context-based vision system for place and object recognition", IEEE Int. Conf. Computer Vision, vol. 1, No. 1, pp. 1-8, (2003).

Otsu, et al., "A New Scheme for Practical Flexible and Intelligent Vision System", Proc. IAPR Workshop on Computer Vision, pp. 431-435, (1988).

(Continued)

*Primary Examiner* — Daniel Mariam
(74) *Attorney, Agent, or Firm* — Finnegan, Henderson, Farabow, Garrett & Dunner, L.L.P.

(57) ABSTRACT

An information processing apparatus includes a feature amount extraction unit extracting a feature amount of each frame of an image, a maximum likelihood state series estimation unit estimating maximum likelihood state series using the feature amount, a highlight label generation unit generating highlight label series with respect to the attention detector learning content, and a learning unit learning the highlight detector that is the state transition probability model using learning label series that is a pair of the maximum likelihood state series obtained from the attention detector learning content and the highlight label series.

20 Claims, 55 Drawing Sheets

OTHER PUBLICATIONS

Ojala, et al., "Multiresolution Gray-Scale and Rotation Invariant Texture Classification with Local Binary Patterns", IEEE Transactions on Pattern Analysis and Machine Intelligence, vol. 24, No. 7, pp. 971-987, (Jul. 2002).

Liu, et al., "Audio Feature Extraction and Analysis for Scene Segmentation and Classification", First Workshop on Multimedia Signal Processing, IEEE Volume, Issue, pp. 1-39, (Jun. 1997).

Brezeale, et al., "Automatic Video Classification: A Survey of the Literature", IEEE Transactions on Systems, Man and Cybernetics—Part C: Applications and Reviews, vol. 38, No. 3, pp. 416-430, (May 2008).

Tamura et al; "Multi-Modal Speech Recognition Using Optical-Flow Analysis for Lip Images"; Journal of VLSI Signal Processing 36, 117-124, 2004; Kluwer Academic Publishers.

* cited by examiner

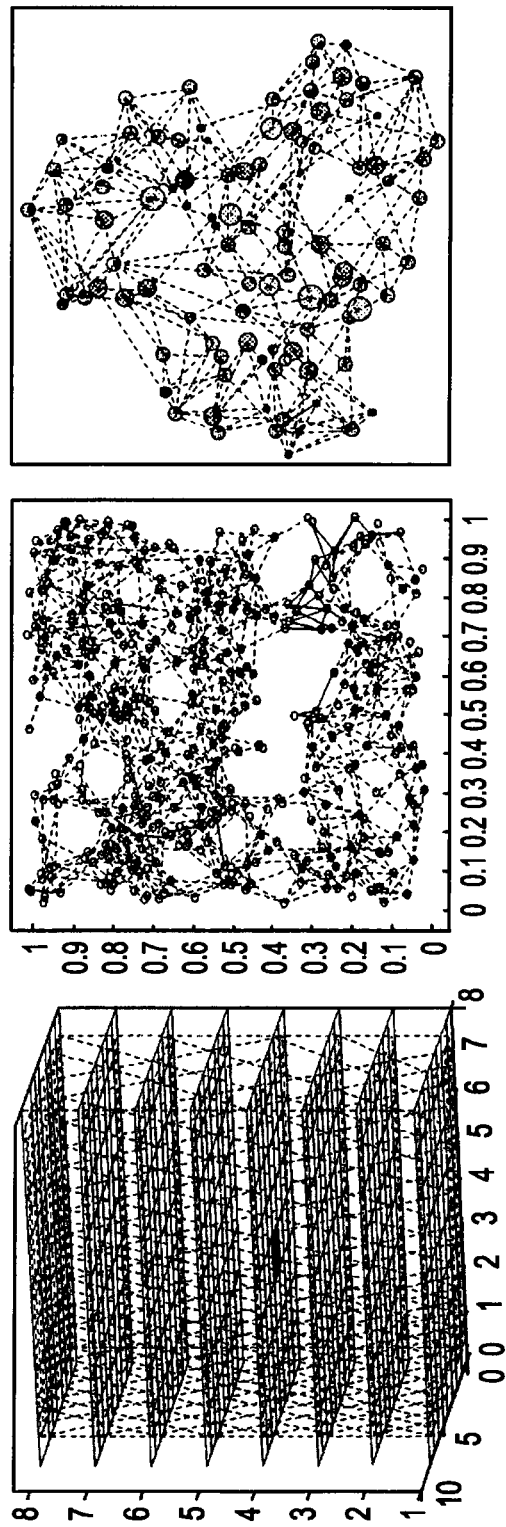

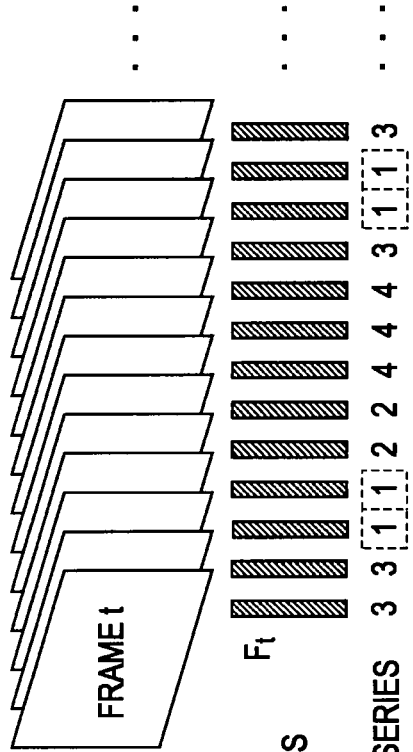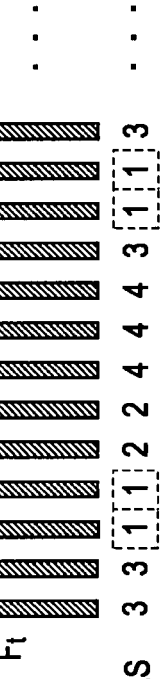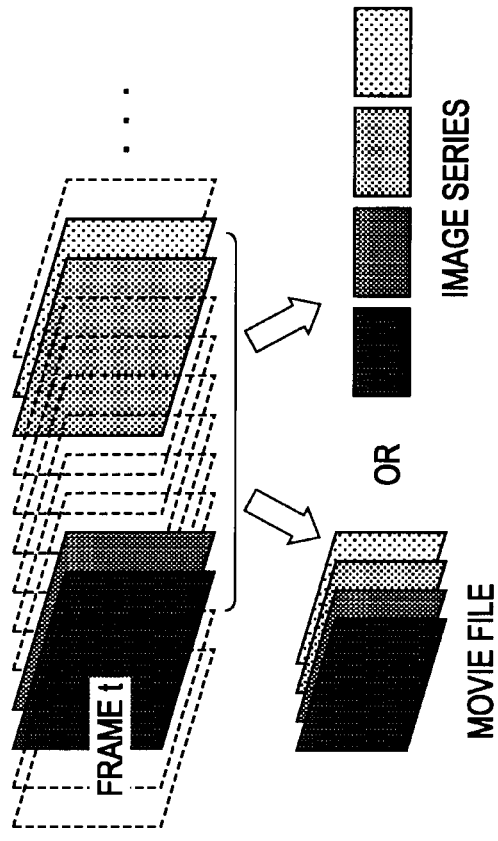
FIG. 10A  IMAGE DATA
FIG. 10B  FEATURE AMOUNT TIME SERIES
FIG. 10C  MAXIMUM LIKELIHOOD STATE SERIES
FIG. 10D  GENERATION OF STATE CORRESPONDENCE IMAGE INFORMATION FIG. 19A
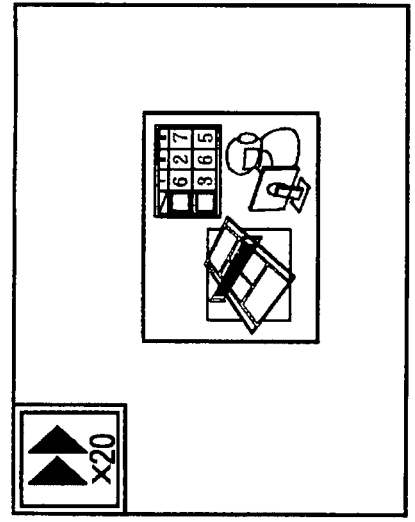
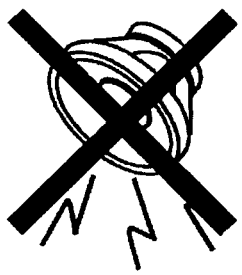
IN HIGHLIGHT PART
WITH FULL SIZE
ADD MUSIC
TYPICAL PLAYBACK SPEED
FIG. 19B
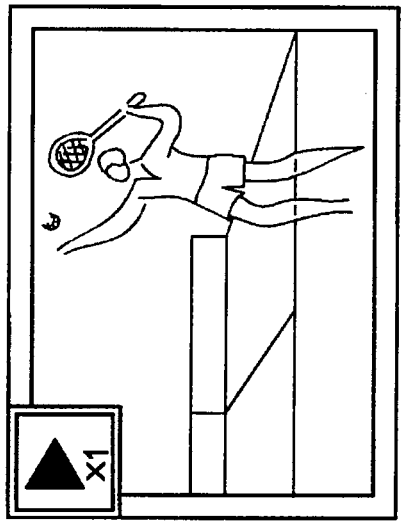
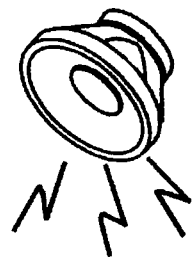
IN NON-HIGHLIGHT PART
WITH REDUCED SIZE (50% REDUCTION)
NO-SOUND
RAPID PLAYBACK (20-TIMES PLAYBACK)

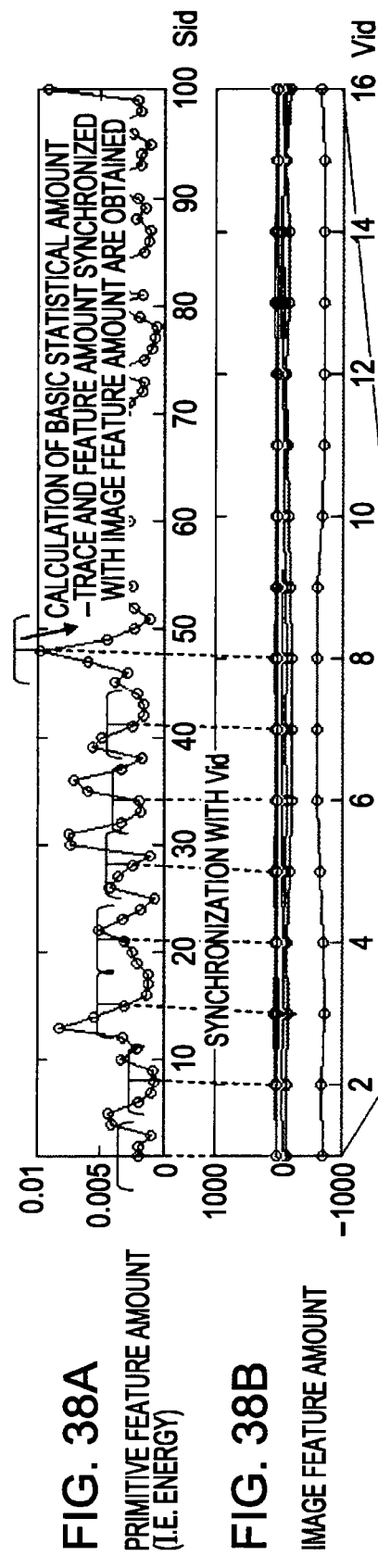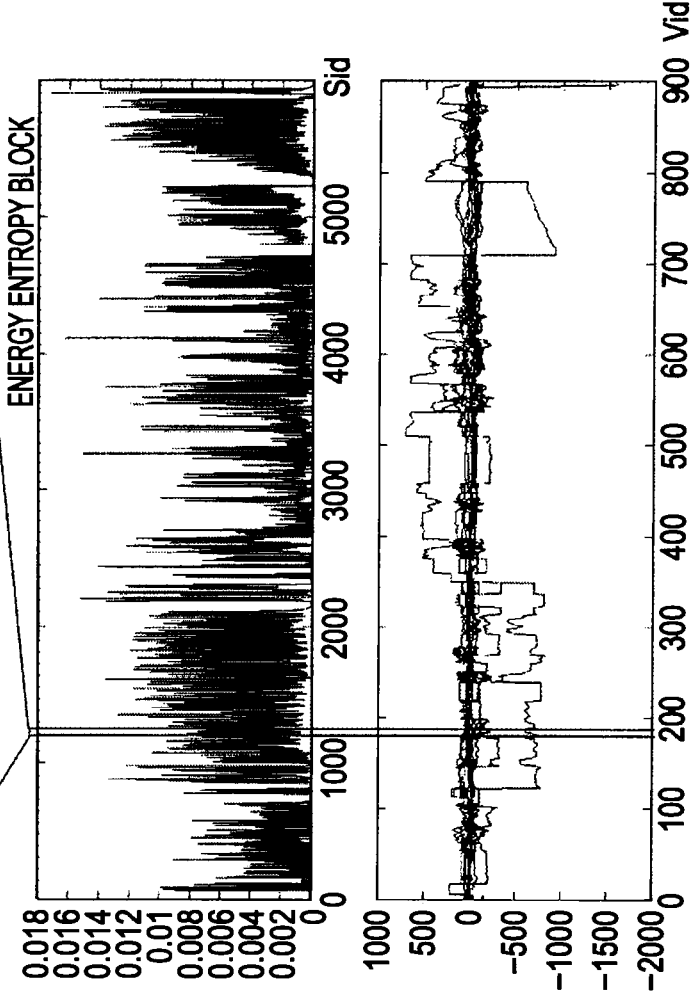
FIG. 38A
PRIMITIVE FEATURE AMOUNT
(I.E. ENERGY)
FIG. 38B
IMAGE FEATURE AMOUNT
FIG. 38C
PRIMITIVE FEATURE AMOUNT
(ENERGY fq_s=20 Hz)
FIG. 38D
IMAGE FEATURE AMOUNT
(GIST) fq_v=3 Hz

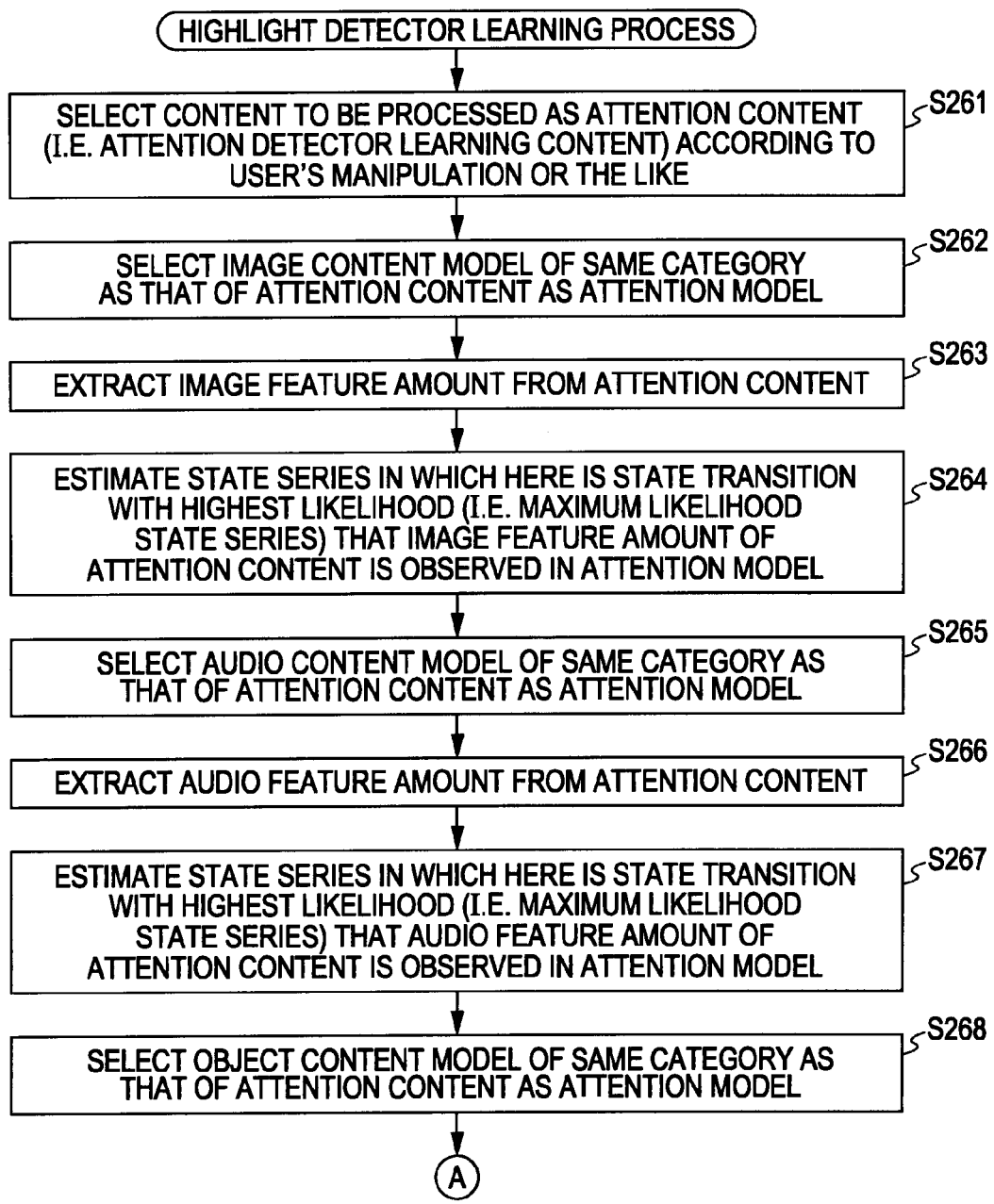

| FIG. 46A |
| FIG. 46B |

| FIG. 48A | FIG. 48B |

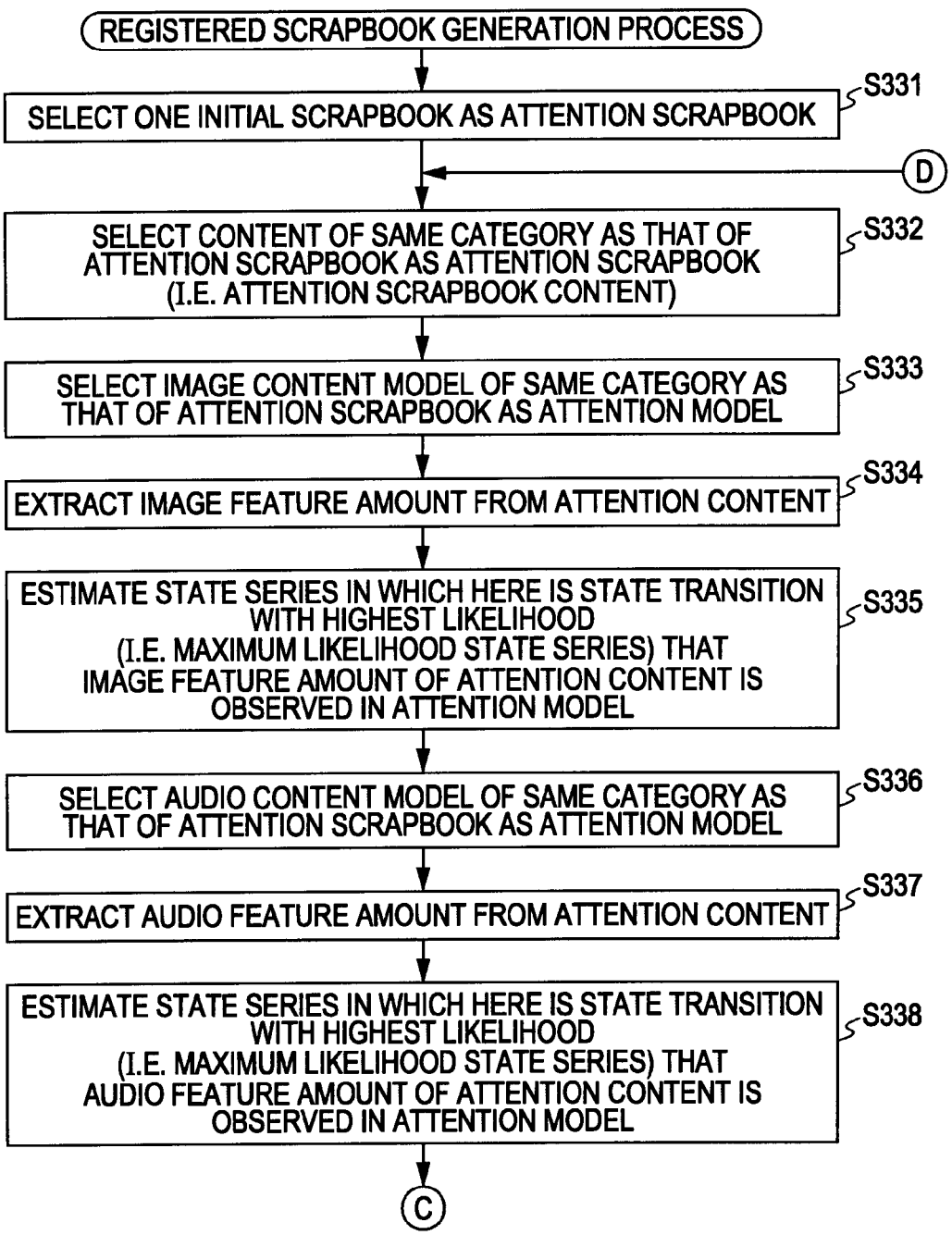

INFORMATION PROCESSING APPARATUS AND METHOD, AND PROGRAM

BACKGROUND OF THE INVENTION

1. Field of the Invention

The present invention relates to an information processing apparatus and method, and a program. In particular, the present invention relates to an information processing apparatus and method, and a program which make it possible to easily obtain a digest in which, for example, scenes that are of interest for a user are collected as highlight scenes.

2. Description of the Related Art

As highlight scene detection technology for detecting highlight scenes, for example, from content, such as movie, television broadcasting programs, or the like, there are technology using the experience or knowledge of experts (or designers) experience or knowledge, technology using statistical learning using learning samples, and the like.

In the technology using the experience or knowledge of experts, a detector for detecting event that occurs in a highlight scene and a detector for detecting a scene (i.e. a scene that generates event) defined from the event are designed on the basis of the experience or knowledge of experts. Also, the highlight scene is detected using the detectors.

In the technology using the statistical learning using learning samples, a detector for detecting a highlight scene (i.e. highlight detector) and a detector for detecting an event that occurs in the highlight scene (i.e. event detector) are obtained using the learning samples. Also, the highlight scene is detected using the detectors.

Also, in the highlight scene detection technology, the feature amount of video or audio of content is extracted, and the highlight scene is detected using the feature amount. As the feature amount for detecting the highlight scene as described above, the feature amount is generally used which is specialized to a genre of content from which a highlight scene is to be detected.

For example, in the highlight scene detection technology, such as "Wang", "Dua", or the like, the high-order feature amount for detecting event "whistle", "applause", or the like, is extracted from a soccer game video using a soccer field line, a soccer ball trace, movement of the whole screen, MFCC (Mel-Frequency Cepstrum Coefficient), or the like, and detection of a soccer play scene, such as an attack, a foul, or the like, is performed using the feature amount obtained by combining the extracted feature amounts.

For example, "Wang" has proposed a highlight scene detection technology in which a view-type classifier using the color histogram feature amount, a play location identifier using a line detector, a replay logo detector, an announcer excitability detector, a whistle detector, or the like, is designed from video of a soccer game, and a soccer highlight detector is configured by modeling the temporal before-after relations among them by a Bayesian network.

In addition, as the highlight scene detection technology, a technology of detecting a highlight scene of content using a feature amount that specifies a high tone (a shout of joy) sound has been proposed in Japanese Unexamined Patent Application Publication No. 2008-185626.

According to the above-described highlight scene detection technology, the highlight scene (or event) can be detected with respect to the content of a specified genre, but it is difficult to detect a proper scene as the highlight scene with respect to the content of other genres.

For example, according to the highlight scene detection technology described in Japanese Unexamined Patent Application Publication No. 2008-185626, the highlight scene is detected under a rule that a scene with shouts of joy is considered as the highlight scene, but the genre of the content in which the scene with shouts of joy becomes the highlight scene is limited. Also, in the highlight scene detection technology described in Japanese Unexamined Patent Application Publication No. 2008-185626, it is difficult to detect the highlight scene with respect to the content of a genre in which a scene with no shouts of joy becomes the highlight scene.

Accordingly, in order to perform the highlight scene detection with respect to the content of a genre except for a specified genre using the highlight scene detection technology described in Japanese Unexamined Patent Application Publication No. 2008-185626, it may be necessary to design a feature amount suitable for the genre. Further, it is necessary to perform the rule design for the detection of the highlight scene (or definition of the event) using the feature amount on the basis of an interview with experts.

For example, in Japanese Unexamined Patent Application Publication No. 2000-299829, a method of detecting a highlight scene by designing the feature amount and a threshold value that can be used to detect a scene that generally becomes the highlight scene and performing a threshold value process using the feature amount and the threshold value has been proposed.

However, as the content has recently been diversified, it is very difficult to obtain a general rule, such as a rule for processing the feature amount or the threshold value, for detecting proper scenes as highlight scenes with respect to all the content.

Accordingly, in order to detect a proper scene as the highlight scene, it may be necessary to design the feature amount and the rule for detecting the highlight scene suitable for each genre. Even in the case of designing such a rule, it is still difficult to detect an exceptional highlight scene, which for example may be an exception to the rule.

SUMMARY OF THE INVENTION

With respect to a scene that is generally called a highlight scene in content such as a sports game, for example, a goal scene in a soccer game, it is possible to design a rule for detecting the scene at high accuracy using the knowledge of experts.

However, users have diverse tastes and preferences. For example, users may be fond of "a scene of a manager being shown on the bench", "a scene of a runner picked off from the first base in baseball game", "a scene of questioning and answering in a quiz game", or the like. In this case, it is not realistic for the respective users to individually design rules suitable for their respective tastes and adopt such rules in detection systems such as audio visual (AV) appliances detecting highlight scenes.

On the other hand, rather than a user views a digest in which highlight scenes are collected which are detected according to a fixed rule designed and adopted in a detection system by the user, a detection system learns a user's taste, detects scenes that belong to the user's taste (i.e. the scenes which are of interest to a user) as the highlight scenes, and provides a digest in which such highlight scenes are collected. Accordingly, so called "personalization" is realized in viewing the content to improve the content enjoying methods.

In view of the above situation, it is desirable to make it possible to easily obtain a digest in which scenes that have interest for a user are collected as highlight scenes.

According to an embodiment of the present invention, there is provided an information processing apparatus or a program for operating a computer as an information processing apparatus, including: a feature amount extraction unit that extracting a feature amount of each frame of an image of an attention detector learning content which is content used to learn a highlight detector that is a model for detecting a scene that is of interest to a user as a highlight scene; a maximum likelihood state series estimation unit estimating maximum likelihood state series which is state series where there is a state transition with a highlight likelihood that the feature amount of the attention detector learning content is observed in a content model that is a state transition probability model after learning obtained by extracting a state transition probability and a feature amount of each frame of an image of learning content that is content used to learn a state transition probability model that is prescribed as an observation probability of observing a predetermined observed value from the state, and learning the state transition probability model using the feature amount of the learning content; a highlight label generation unit generating highlight label series with respect to the attention detector learning content by labeling each frame of the attention detector learning content highlight label that indicates whether the scene is the highlight scene according to a user's manipulation; and a learning unit learning the highlight detector that is the state transition probability model using learning label series that is a pair of the maximum likelihood state series obtained from the attention detector learning content and the highlight label series.

Also, according to an embodiment of the present invention, there is provided an information processing method including the steps of: extracting a feature amount of each frame of an image of an attention detector learning content which is content used to learn a highlight detector that is a model for detecting a scene that is of interest to a user as a highlight scene; estimating maximum likelihood state series which is state series where there is a state transition with a highest likelihood that the feature amount of the attention detector learning content is observed in a content model that is a state transition probability model after learning obtained by extracting a state transition probability and a feature amount of each frame of an image of learning content that is content used to learn a state transition probability model that is prescribed as an observation probability of observing a predetermined observed value from the state, and learning the state transition probability model using the feature amount of the learning content; generating highlight label series with respect to the attention detector learning content by labeling each frame of the attention detector learning content highlight label that indicates whether the scene is the highlight scene according to a user's manipulation; and learning the highlight detector that is the state transition probability model using learning label series that is a pair of the maximum likelihood state series obtained from the attention detector learning content and the highlight label series.

In the information processing apparatus and method, and the program according to the embodiment of the present invention, the feature amount is extracted from each frame of an image of an attention detector learning content that is content used to learn a highlight detector that is a model for detecting a scene that is of interest to a user as a highlight scene. The maximum likelihood state series is estimated, which is state series where there is a state transition with a highest likelihood that the feature amount of the attention detector learning content is observed in a content model that is a state transition probability model after learning obtained by extracting a state transition probability and a feature amount of each frame of an image of learning content that is content used to learn a state transition probability model that is prescribed as an observation probability of observing a predetermined observed value from the state, and learning the state transition probability model using the feature amount of the learning content. The highlight label series is generated with respect to the attention detector learning content by labeling each frame of the attention detector learning content highlight label that indicates whether the scene is the highlight scene according to a user's manipulation. Also, the highlight detector that is the state transition probability model is learned using learning label series that is a pair of the maximum likelihood state series obtained from the attention detector learning content and the highlight label series.

According to another embodiment of the present invention, there is provided an information processing apparatus or a program for operating a computer as an information processing apparatus, including: acquisition means for acquiring highlight detector obtained by extracting a feature amount of each frame of an image of an attention detector learning content which is content used to learn a highlight detector that is a model for detecting a scene that is of interest to a user as a highlight scene, estimating maximum likelihood state series which is state series where there is a state transition with a highest likelihood that the feature amount of the attention detector learning content is observed in a content model that is a state transition probability model after learning obtained by extracting a state transition probability and a feature amount of each frame of an image of learning content that is content used to learn a state transition probability model that is prescribed as an observation probability of observing a predetermined observed value from the state and learning the state transition probability model using the feature amount of the learning content, generating highlight label series with respect to the attention detector learning content by labeling each frame of the attention detector learning content highlight label that indicates whether the scene is the highlight scene according to a user's manipulation, and learning the highlight detector that is the state transition probability model using learning label series that is a pair of the maximum likelihood state series obtained from the attention detector learning content and the highlight label series; feature amount extraction means for extracting a feature amount of each frame of an image of an attention highlight detection content which is content of an object that detects the highlight scene; first maximum likelihood state series estimation means for a first maximum likelihood state series which is state series where there is a state transition with a highest likelihood that the feature amount of the attention highlight detection content is observed in the content model; second maximum likelihood state series estimation means for estimating a second maximum likelihood state series which is state series where there is a state transition with a highest likelihood that the maximum likelihood state series obtained from the attention highlight detection content and detection label series that is a pair to the highlight label series of the highlight label that indicates whether the scene is the highlight scene are observed in the highlight detector; highlight scene detection means for detecting a frame of the highlight scene from the attention highlight detection contents on the basis of an observation probability of the highlight label of each state of highlight relation state series that is the maximum likelihood state series obtained from the detection label series; and digest content generation means for generating digest content that is a digest of the attention highlight detection content using the frame of the highlight scene.

Also, according to another embodiment of the present invention, there is provided an information processing method including the steps of: an information processing apparatus acquiring a highlight detector obtained by extracting a feature amount of each frame of an image of an attention detector learning content which is content used to learn a highlight detector that is a model for detecting a scene that is of interest to a user as a highlight scene, estimating maximum likelihood state series which is state series where there is a state transition with a highest likelihood that the feature amount of the attention detector learning content is observed in a content model that is a state transition probability model after learning obtained by extracting a state transition probability and a feature amount of each frame of an image of learning content that is content used to learn a state transition probability model that is prescribed as an observation probability of observing a predetermined observed value from the state and learning the state transition probability model using the feature amount of the learning content, generating highlight label series with respect to the attention detector learning content by labeling each frame of the attention detector learning content highlight label that indicates whether the scene is the highlight scene according to a user's manipulation, and learning the highlight detector that is the state transition probability model using learning label series that is a pair of the maximum likelihood state series obtained from the attention detector learning content and the highlight label series; extracting a feature amount of each frame of an image of an attention highlight detection content which is content of an object that detects the highlight scene; estimating a first maximum likelihood state series which is state series where there is a state transition with a highest likelihood that the feature amount of the attention highlight detection content is observed in the content model; estimating a second maximum likelihood state series which is state series where there is a state transition with a highest likelihood that the maximum likelihood state series obtained from the attention highlight detection content and detection label series that is a pair to the highlight label series of the highlight label that indicates whether the scene is the highlight scene are observed in the highlight detector; detecting a frame of the highlight scene from the attention highlight detection contents on the basis of an observation probability of the highlight label of each state of highlight relation state series that is the maximum likelihood state series obtained from the detection label series; and generating digest content that is a digest of the attention highlight detection content using the frame of the highlight scene.

In the information processing apparatus and method, and the program according to another embodiment of the present invention, the highlight detector is acquired by extracting a feature amount of each frame of an image of an attention detector learning content which is content used to learn a highlight detector that is a model for detecting a scene that is of interest to a user as a highlight scene, estimating maximum likelihood state series which is state series where there is a state transition with a highest likelihood that the feature amount of the attention detector learning content is observed in a content model that is a state transition probability model after learning obtained by extracting a state transition probability and a feature amount of each frame of an image of learning content that is content used to learn a state transition probability model that is prescribed as an observation probability of observing a predetermined observed value from the state and learning the state transition probability model using the feature amount of the learning content, generating highlight label series with respect to the attention detector learning content by labeling each frame of the attention detector learning content highlight label that indicates whether the scene is the highlight scene according to a user's manipulation, and learning the highlight detector that is the state transition probability model using learning label series that is a pair of the maximum likelihood state series obtained from the attention detector learning content and the highlight label series. The feature amount is extracted from each frame of an image of an attention highlight detection content which is content of an object that detects the highlight scene, and the maximum likelihood state series is estimated, which is state series where there is a state transition with a highest likelihood that the feature amount of the attention highlight detection content is observed in the content model. Also, the maximum likelihood state series is estimated, which is state series where there is a state transition with a highest likelihood that the maximum likelihood state series obtained from the attention highlight detection content and detection label series that is a pair to the highlight label series of the highlight label that indicates whether the scene is the highlight scene are observed in the highlight detector. Then, the frame of the highlight scene from the attention highlight detection contents is detected on the basis of an observation probability of the highlight label of each state of highlight relation state series that is the maximum likelihood state series obtained from the detection label series, and the digest content that is a digest of the attention highlight detection content is generated using the frame of the highlight scene.

The information processing apparatus may be an independent apparatus or an internal block configuring one apparatus.

Also, the program may be provided through transmission through a transmission medium or may be recorded in a recording medium.

As described above, according to the embodiments of the present invention, it is possible to easily obtain a digest in which scenes that have interest for a user are collected as highlight scenes.

BRIEF DESCRIPTION OF THE DRAWINGS

FIGS. 6A to 6C are diagrams illustrating an example of HMM;

FIGS. 10A to 10D are diagrams illustrating an outline of the content structure presentation processing;

FIGS. 19A and 19B are diagrams illustrating examples of digest content generated by a digest content generation unit;

FIGS. 38A to 38D are diagrams illustrating the feature amount extraction processed by an audio feature amount extraction unit;

DESCRIPTION OF THE PREFERRED EMBODIMENTS

Figure 1:
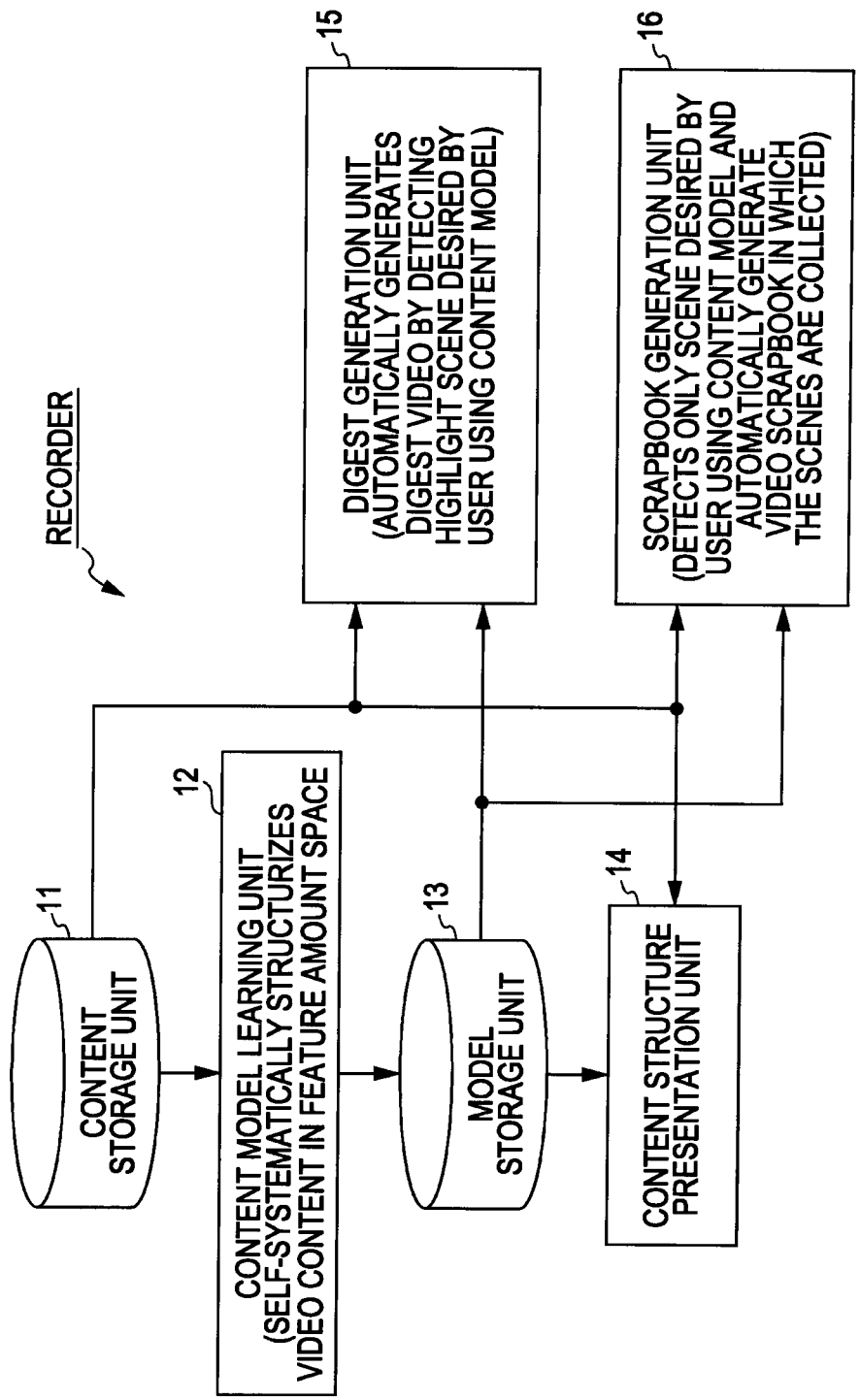
FIG. 1 is a block diagram illustrating a configuration example of a recorder to which an embodiment of the present invention is applied.

An Example of a Recorder to which an Information Processing Apparatus According to an Embodiment of the Present Invention is Applied FIG. 1 is a block diagram illustrating a configuration example of a recorder to which an information processing apparatus according to an embodiment of the present invention is applied.

The recorder in FIG. 1 may be, for example, an HD (Hard Disk) recorder or the like, and records (or stores) various kinds of content, such as a television broadcasting program, content that is provided through a network such as Internet, content taken using a video camera, or the like.

In FIG. 1, the recorder includes a content storage unit 11, a content model learning unit 12, a model storage unit 13, a content structure presentation unit 14, a digest generation unit 15, and a scrapbook generation unit 15.

The content storage unit 11 stores (or records), for example, content such as a television broadcasting program or the like. The content is recorded (or stored) in the content storage unit 11, and the content recorded (or stored) in the content storage unit 11 is played, for example, according to a user's manipulation.

The content model learning unit 12 self-systematically structurizes the content stored in the content storage unit 11 in a predetermined feature amount space, and performs learning (i.e. statistically learning) for obtaining a model indicating the structure (i.e. space-time structure) of the content (hereinafter referred to as "content model"). The content model learning unit 12 supplies the content model obtained as a result of learning to the model storage unit 13.

The model storage unit 13 stores content models supplied from the content module learning unit 12.

The content structure presentation unit 14 presents a model map, to be described later, that indicates the structure of the content using the content stored in the content storage unit 11 and the content model stored in the model storage unit 13.

The digest generation unit 15 detects a scene that is of interest to a user from the content stored in the content storage unit 11 as a highlight scene using the content model stored in the model storage unit 13. Also, the digest generation unit 15 generates a digest in which highlight scenes are collected.

The scrapbook generation unit 16 detects the scene that is of interest to a user using the content model stored in the model storage unit 13 and generates a scrapbook in which the scenes are collected.

In this case, the generation of the digest by the digest generation unit 15 and the generation of the scrapbook by the scrapbook generation unit 16, although they are common in detecting the scenes that have interest for a user as a result, are performed with different detecting methods (i.e. algorithms).

Also, the recorder in FIG. 1 may be configured without installing the content structure presentation unit 14 or the scrapbook generation unit 16.

Here, content data stored in the content storage unit 11 may include data (i.e. stream) of video, audio, and necessary text (i.e. caption).

Also, here, only image data among content data may be used in processing the learning of the content model or processing using the content model.

However, in processing the learning of the content model or processing using the content model, it is possible to use audio or text data in addition to image data, and in this case, the processing accuracy can be improved.

Also, in processing the learning of the content model or processing using the content model, it is possible to use audio data rather than image data.

[Example of Configuration of a Content Model Learning Unit 12]

Figure 2:
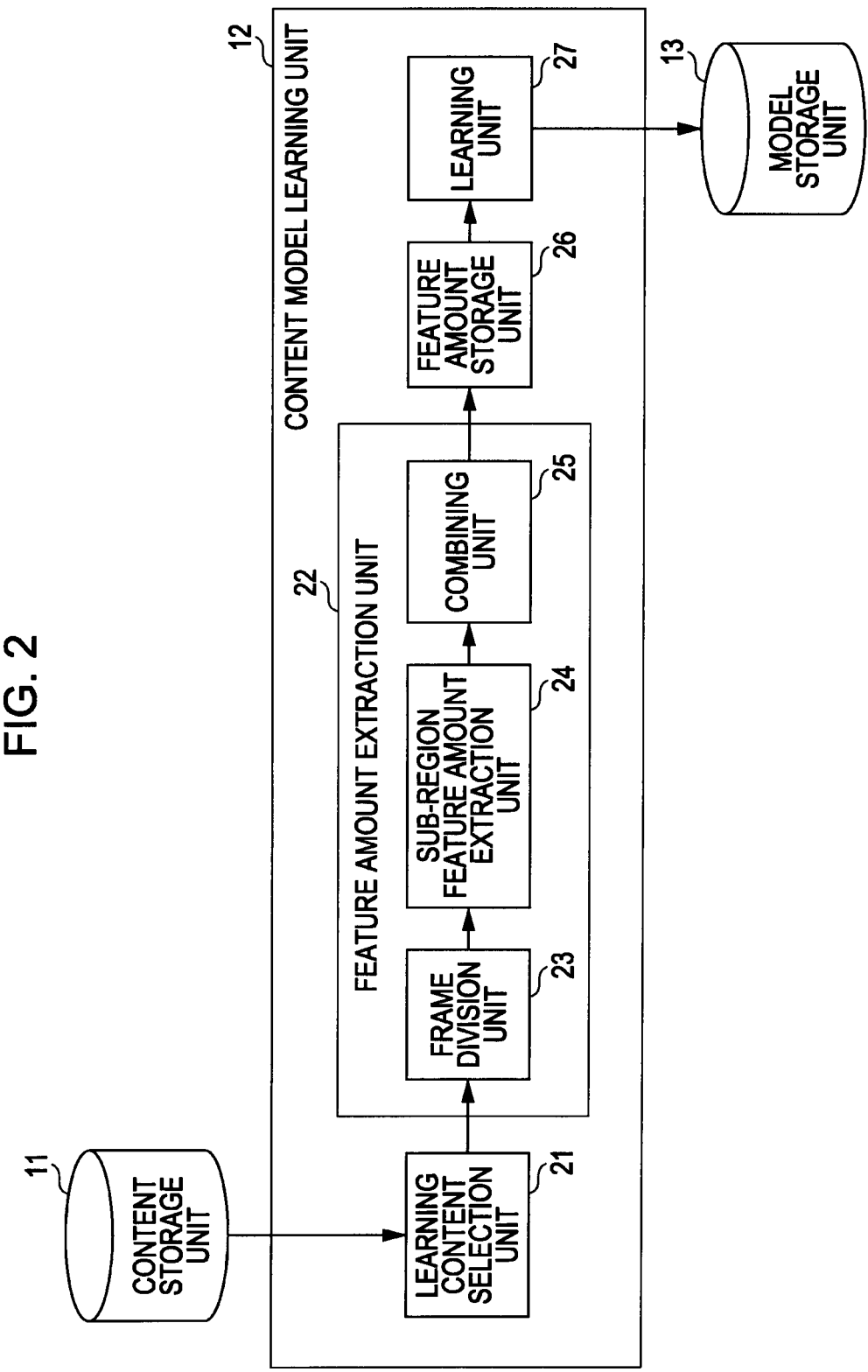
FIG. 2 is a block diagram illustrating the configuration of a content model learning unit.

FIG. 2 is a block diagram illustrating a configuration example of a content model learning unit 12 in FIG. 1.

The content model learning unit 12 extracts the feature amount of each frame of an image of learning content which is content used to learn a state transition probability model that is prescribed as an observation probability of observing a predetermined observed value from the state transition probability and the state. Also, the content model learning unit 12 performs the learning of the state transition probability model using the feature amount of the learning content.

That is, the content model learning unit 12 includes a learning content selection unit 21, a feature amount extraction unit 22, a feature amount storage unit 26, and a learning unit 27.

The learning content selection unit 21 selects content that is used to learn the state transition probability model among content stored in the content storage unit 11 as the learning content and supplies the selected content to the feature amount extraction unit 22.

Here, the learning content selection unit 21 selects, for example, one or more content belonging to a predetermined category among the content stored in the content storage unit 11 as the learning content.

The content belonging to the predetermined category means content with common content structure that is latent in the content, such as a program in the same genre, a serial program, a program periodically broadcast (i.e. program having the same title) every week, every day, or the like.

In a genre, although the brief classification, e.g. sports programs, news programs, or the like, may be adopted, it is preferable to adopt the detailed classification, e.g. soccer game programs, baseball game programs, or the like.

Also, for example, in the case of soccer game programs of which channels (i.e. broadcasting stations) are different, they may be classified into content belonging to different categories.

In this case, it is assumed that it is predetermined in the recorder of FIG. 1 which category is adopted as the category of the content.

Also, the category of the content stored in the content storage unit 11 may be recognized from metadata, such as a program title, genre, or the like, which is transmitted together with a program in a television broadcast, or program information provided by a site on the Internet.

The feature amount extraction unit 22 demultiplexes the learning content from the learning content selection unit 21 into image and audio data, and extracts the feature amount of each frame to supply the extracted feature amount to the feature amount storage unit 26.

That is, the feature amount extraction unit 22 includes a frame division unit 23, a sub-region feature amount extraction unit 24, and a combining unit 25.

To the frame division unit 23, frames of an image of the learning content from the learning content selection unit 21 are supplied in time series.

The frame division unit 23 successively processes the frames of the learning content supplied from the learning content selection unit 21 in time series as attention frames. Also, the frame division unit 23 divides the attention frame into a plurality of sub regions which are small regions, and supplies the sub regions to the sub-region feature amount extraction unit 24.

The sub-region feature amount extraction unit 24 extracts the feature amount from each sub region of the attention frame provided from the frame division unit 23 (hereinafter referred to as "sub-region feature amount"), and supplies the feature amount into the combining unit 25.

The combining unit 25 combines the sub-region feature amounts of the sub regions of the attention frame provided from the sub-region feature amount extraction unit 24, and supplies the result of combination to the feature amount storage unit 26 as the feature amount of the attention frame.

The feature amount storage unit 26 stores in time series the feature amounts of the respective frames of the learning content supplied from the feature amount extraction unit 22 (or the combining unit 25 of the feature amount extraction unit 22).

The learning unit 27 performs the learning of the state transition probability model using the feature amounts of the respective frames of the learning content stored in the feature amount storage unit 26. Also, the learning unit 27 makes the state transition probability modes after learning correspond to the category of the learning content as the content model, and supplies the state transition probability model to the model storage unit 13.

[State Transition Probability Model]

Figure 3:
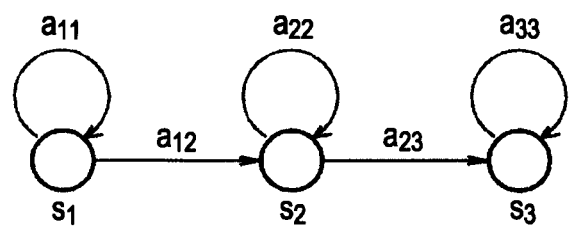
FIG. 3 is a diagram illustrating an example of HMM.

Referring to FIG. 3 or 6, the state transition probability model that is learned by the learning unit 27 in FIG. 2 will be described.

As the state transition probability model, for example, an HMM (Hidden Marcov Model) may be adopted. In the case of adopting the HMM, the learning of the HMM is performed, for example, by Baum-Welch re-estimation method.

FIG. 3 is a diagram illustrating an example of a left-to-right type HMM.

The left-to-right type HMM is the HMM that is arranged in line from left to right, and may perform transition from a certain state to the same state (which is called self-transition) and transition from a certain state to a state that is on the right side of the certain state. The left-to-right type HMM may be used, for example, in voice recognition or the like.

The HMM in FIG. 3 is composed of three states $s_1$, $s_2$, and $s_3$, and permits self-transition and transition from a certain state to a neighboring right-side state.

In this case, the HMM is prescribed by an initial probability $\pi_i$ of the state $s_i$, a state transition probability $a_{i,j}$ and an observation probability $b_i(o)$ that a predetermined observed value o is observed from the state $s_i$.

Here, the initial probability $\pi_i$ is the probability that the state $s_i$ is the initial state (i.e. the original state). In the leftto-right type HMM, the initial probability $\pi_i$ of the leftmost-side state $s_i$ is 1.0, and the initial probability $\pi_i$ of the other state $s_i$ is 0.0.

The state transition probability $a_{ij}$ is a probability that the state is transited from the state $s_i$ to the state $s_j$.

The observation probability $b_j(o)$ is the probability that the observed value o is observed from the state $s_i$ when the state is transited to the state $s_j$. As the observation probability $b_j(o)$, if the observed value o is a discrete value, the probability value is used, while if the observed value o is a continuous value, a probability distribution function is used. As the probability distribution function, a Gaussian distribution which is defined by an average value (i.e. an average vector) and distribution (i.e. covariance matrix) may be adopted.

Figure 4:
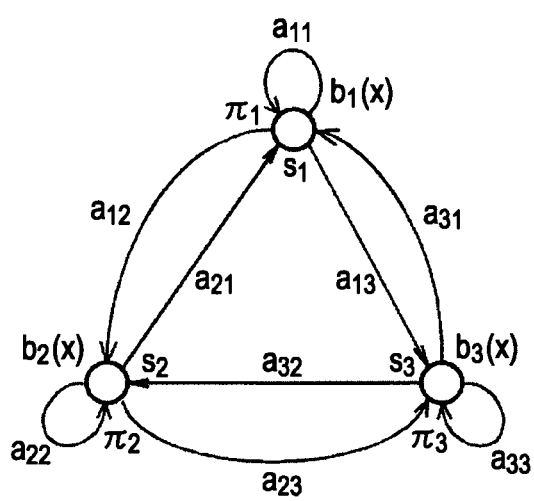
FIG. 4 is a diagram illustrating an example of HMM.

FIG. 4 is a diagram illustrating an example of an ergodic type HMM.

The ergodic type HMM is the HMM that is not restricted in state transition, i.e. the HMM in which the state transition from a certain state $s_i$ to another state $s_j$ is possible.

The HMM illustrated in FIG. 4 is composed of three states $s_1$, $s_2$, and $s_3$, and permits a certain state transition.

The ergodic type HMM is the HMM having the highest degree of freedom of state transition. However, if the number of states is increased, parameters of the HMM (e.g. initial probability $\pi_i$, state transition probability $a_{i,j}$, and observation probability $b_i(o)$) converge to a local minimum depending upon the initial values of the parameters, and thus proper parameters may not be obtained.

Accordingly, by adopting the hypothesis that most phenomena in the natural world and camera work or program configuration for producing video content can be expressed by sparse combination such a small world network, it is assumed that the learning unit 27 adopts the HMM in which the state transition is limited to a sparse structure.

Here, the sparse structure is a structure in which the state transition to a certain state is greatly limited rather than a close state transition, such as an ergodic type HMM in which the state transition from a certain state to another state is possible.

Here, even in a sparse structure, it is assumed that at least one state transition to another state exists, and a self-transition exists.

Figure 5A:
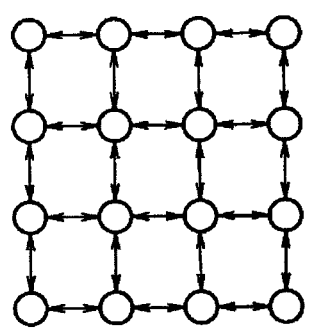
FIGS. 5A and 5B are diagrams illustrating an example of HMM.
Figure 5B:
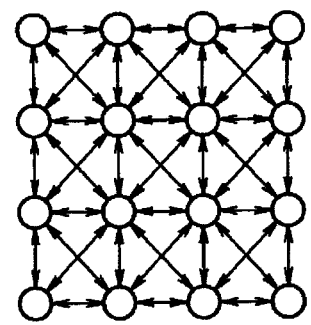

FIGS. 5A and 5B are diagrams illustrating an example of a two-dimensional (2D) vicinity restraint HMM that is the HMM having a sparse structure.

The HMM illustrated in FIGS. 5A and 5B has limitations in configuration in addition to the sparse structure. That is, the HMM should be arranged in the form of a lattice on the two dimensional plane.

Here, the HMM in FIG. 5A is so configured that the state transition to another state is limited to a horizontally adjacent state and a vertically adjacent state. Also, the HMM in FIG. 5B is so configured that the state transition is limited to a horizontally adjacent state, a vertically adjacent state, and a diagonally adjacent state.

FIGS. 6A to 6C are diagrams illustrating an example of an HMM having a sparse structure excepting the 2D vicinity restraint HMM.

That is, FIG. 6A shows an example of an HMM with 3D grid limitations, FIG. 6B shows an example of an HMM with 2D random arrangement limitations, and FIG. 6C shows an example of HMM with small-world network.

The learning unit 27 of FIG. 2 performs the learning of the HMM having a sparse structure that accommodates a hundred to several hundreds of states as shown in FIGS. 5A and 5B or 6A to 6C by the Baum-Welch re-estimation method, using the feature amounts of an image (extracted from a frame) stored in the feature amount storage unit 26.

Since the HMM, which is the content model obtained as the result of learning performed by the learning unit 27, is obtained by the learning only using the feature amount of an image of the content, it may be called a visual HMM.

Here, the feature amount stored in the feature amount storage unit 26, which is used in learning the HMM, corresponds to a continuous vector, and a probability distribution function is used as the observation probability $b_j(o)$ of the HMM.

An example of the HMM as described above is disclosed in Laurence Rabiner, Biing-Hwang Juang, coauthors, "the Basis of Voice Recognition (in two volumes), NTT Advanced Technology Co., Ltd." or in Japanese Patent Application No. 2008-064993 previously proposed by the inventor. Also, an example of the use of the ergodic type HMM or the HMM having the sparse structure is disclosed in Japanese Patent Application No. 2008-064994 previously proposed by the inventor.

[Extraction of the Feature Amount]

Figure 7:
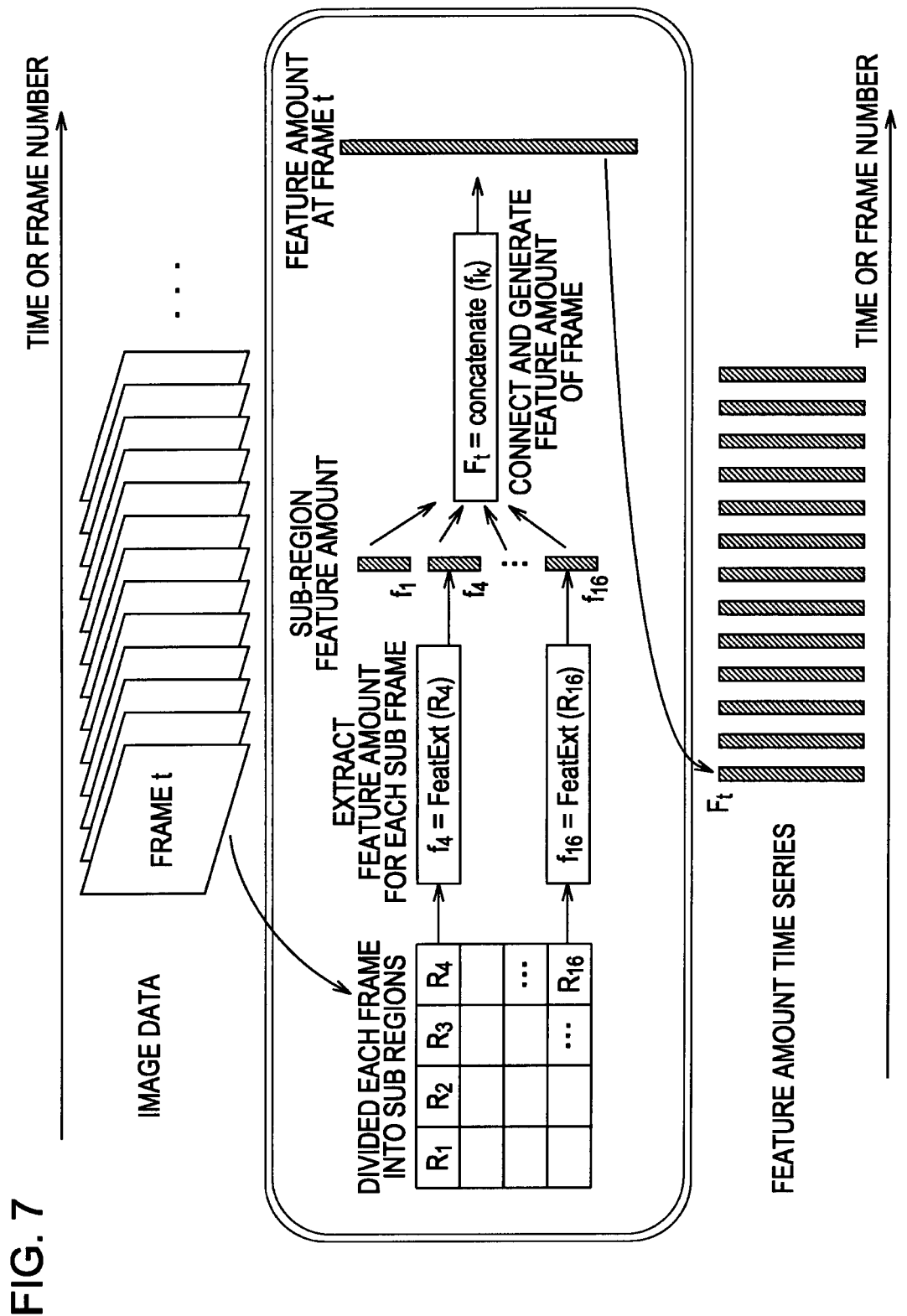
FIG. 7 is a diagram illustrating the feature amount extraction processed by a feature amount extraction unit.

FIG. 7 is a diagram illustrating the feature amount extraction processed by the feature amount extraction unit 22 as illustrated in FIG. 2.

To the frame division unit 23 of the feature amount extraction unit 22, frames of an image of the learning content from the learning content selection unit 21 are supplied in time series.

The frame division unit 23 successively processes the frames of the learning content supplied from the learning content selection unit 21 in time series as attention frames, and divides the attention frame into a plurality of sub regions $R_k$ to supply the sub regions to the sub-region feature amount extraction unit 24.

In FIG. 7, the attention frame is equally divided into 16 (i.e. horizontal×vertical=4×4) sub regions $R_1, R_2, \ldots, R_{16}$.

Here, when one frame is divided into sub regions $R_k$, the number of divided sub regions $R_k$ is not limited to 16 (i.e. 4×4). One frame may be divided into 20 (i.e. 5×4) sub regions $R_k$ or 25 (i.e. 5×5) sub regions $R_k$.

Although in FIG. 7, one frame is divided into sub regions $R_k$ with the same size (i.e. equally divided into sub regions), the size of the sub regions may not be equal to one another. For example, the center part of the frame may be divided into sub regions with a small size, and the neighboring part of the frame (i.e. the part neighboring the border of the image) may be divided into sub regions with a large size.

The sub-region feature amount extraction unit 24 (see FIG. 2) extracts the sub-region feature amounts $f_k$=FeatExt($R_k$) of the respective sub regions $R_k$ of the attention frame provided from the frame division unit 23, and supplies the extracted sub-region feature amounts to the combining unit 25.

That is, the sub-region feature amount extraction unit 24 obtains the global feature amount of the sub region $R_k$ as the sub-region feature amount $f_k$, using the pixel values (e.g. RGB components, YUV components, or the like) of the sub region $R_k$.

Here, the global feature amount of the sub region $R_k$ means the feature amount, e.g. a histogram, which is additively calculated using only pixel values, without using information of positions of the pixels constituting the sub region $R_k$.

As the global feature amount, a feature amount called GIST may be adopted. The GIST has been described in detail, for example, in A. Torralba, K. Murphy, W. Freeman, M. Rubin, "Context-based vision system for place and object recognition", IEEE Int. Conf. Computer Vision, vol. 1, no. 1, pp. 273-280, 2003.

In this case, the global feature amount is not limited to GIST. That is, the global feature amount may be a robust (e.g. change-absorbing type) feature amount with respect to an external change of a local position, brightness, time point, or the like. Examples of such feature amount may be HLCA (High-order Local Correlation), LBP (Local Binary Patterns), color histograms, and the like.

The HLCA has been described in detail, for example, in N. Otsu, T. Kurita, "A new scheme for practical flexible and intelligent vision systems", Proc. IAPR Workshop on Computer Vision, pp. 431-435, 1988. The LBP has been described in detail, for example, in Ojala t, Pietickainen M & Maenpaa T, "Multiresolution gray-scale and rotation invariant texture classification with Local Binary Patterns", IEEE Transactions on Pattern Analysis and Machine Intelligence 24(7): 971-987 (Accurately, "a" appearing in Pietikainen and Maenpaa is a character obtained by adding ".." to an upper part of "a").

Here, although the global feature amount of the GIST as described above, LBP, HLCA, color histograms, or the like, is disposed to increase the number of dimensions, it is also disposed to heighten the correlation between the dimensions.

Accordingly, the sub-region feature amount extraction unit 24 (see FIG. 2) extracts GIST or the like from the sub region $R_k$, and then performs PCA (Principle Component Analysis) of the GIST. Also, the sub-region feature amount extraction unit 24 may compress (or limit) the number of dimensions of the GIST so that the accumulated contribution rate reaches a somewhat high value (e.g. a value equal to or larger than 95) on the basis of the result of PCA, and may consider the result of compression as the sub-region feature amount.

In this case, a projection vector that projects the GIST or the like onto a PCA space with a compressed number of dimensions becomes the result of compression of the number of dimensions of the GIST or the like.

The combining unit 25 (see FIG. 2) combines the sub-region feature amounts $f_1$ to $f_{16}$ of the sub regions $R_1$ to $R_{16}$ of the attention frame provided from the sub-region feature amount extraction unit 24, and provides the result of combination to the feature amount storage unit 26 as the feature amount of the attention frame.

That is, the combining unit 25 generates a vector having the sub-regions feature amounts $f_1$ to $f_{16}$ as its components by combining the sub-region feature amounts $f_1$ to $f_{16}$ provided from the sub-region feature amount extraction unit 24, and provides the vector to the feature amount storage unit 26 as the feature amount $F_t$ of the attention frame.

Here, in FIG. 7, the frame (i.e. frame t) at time t has become the attention frame. The time t is the time on the basis of the front end of the content, and in the embodiment of the present invention, the frame at the time t means the t-th frame from the front end of the content.

According to the feature amount extraction unit 22 of FIG. 2, the respective frames of the learning content are successively processed as the attention frames, starting from the front end of the content, and as described above, the feature amounts $F_t$ are obtained. Also, the feature amounts $F_t$ of the respective frames of the learning content are provided in time series (in a state where the temporal before-after relations are maintained) from the feature amount extraction unit 22 to the feature amount storage unit 26 to be stored in the feature amount storage unit 26.

As described above, feature amount extraction unit 22 obtains the global feature amount of the sub region $R_k$ as the sub-region feature amount $f_k$, and then obtains the vector having the sub-region feature amounts $f_k$ as its components as the feature amount $F_t$ of the frame.

Accordingly, the feature amount $F_t$ of the frame is robust to the local change (i.e. the change occurring within the sub region), but is discriminative (i.e. sensitively discriminates the difference) with respect to the change of the pattern arrangement as the whole frame.

According to the feature amount $F_t$, the similarity of scenes (i.e. contents) between frames can be properly determined. For example, it is enough that the scene of the "seashore" is the scene in which the "sky" is on an upper side of the frame, the "sea" is in the center of the frame, and the "sandy plain" is on a lower side of the frame, but it has no correlation with the scene similarity which place in the sky a cloud is in or whether the scene is the scene of the "seashore". In this regards, the feature amount $F_t$ is proper to determine the scene similarity (i.e. to classify the scene).

[Content Model Learning Process]

Figure 8:
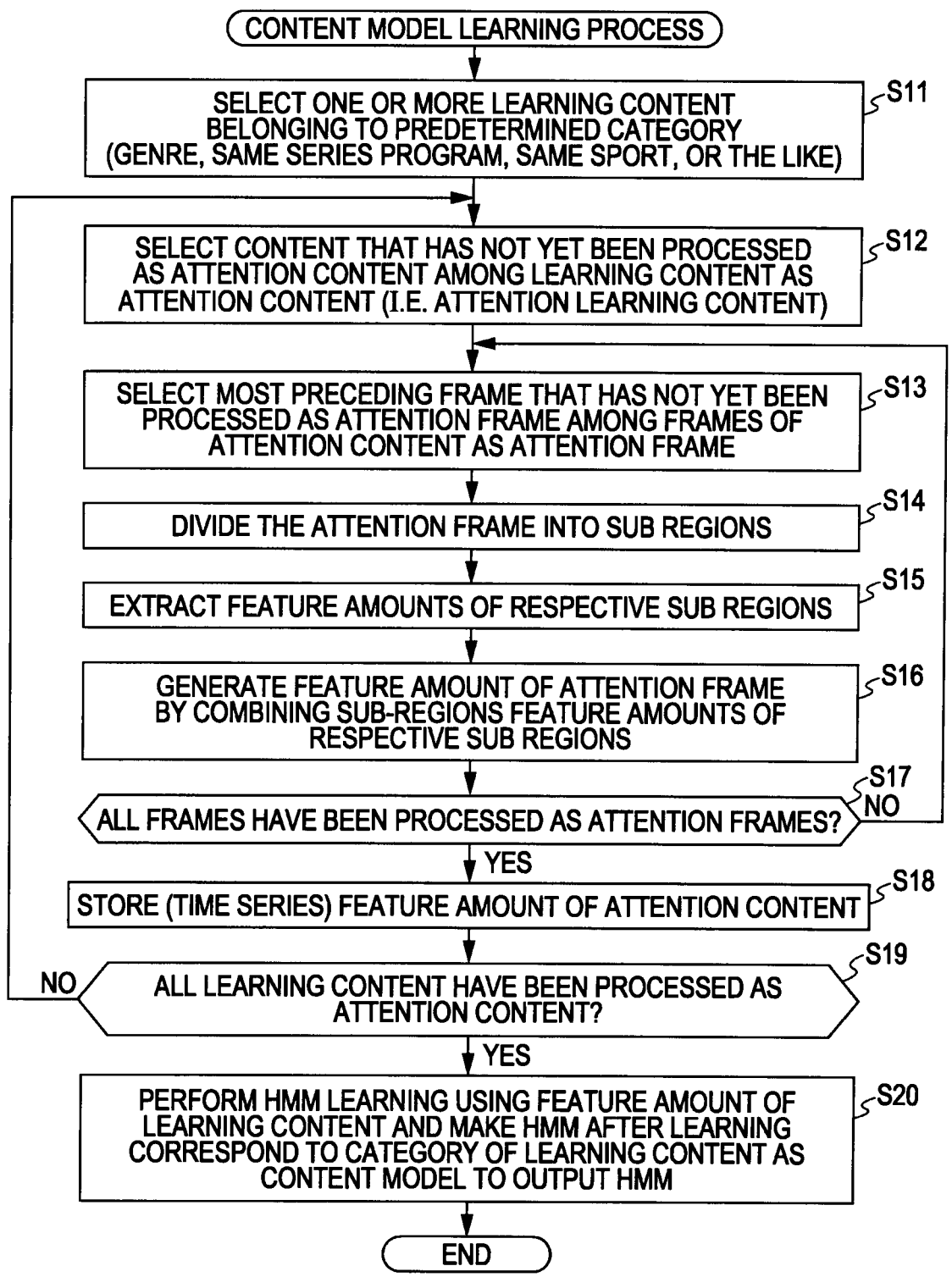
FIG. 8 is a flowchart illustrating the content model learning processing.

FIG. 8 is a flowchart illustrating the content model learning process performed by the content model learning unit 12 of FIG. 2.

In step S11, the learning content selection unit 21 selects one or more content belonging to a predetermined category among content stored in the content storage unit 11 as the learning content.

For example, the learning content selection unit 21 selects certain content that has not yet been processed as the learning content among the content stored in the content storage unit 11 as the learning content.

Also, the learning content selection unit 21 recognizes the category of the content selected as the learning content, and if another content belonging to the same category is stored in the content storage unit 11, it selects again the corresponding content (other content) as the learning content.

The learning content selection unit 21 provides the learning content to the feature amount extraction unit 22, and proceeds from step S11 to step S12.

In step S12, the frame division unit 23 of the feature amount extraction unit 22 selects content that has not yet been processed as attention learning content (hereinafter referred to as "attention content") among learning content provided from the learning content selection unit 21 as the attention content.

Then, the frame division unit 23 proceeds from step S12 to step S13, and selects the most preceding frame that has not yet been processed as the attention frame among frames of the attention content as the attention frame to proceed to step S14.

In step S14, the frame division unit 23 divides the attention frame into a plurality of sub regions, provides the divided sub regions to the sub-region feature amount extraction unit 24, and proceeds to step S15.

In step S15, the sub-region feature amount extraction unit 24 extracts the respective sub-region feature amounts of the plurality of sub regions provided from the frame division unit 23, provides the extracted sub-region feature amounts to the combining unit 25, and proceeds to step S16.

In step S16, the combining unit 25 generates the feature amount of the attention frame by combining the sub-region feature amounts of the plurality of sub regions constituting the attention frame from the sub-regions feature amount extraction unit 24, and proceeds to step S17.

In step S17, the frame division unit 23 judges whether all the frames of the notice content have been processed as the attention frames.

In step S17, if it is judged that any frame that has not yet been processed as the attention frame exists, the frame division unit 23 returns to step S13 to repeat the same process.

By contrast, in step S17, if it is judged that all the frames have been processed as the attention frames, the combining unit 25 proceeds to step S18, and provides (time series) feature amounts of the respective frames of the notice content to the feature amount storage unit 26 to store the feature amounts in the feature amount storage unit 26.

Then, the frame division unit 23 proceeds from step S18 to step S19, and judges whether all the learning content provided from the learning content selection unit 21 have been processed as the attention content.

In step S19, if it is judged that any content that has not yet been processed as the attention content exists, the frame division unit 23 returns to step S12 to repeat the same process.

By contrast, in step S19, if it is judged that all the content have been processed as the attention content, the learning unit 27 proceeds to step S20, and performs the learning of the HMM using the feature amount of the learning content (i.e. time series feature amounts of the respective frames) stored in the feature amount storage unit 26.

Then, the learning unit 27 makes the HMM after learning correspond to the category of the learning content as the content model, and outputs (i.e. provides) the HMM to the model storage unit 13 to complete the content model learning.

At this time, the content model learning process may start at certain timing.

According to the above-described content model learning processing, in the HMM, the content structure (e.g. the structure in which program construction, camera work, or the like, occurs) that is latent in the learning content is self-systematically acquired.

As a result, each state of the HMM as the content model, which is obtained according to the content model learning processing, corresponds to elements of the content acquired by the learning, and the state transition expresses a temporal transition between the elements of the content structure.

Also, the state of the content model is expressed through combination of frame groups (i.e. similar scenes) of which spatial distances in a feature amount space (i.e. space of feature amount extracted by the feature amount extraction unit 22 (see FIG. 2) are close to one another and of which the temporal before-after relations are similar to one another.

Here, in the case in which the content is a quiz program, for example, the flow of making a question for a quiz, giving a hint, player's answering to the question, and announcing of a correct answer is set as the basic flow of the program, and by repeating this basic course, the quiz program is expedited.

The basic flow of the program corresponds to the content structure, and the elements constituting the flow (i.e. structure), such as making a question for a quiz, giving a hint, player's answering to the question, and announcing of a correct answer, correspond to the elements of the content structure.

Also, for example, the proceeding from making a question for a quiz to giving a hint or the like corresponds to a temporal transition.

[Configuration Example of a Content Structure Presentation Unit 14]

Figure 9:
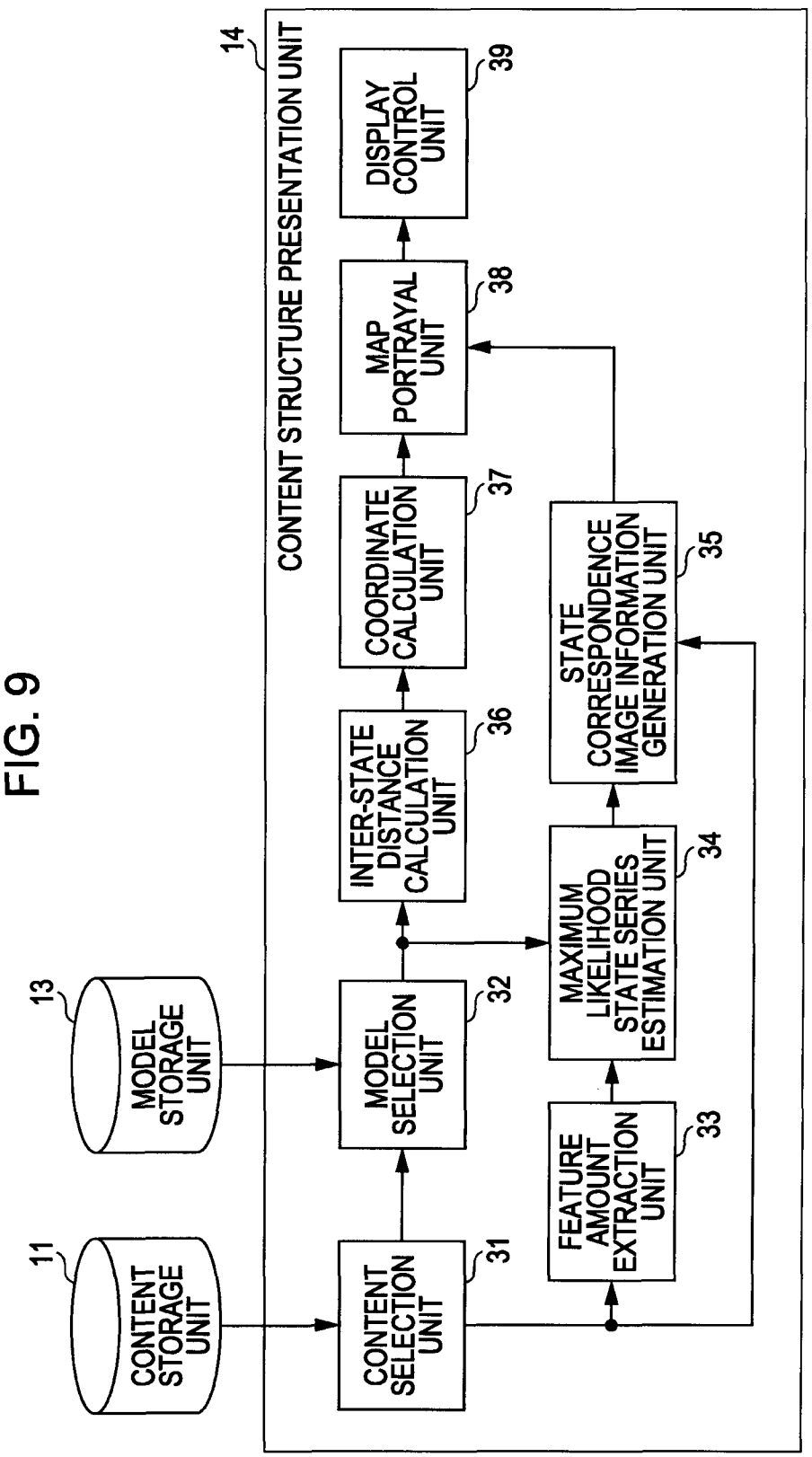
FIG. 9 is a block diagram illustrating a configuration example of a content structure presentation unit.

FIG. 9 is a block diagram illustrating the configuration example of a content structure presentation unit 14 of FIG. 1.

As described above, although the content model acquires the content structure that is latent to the learning content, the content structure presentation unit 14 visualizes and presents the content structure to a user.

That is, the content structure presentation unit 14 includes a content selection unit 31, a model selection unit 32, a feature amount extraction unit 33, a maximum likelihood state series estimation unit 34, a state correspondence image information generation unit 35, an inter-state distance calculation unit 36, a coordinate calculation unit 37, a map portrayal unit 38, and a display control unit 39.

For example, according to a user's manipulation, the content selection unit 31 selects the content that visualizes the structure among the content stored in the content storage unit 11 as an attention presentation content (hereinafter simply referred to as "attention content").

The content selection unit 31 provides the attention content to the feature amount extraction unit 33 and the state correspondence image information generation unit 35. Also, the content selection unit 31 recognizes and provides the category of the attention content to the model selection unit 32.

The model selection unit 32 selects the content model of the category that coincides with the category of the attention content from the content selection unit 31 (i.e. the content model corresponding to the category of the attention content) among the content model stored in the model storage unit 13 as the attention model.

Then, the model selection unit 32 provides the attention model to the maximum likelihood state series estimation unit 34 and the inter-state distance calculation unit 36.

The feature amount extraction unit 33 extracts the feature amounts of the respective frames (of an image) of the attention content provided from the content selection unit 31 in the same manner as the feature extraction unit 22 of FIG. 2, and provides the (time series) feature amounts of the respective frames of the attention content to the maximum likelihood state series estimation unit 34.

The maximum likelihood state series estimation unit 34, for example, in accordance with a Viterbi algorithm, estimates the maximum likelihood state series (so called a state series configuring the Viterbi path) which is the state series where there is a state transition with a highest likelihood that the (time series) feature amount of the attention content provided from the feature amount extraction unit 33 is observed in the attention model provided from the model selection unit 32.

Then, the maximum likelihood state series estimation unit 34 provides the maximum likelihood state series from which the feature amount of the notice content is observed (hereinafter referred to as the "maximum likelihood state series of the attention model for the attention content") in the attention model to the state correspondence image information generation unit 35.

Here, it is assumed that the state at time t on the basis of the front end of the maximum likelihood state series of the attention model for the attention content (i.e. the t-th state from the front end that constitutes the maximum likelihood state series) is denoted by s(t), and the number of frames of the attention content is denoted by T.

In this case, the maximum likelihood state series of the attention model for the attention content is the series of T states s(1), s(2), . . . , s(T), and the t-th state (i.e. the state at time t) s(t) corresponds to the frame (i.e. frame t) at time t of the attention content.

Also, if it is assumed that the total number of states of the attention mode is denoted by N, the state s(t) at time t is any one of N states $S_1, S_2, \ldots, S_N$.

Further, to N states $S_1, S_2, \ldots, S_N$, state IDs (Identifications) which are indexes specifying the states are attached.

Now, if it is assumed that the state s(t) at time t of the maximum likelihood state series of the attention model for the attention content is the i-th state $s_i$ among N states $s_1$ to $s_N$, the frame at time t corresponds to the state $S_i$.

Accordingly, each frame of the attention content corresponds to any one of N states $s_1$ to $s_N$.

The substance of the maximum likelihood state series of the attention model for the attention content is the series of the state ID of one state among N state $s_1$ to $s_N$, which corresponds to the frame at time t of the attention content.

As described above, the maximum likelihood series of the attention model for the attention content expresses which state transition the attention content generates on the attention model.

The state correspondence image information generation unit 35 selects a frame that corresponds to the same state for each state ID of the state constituting the maximum likelihood state series (i.e. series of the state ID) provided from the maximum likelihood state series estimation unit 34, among the attention content provided from the content selection unit 31.

That is, the state correspondence image information generation unit 35 successively selects N states $s_1$ to $s_N$ of the attention model as the attention state.

Now, if it is assumed that the state $s_i$ having the state ID #i is selected as the attention state, the state correspondence image information generation unit 35 searches for the state that coincides with the attention state (i.e. the state having the state ID #i) among the maximum likelihood state series, and makes the frame corresponding to the state correspond to the state ID of the attention state to store the frame corresponding to the state.

Then, the state correspondence image information generation unit 35 generates the image information corresponding to the state ID (hereinafter referred to as "state correspondence image information") by processing the frame corresponding to the state ID, and provides the state correspondence image information to the map portrayal unit 38.

Here, as the state correspondence image information, for example, still images (i.e. image series) in which thumbnails of one or more frames that correspond to the state IDs are arranged in time series order or a moving image (i.e. movie) in which one or more reduced frames that correspond to the state IDs are arranged in time series order may be adopted.

In this case, the state correspondence image information generation unit 35 does not generate the state correspondence image information (i.e. it is difficult to generate the state correspondence image information) with respect to the state IDs of the states that do not appear in the maximum likelihood state series among the state IDs of N states $s_1$ to $s_N$ of the attention model.

The inter-state distance calculation unit 36 obtains the inter-state distance $d_{ij}^*$ between one state $s_i$ and another state $s_j$ of the attention model provided from the model selection unit 32 on the basis of the state transition probability $a_{ij}$ from one state $s_i$ to another state $s_j$. Once the inter-state distance $d_{ij}^*$ between one state $s_i$ and another state $s_j$ of the attention model is obtained, the inter-state distance calculation unit 36 provides a matrix with N rows and N columns (i.e. inter-state distance matrix) which has the inter-state distance $d_{ij}^*$ as its component to the coordinate calculation unit 37.

Here, for example, if the state transition probability $a_{ij}$ is larger than a predetermined threshold value (e.g. $(1/N) \times 10^{-2}$), the inter-state distance calculation unit 36 sets the inter-state distance $d_{ij}^*$, for example, to 0.1 (i.e. small value), while if the state transition probability $a_{ij}$ is larger than the predetermined threshold value, the inter-state distance calculation unit 36 sets the inter-state distance $d_{ij}^*$, for example, to 1.0 (i.e. large value).

The coordinate calculation unit 37 obtains the state coordinates $Y_i$ that are the coordinates of the position of the state $s_i$ on the model map so as to reduce an error between an Euclid distance $d_{ij}$ from one state $s_i$ to another state $s_j$ on the model map that is a two-dimensional (2D) or three-dimensional (3D) map on which N states $s_1$ to $s_N$ of the attention model are arranged and the inter-state distance $d_{ij}^*$ of the inter-state distance matrix provided from the inter-state distance calculation unit 36.

That is, the coordinate calculation unit 37 obtains the state coordinates $Y_i$ so as to minimize an error function E of a Sammon map that is proportional to the statistical error between the Euclid distance $d_{ij}$ and the inter-state distance $d_{ij}^*$.

Here, the Sammon map is one of multi-dimension scaling methods, and the details thereof has been described, for example, in J. W. Sammon, JR., "A Nonlinear Mapping for Data Structure Analysis", IEEE Transactions on Computers, vol. C-18, No. 5, May 1969.

According to the Sammon map, for example, the state coordinates $Y_i = (X_i, Y_i)$ on the model map are obtained so as to minimize the error function E of Equation (1).

$$E = \frac{1}{\sum_{i<j}[d_{ij}^*]} \sum_{i<j}^{N} \frac{[d_{ij}^* - d_{ij}]^2}{d_{ij}^*} \quad (1)$$

In Equation (1), N denotes the total number of states of the attention model, and i and j denote state indexes that take integer values in the range of 1 to N (in the embodiment, the state IDs).

The term "$d_{ij}^*$" denotes an element of the i-th row and the j-th column of the inter-state distance matrix, and indicates the inter-state distance from the state $s_i$ to the state $s_j$. "$d_{ij}$" indicates the Euclid distance between the coordinates (i.e. state coordinates) $Y_i$ of the position of the state $s_i$ and the coordinates $Y_j$ of the position of the state $s_j$ on the model map.

The coordinate calculation unit 37 obtains the state coordinates $Y_i$ (i=1, 2, ..., N), by repeatedly applying a gradient method, so as to minimize the error function E in Equation (1), and provides the state coordinates to the map portrayal unit 38.

The map portrayal unit 38 portrays (graphics of) a model map in which (the image of) the state $s_i$ that corresponds to the position of the state coordinates $Y_i$ provided from the coordinate calculation unit 37 is arranged. Also, the map portrayal unit 38 portrays a line segment that connects between the states on the model map according to the state transition probability between the states.

Also, the map portrayal unit 38 links the state $s_i$ on the model map and the state correspondence image information that corresponds to the state ID of the state $s_i$ among the state correspondence image information provided from the state correspondence image information generation unit 35 to provide the model map to the display control unit 39.

The display control unit 39 performs the display control to display the model map provided from the map portrayal unit 38 on a display (not illustrated).

FIGS. 10A to 10D are diagrams illustrating an outline of the processing (i.e. the content structure presentation processing) performed by the content structure presentation unit 14 illustrated in FIG. 9.

FIG. 10A shows the time series of the frame of the content selected by the content selection unit 31 as the attention content (i.e. attention presentation content).

FIG. 10B shows the feature amount time series of the time series of the frame illustrated in FIG. 10A, which is extracted by the feature amount extraction unit 33.

FIG. 10C shows the maximum likelihood state series from which the feature amount time series of the attention content of FIG. 10B is observed (i.e. the maximum likelihood state series of the attention model for the attention content) in the attention model estimated by the maximum likelihood state series estimation unit 34.

Here, the substance of the maximum likelihood state series of the attention model for the attention content is the series of the state IDs. Also, the t-th state ID from the front end of the maximum likelihood state series of the attention model for the attention content is the state ID of the state from which the feature amount of the t-th (i.e. at time t) frame of the attention content is observed (i.e. the state ID of the state corresponding to the frame t) in the maximum likelihood state series.

FIG. 10D shows the state correspondence image information generated by the state correspondence image information generation unit 35.

In FIG. 10D, the frame that corresponds to the state of which the state ID is "1" is selected in the maximum likelihood state series illustrated in FIG. 10C, and movie and the image series are generated as the state correspondence image information that corresponds to the state ID.

Figure 11:
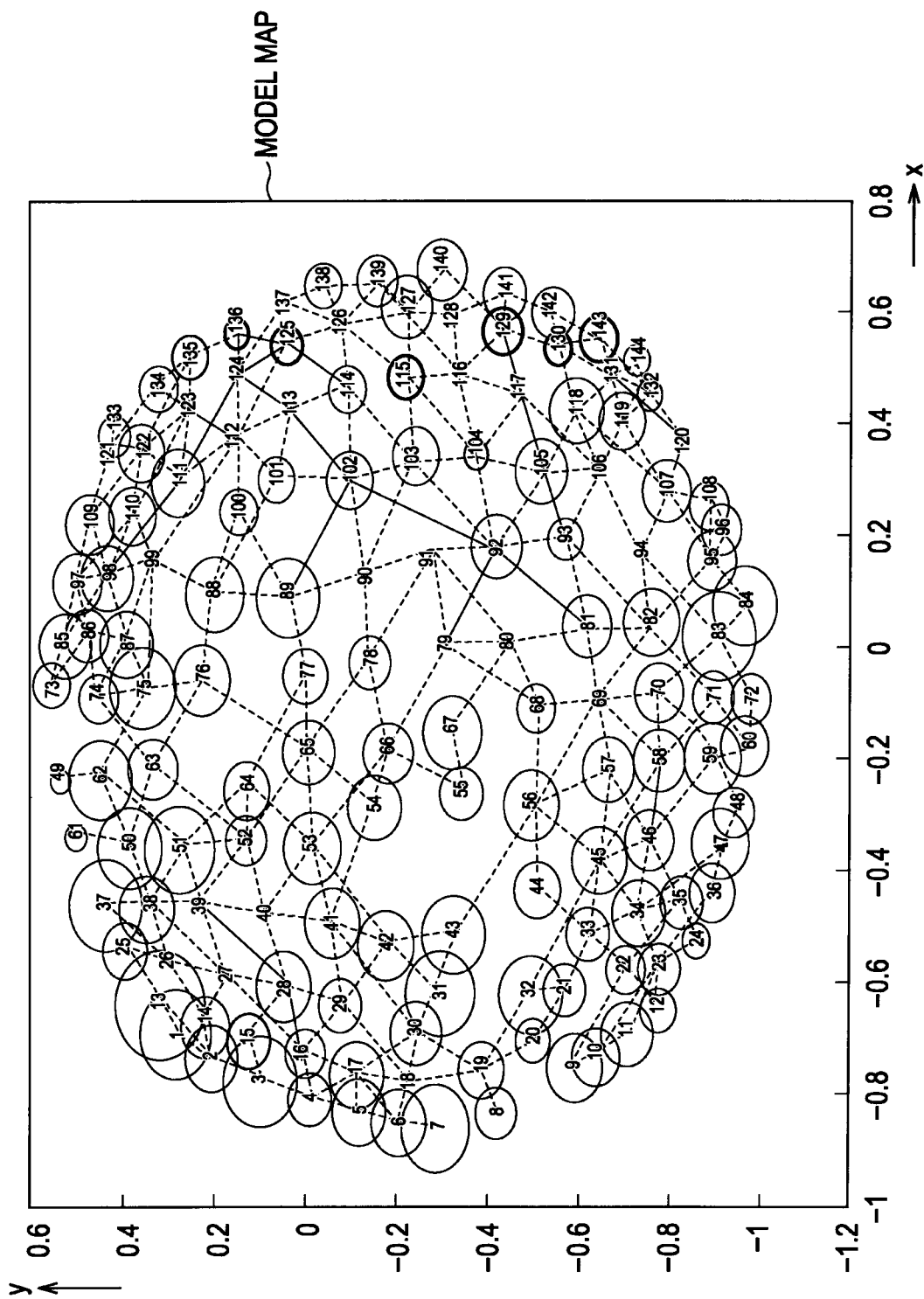
FIG. 11 is a diagram illustrating an example of a model map.

FIG. 11 is a diagram illustrating an example of a model map portrayed by the map portrayal unit 38 illustrated in FIG. 9.

In the model map of FIG. 11, an ellipse indicates the state, and a line segment connecting between ellipses indicates a line segment. Also, a numeral annexed to the ellipse indicates the state ID of the state that is indicated by the ellipse.

As described above, the model map portrayal unit 38 portrays (the graphics of) the model map in which (the image of) the corresponding state $s_i$ is arranged in a position of the state coordinates $Y_i$ obtained by the coordinate calculation unit 37.

Also, the map portrayal unit 38 portrays the line segment connecting between the states on the model map according to the state transition probability between the states. That is, the map portrayal unit 38 portrays the line segment connecting between the states $s_i$ and $s_j$ if the state transition from a state $s_i$ to another state $s_j$ is larger than a predetermined threshold value.

In the model map, the states may be portrayed with emphasis.

That is, in the model map, the state $s_i$ may be portrayed by a circle or an ellipse, and the circle that indicates the state $s_i$, for example, may be portrayed by changing its radius or color according to the dispersion of the Gaussian distribution as a probability distribution function that becomes the observation probability $b_i(o)$ of the state $s_i$.

Also, the line segment that connects between the states on the model map according to the state transition probability between the states may be portrayed by changing the width or color of the line segment according to the size of the state transition probability.

In this case, the method of portraying the state with emphasis is not limited to the above-described portraying. Also, the emphasis of the state may not be performed.

However, in the case in which the coordinate calculation unit 37 of FIG. 9 obtains the state coordinates $Y_i$ on the model map so as to minimize the error function E, through adopting of the error function E in Equation (1) as it is, the (ellipse indicating the) state is arranged in a circle on the model map as illustrated in FIG. 11.

In this case, the states are formed in close order in the neighborhood (i.e. outside) of the circumference of the model map to make it difficult to look up the arrangement of the states, and thus the visibility may deteriorate.

Accordingly, the coordinate calculation unit 37 of FIG. 9 may obtain the state coordinates $Y_i$ on the model map by correcting the error function E in Equation (1) so as to minimize the error function E after correction.

That is, the coordinate calculation unit 37 determines whether the Euclid distance is larger than the predetermined threshold value THd (e.g. THd=1.0).

If the Euclid distance $d_{ij}$ is not larger than the predetermined threshold value THd, the coordinate calculation unit 37 uses the Euclid distance $d_{ij}$ as it is in operating the error function of Equation (1).

On the other hand, if the Euclid distance $d_{ij}$ is larger than the predetermined threshold value THd, the coordinate calculation unit 37 uses the inter-state distance $d_{ij}^*$ as the Euclid distance $d_{ij}$ (i.e. $d_{ij}=d_{ij}^*$) (the Euclid distance $d_{ij}$ is made to be the same distance as the inter-state distance $d_{ij}^*$) in operating the error function of Equation (1).

In this case, if it is observed that the Euclid distance $d_{ij}$ is between the two states $s_i$ and $s_j$ which are somewhat close to each other (i.e. which is not larger than the threshold value THb) in the model map, the state coordinates $Y_i$ and $Y_j$ are changed so that the Euclid distance $d_{ij}$ and the inter-state distance $d_{ij}^*$ coincide with each other (i.e. the Euclid distance $d_{ij}$ approximates the inter-state distance $d_{ij}^*$).

On the other hand, if it is observed that the Euclid distance $d_{ij}$ is between the two states $s_i$ and $s_j$ which are somewhat far apart from each other (i.e. which is larger than the threshold value THb) in the model map, the state coordinates $Y_i$ and $Y_j$ are not changed.

As a result, if the Euclid distance $d_{ij}$ is between the two states $s_i$ and $s_j$ which are somewhat far apart from each other, the Euclid distance $d_{ij}$ is kept long, and thus it is prevented that the states are formed in close order in the neighborhood of the circumference of the model map as shown in FIG. 11 to deteriorate the visibility.

Figure 12:
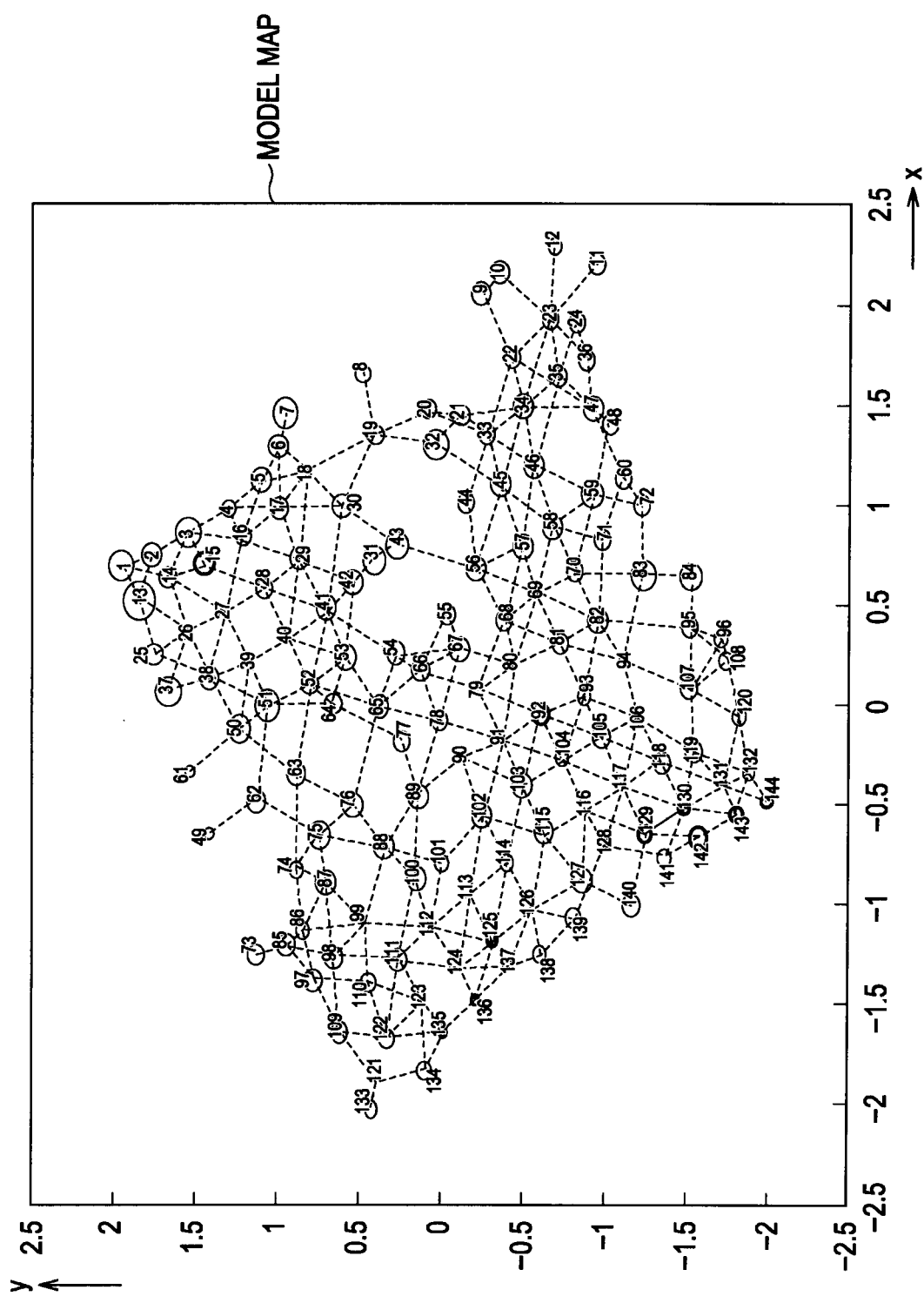
FIG. 12 is a diagram illustrating an example of a model map.

FIG. 12 is a diagram illustrating an example of a model map obtained using the error function E after correction.

According to the model map of FIG. 12, it can be confirmed that the states are not formed in closed order in the neighborhood of the circumference of the model map.

[Content Structure Presentation Processing]

Figure 13:
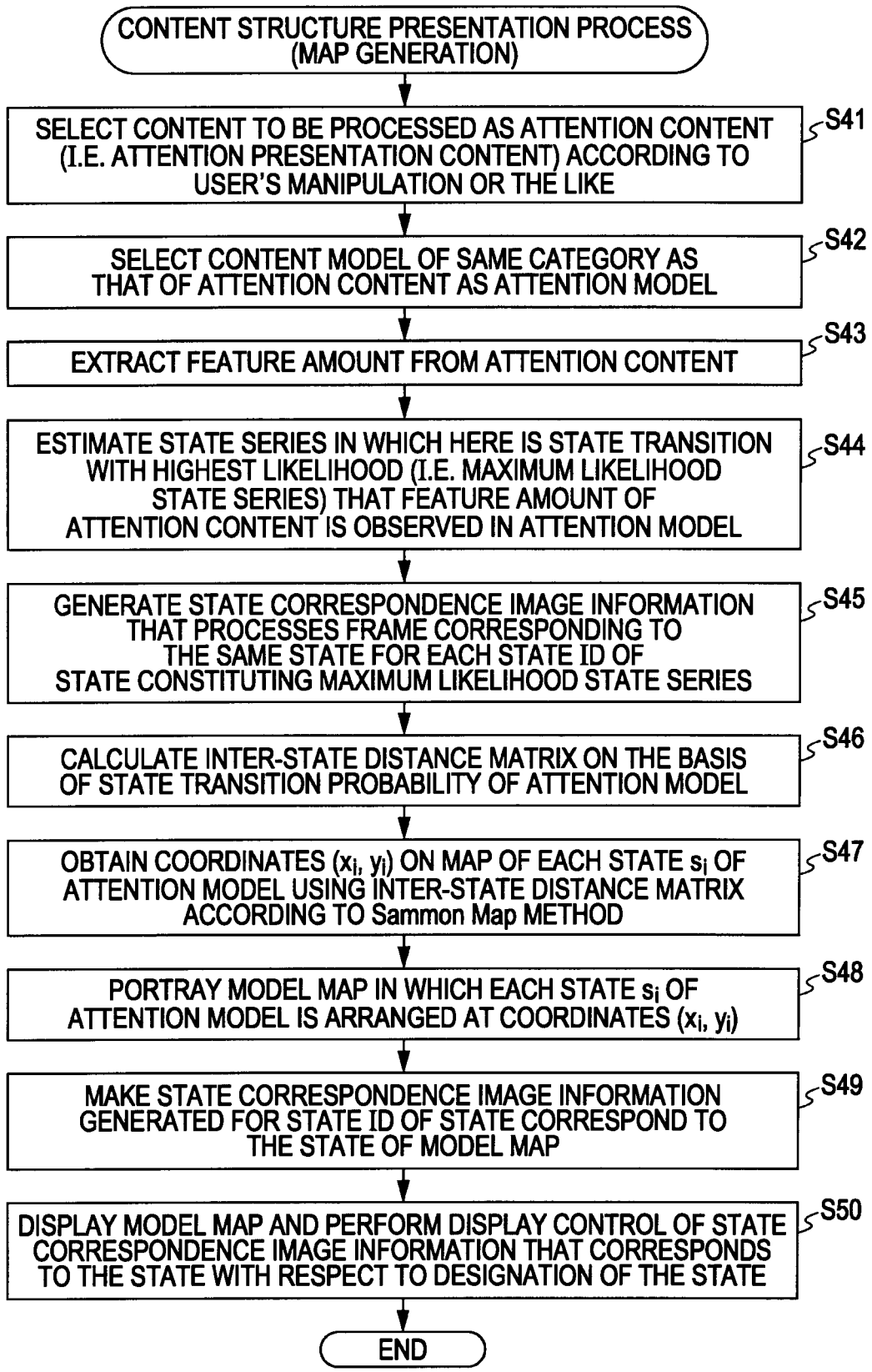
FIG. 13 is a flowchart illustrating the content structure presentation processed by a content structure presentation unit.

FIG. 13 is a flowchart illustrating the content structure presentation processed by the content structure presentation unit 14 of FIG. 9.

In step S41, the content selection unit 31, for example, according to a user's manipulation, selects the attention content (i.e. attention presentation content) among the content stored in the content storage unit 11.

The content selection unit 31 provides the attention content to the feature amount extraction unit 33 and the state correspondence image information generation unit 35. Also, the content selection unit 31 recognizes and provides the category of the attention content to the model selection unit 32, and proceeds from step S41 to step S42.

In step S42, the model selection unit 32 selects the content model that corresponds to the category of the attention content provided from the content selection unit 31 among the content model stored in the model storage unit 13 as the attention model.

Then, the model selection unit 32 provides the attention model to the maximum likelihood state series estimation unit 34 and the inter-state distance calculation unit 36, and proceeds from step S42 to step S43.

In step S43, the feature amount extraction unit 33 extracts the feature amounts of the respective frames of the attention content provided from the content selection unit 31, and provides the (time series) feature amounts of the respective frames of the attention content to the maximum likelihood state series estimation unit 34, and proceeds to step S44.

In step S44, the maximum likelihood state series estimation unit 34 estimates the maximum likelihood state series (i.e. the maximum likelihood state series of the attention mode for the attention content) from which the feature amount of the attention content provided from the feature amount extraction unit 33 is observed in the attention model provided from the model selection unit 32.

Then, the maximum likelihood state series estimation unit 34 provides the maximum likelihood state series of the attention model for the attention content to the state correspondence image information generation unit 35, and proceeds from step S44 to step S45.

In step S45, the state correspondence image information generation unit 35 selects a frame that corresponds to the same state for each state ID of the state constituting the maximum likelihood state series (i.e. series of the state ID) provided from the maximum likelihood state series estimation unit 34, among the attention content provided from the content selection unit 31.

Further, the state correspondence image information generation unit 35 stores the frame that corresponds to the state of the state ID by making the frame correspond to the state ID. Also, the state correspondence image information generation unit 35 generates the state correspondence image information by processing the frame corresponding to the state ID.

The state correspondence image information generation unit 35 provides the state correspondence image information that corresponds to the state ID to the map portrayal unit 38, and proceeds from step S45 to step S46.

In step S46, the inter-state distance calculation unit 36 obtains the inter-state distance $d_{ij}^*$ between one state $s_i$ and another state $s_j$ of the attention model provided from the model selection unit 32 on the basis of the state transition probability $a_{ij}$. Once the inter-state distance $d_{ij}^*$ between one state $s_1$ and another state $s_j$ of N states of the attention model is obtained, the inter-state distance calculation unit 36 provides an inter-state distance matrix which has the inter-state distance $d_{ij}^*$ as its component to the coordinate calculation unit 37, and proceeds from step S46 to step S47.

In step S47, the coordinate calculation unit 37 obtains the state coordinates $Y_i=(x_i, y_i)$ so as to minimize the error function E in Equation (1) that is the statistical error between the Euclid distance $d_{ij}$ from one state $s_i$ to another state $s_j$ on the model map and the inter-state distance $d_{ij}^*$ of the inter-state distance matrix provided from the inter-state distance calculation unit 36.

Then, the coordinate calculation unit 37 provides the state coordinates $Y_i=(x_i, y_i)$ to the map portrayal unit 38, and proceeds from step S47 to step S48.

In step S48, the map portrayal unit 38 portrays, for example, (graphics of) a two-dimensional (2D) model map in which (the image of) the state $s_i$ that corresponds to the position of the state coordinates $Y_i=(x_i, y_i)$ provided from the coordinate calculation unit 37 is arranged. Also, the map portrayal unit 38 portrays a line segment that connects between the states of which the state transition probability is equal to or larger than a predetermined threshold value on the model map, and proceeds from step S48 to step S49.

In step S49, the map portrayal unit 38 links the state $s_i$ on the model map and the state correspondence image information that corresponds to the state ID of the state $s_i$ among the state correspondence image information provided from the state correspondence image information generation unit 35 to provide the model map to the display control unit 39, and proceeds to step S50.

In step S50, the display control unit 39 performs the display control to display the model map provided from the map portrayal unit 38 on a display (not illustrated).

Further, the display control unit 39 performs the display control (i.e. playback control) that displays the state correspondence image information corresponding to the state ID of the state on the model map with respect to the designation of the state according to the user's manipulation.

That is, if the user performs the manipulation for designating the state on the model map, the display control unit 39 displays the state correspondence image information that is linked to the state on a display (not illustrated) separately from the model map.

Accordingly, the user can confirm the image of the frame that corresponds to the state on the model map.

[Configuration Example of a Digest Generation Unit 15]

Figure 14:
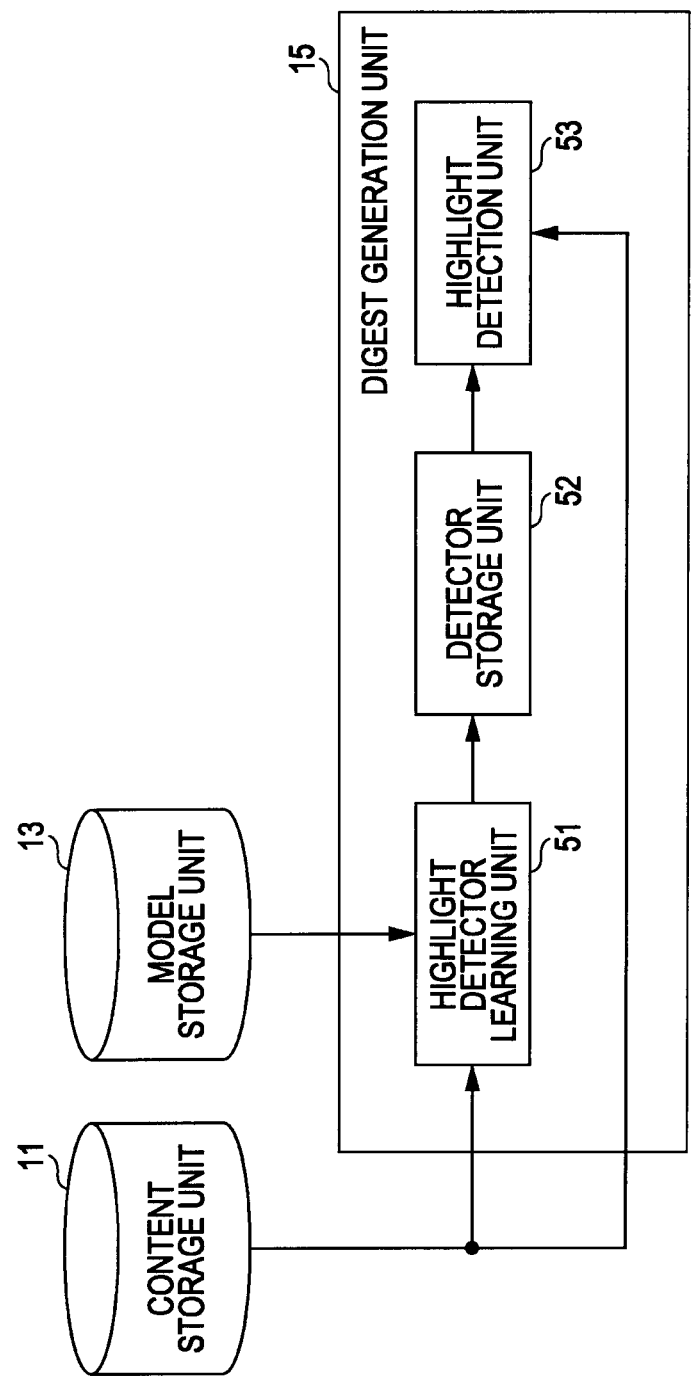
FIG. 14 is a block diagram illustrating a configuration example of a digest generation unit.

FIG. 14 is a block diagram illustrating a configuration example of the digest generation unit 15 of FIG. 1.

The digest generation unit 15 includes a highlight detection learning unit 51, a detector storage unit 52, and a highlight detection unit 53.

The highlight detector learning unit 51 performs learning of the highlight detector which is a model for detecting a scene that is of interest to a user as a highlight scene using content stored in the content storage unit 11 and a content model stored in the model storage unit 13.

The highlight detector learning unit 51 provides the highlight detector after the learning to the detector storage unit 52.

Here, as a model of the highlight detector, in the same manner as the content model, a HMM, which is one of state transition probability models, may be used.

The detector storage unit 52 stores the highlight detector provided from the highlight detector learning unit 51.

The highlight detection unit 53 detects frames of the highlight scene from the content stored in the content storage unit 11 using the highlight detector stored in the detector storage unit 52. Also, the highlight detection unit 53 generates digest content that is a digest of the content stored in the content storage unit 11 using the frames of the highlight scene.

[Configuration Example of a Highlight Detector Learning Unit 51]

Figure 15:
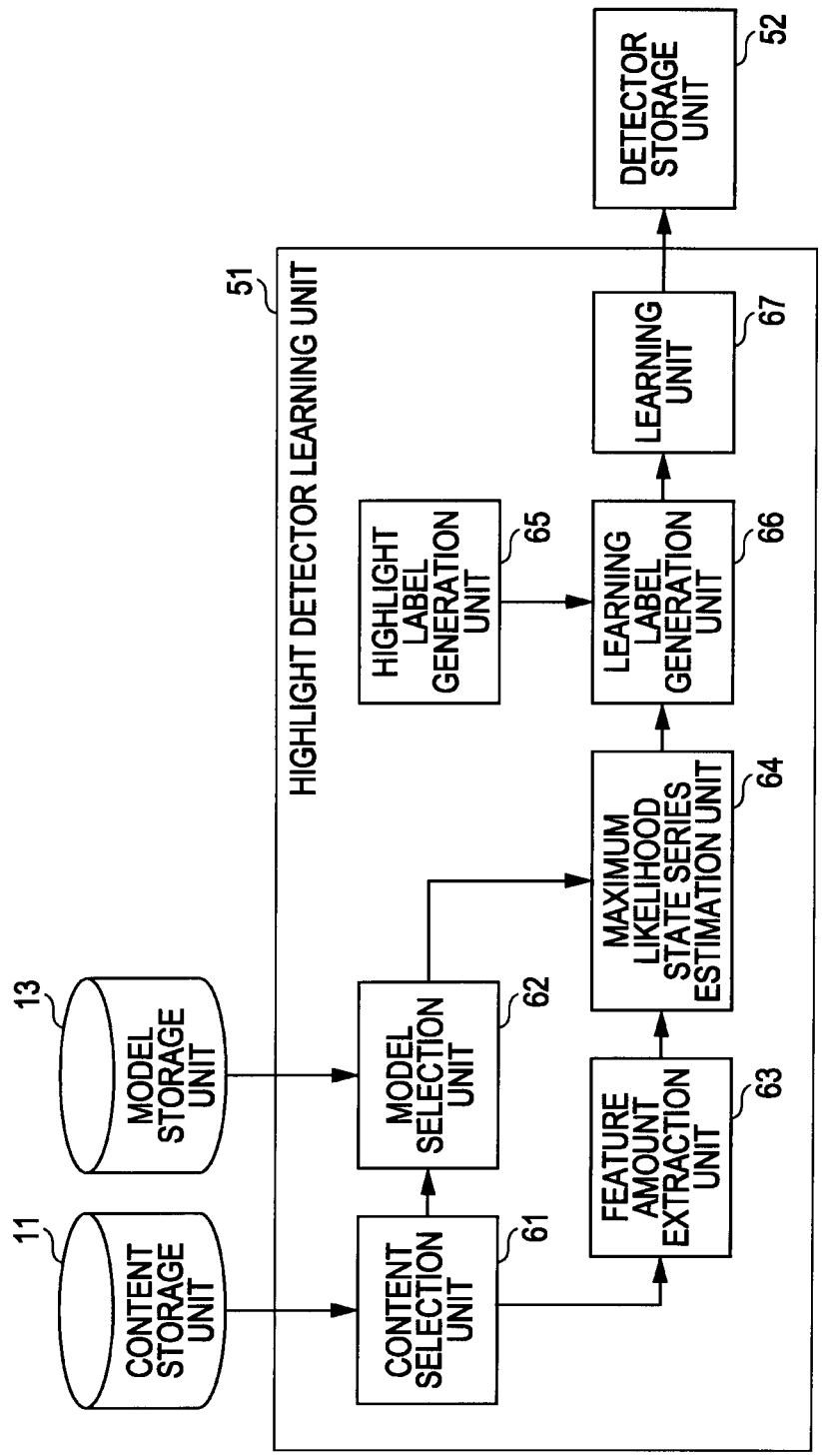
FIG. 15 is a block diagram illustrating a configuration example of a highlight detector learning unit.

FIG. 15 is a block diagram illustrating a configuration example of a highlight detector learning unit 51 of FIG. 14.

In FIG. 15, the highlight detector learning unit 51 includes a content selection unit 61, a model selection unit 62, a feature amount extraction unit 63, a maximum likelihood state series estimation unit 64, a highlight label generation unit 65, a learning label generation unit 66, and a learning unit 67.

The content selection unit 61, for example, in accordance with a user's manipulation, selects the content used for the learning of the highlight detector among the content stored in the content storage unit 11 as an attention detector learning content (hereinafter simply referred to as "attention content").

That is, the content selection unit 61, for example, selects the content designated by the user to be played among the content, e.g. record-completed programs, stored in the content storage unit 11 as the attention content.

Then, the content selection unit 61 provides the attention content to the feature amount extraction unit 63, and recognizes and provides the category of the attention content to the model selection unit 62.

The model selection unit 62 selects the content model that corresponds to the category of the attention content provided from the content selection unit 61 among the content models stored in the model storage unit 13 as the attention model, and provides the selected content model to the maximum likelihood state series estimation unit 64.

The feature amount extraction unit 63 extracts the feature amounts of the respective frames of the attention content provided from the content selection unit 61 in the same manner as the feature amount extraction unit 22 of FIG. 2, and provides the (time series of the) feature amounts of the respective frames of the attention content to the maximum likelihood state series estimation unit 64.

The maximum likelihood state series estimation unit 64 estimates the maximum likelihood state series (i.e. the maximum likelihood state series of the attention model for the attention content) which is the state series where there is a state transition with a highest likelihood that the (time series) of the feature amounts of the attention content provided from the feature amount extraction unit 63 is observed in the attention model provided from the model selection unit 62 in the same manner as the maximum likelihood state series estimation unit 34 of FIG. 9.

Then, the maximum likelihood state series estimation unit 64 provides the maximum likelihood state series of the attention model for the attention content to the learning label generation unit 66.

The highlight label generation unit 65 generates highlight label series with respect to the attention content by labeling each frame of the attention content selected by the content selection unit 61 a highlight label that indicates whether the scene is the highlight scene according to a user's manipulation.

That is, the attention content selected by the content selection unit 61 is the content that the user has designated as the subject of playback as described above, and the image of the attention content is displayed on a display (not illustrated) (simultaneously with this, the audio is output from a speaker (not illustrated)).

When an interesting scene is display on the display, the user may input the object of the interesting scene by manipulating a remote commander (not illustrated) or the like, and the highlight label generation unit 65 generates the highlight label according to the user's manipulation.

Specifically, if it is assumed that the user's manipulation when the user inputs the object of the interesting scene is denoted as a favorable manipulation, the highlight label generation unit 65 generates the highlight label which indicates that the frame does not correspond to the highlight scene, e.g. which has a value of "0", with respect to the frame that does not correspond to the favorable manipulation.

Also, the highlight label generation unit 65 generates the highlight label which indicates that the frame corresponds to the highlight scene, e.g. which has a value of "1", with respect to the frame that corresponds to the favorable manipulation.

The highlight label generation unit 65 provides the highlight label series that is the time series of the highlight label generated for the attention content to the learning label generation unit 66.

The highlight label generation unit 66 generates the state ID series that is the maximum likelihood state series of the attention model for the attention content (i.e. the maximum likelihood state series obtained from the maximum likelihood state series estimation unit 64) provided from the maximum likelihood state series estimation unit 64 and the learning label series that is a pair to the highlight label series provided from the highlight label generation unit 65.

That is, the learning label generation unit 66 generates the state ID that is the maximum likelihood state series provided from the maximum likelihood state series estimation unit 64, the state ID at time t (i.e. the state ID of the state that corresponds to the frame t) in the highlight label series provided from the highlight label generation unit 65, and multi-stream learning label series that is a pair to the highlight label (i.e. the highlight label to the frame t).

Then, the learning label generation unit 66 provides the learning label series to the learning unit 67.

The learning unit 67 performs the learning of the highlight detector that is the ergodic type multi-stream HMM in Baum-Welch re-estimation method using the learning label series provided from the learning label generation unit 66.

Then, the learning unit 67 makes the highlight detector after the learning correspond to the category of the attention content selected by the content selection unit 61, and stores the highlight detector in the storage unit 52.

Here, the highlight label obtained from the highlight label generation unit 65 is a label (i.e. symbol) having two discrete values of "0" and "1". Also, the maximum likelihood state series obtained from the attention content in the maximum likelihood state series estimation unit 64 is the state ID series having discrete values.

Accordingly, the learning label series generated as a pair to the highlight label and the maximum likelihood state series in the learning label generation unit 66 is also the time series of discrete values. Since the learning label series has the discrete values, the observation probability $b_j(o)$ of the HMM that is the highlight detector in the learning unit 67 becomes just the probability value itself.

In the multi-stream HMM, with respect to the respective series (i.e. streams) that constitute the multi-stream (hereinafter referred to as "constituent element series), a weight value (hereinafter referred to as "series weight value") which is a degree of influence of the constituent element series of the multi-stream upon the multi-stream HMM in the multi-stream HMM.

By setting a large series weight value with respect to the important constituent element series during the learning of the multi-stream HMM or during the recognition using the multi-stream HMM (i.e. during the obtaining of the maximum likelihood state series), prior knowledge can be provided to prevent the learning result of the multi-stream HMM from falling into a local solution.

The details of the multi-stream HMM are described in Tamura Satoshi, Iwano Cozy, Hurui Teihiroshi, "Study of Multi-modal Audio Recognition using Optical Flow", Acoustical Society of Japan, 2001 Autumn Lecture Notes, 1-1-14, pp. 27-28(2001-10).

In the above-mentioned literature, use examples of a multi-stream HMM in an audio-visual speech recognition field have been introduced. That is, when the SN (Signal to Noise) ratio of audio is low, the learning and recognition are performed so that video exerts a greater influence than that of audio through lowering of the series weight value of the feature amount series of audio.

The point that the multi-stream HMM is different from the HMM using a single series is that the observation probability $b_j(o_{[1]}, o_{[2]}, \ldots, o_{[M]})$ of the whole multi-stream is calculated by giving preset series weight values $W_m$ to the observation probability $b_{[m]j}(o_{[m]})$ of the respective constituent element series $o_{[m]}$ constituting the multi-stream as shown in Equation (2).

$$b_j(o_{[1]}, o_{[2]}, \ldots, o_{[M]}) = \prod_{m=1}^{M} b_{[m]j}(o_{[m]})^{W_m}, \qquad (2)$$

where $$W_m \geq 0, \sum_{m=1}^{M} W_m = 1$$

In Equation (2), M denotes the number of constituent element series $o_{[m]}$ (i.e. the number of streams) constituting the multi-stream, and $W_m$ denotes a series weight value of the m-th constituent element series $o_{[m]}$ among M constituent element series constituting the multi-stream.

The learning label series that is the multi-stream used for learning in the learning unit 67 of FIG. 15 is composed of two constituent element series: the state ID series $o_{[v]}$ and the highlight label series $o_{[HL]}$.

In this case, the observation probability $b_j(o_{[v]}, o_{[HL]})$ of the learning label series is expressed as in Equation (3).

$$b_j(o_{[v]}, o_{[HL]}) = (b_{[v]j}(o_{[v]}))^W \times (b_{[HL]j}(o_{[HL]}))^{1-W} \quad (3)$$

In Equation (3), $b_{[v]j}(o_{[v]})$ denotes the observation probability of the series $o_{[v]}$ of the state ID (i.e. the observation probability that the observed value $o_{[v]}$ is observed in state $s_j$), and $b_{[HL]j}(o_{[HL]})$ denotes the observation probability of the highlight label series $o_{[HL]}$. Also, W denotes the series weight value of the series $o_{[v]}$ of the state ID, and 1−W denotes the series weight value of the highlight label series $o_{[HL]}$.

In this case, in learning the HMM as the highlight detector, the series weight value W may be, for example, 0.5.

Figure 16:
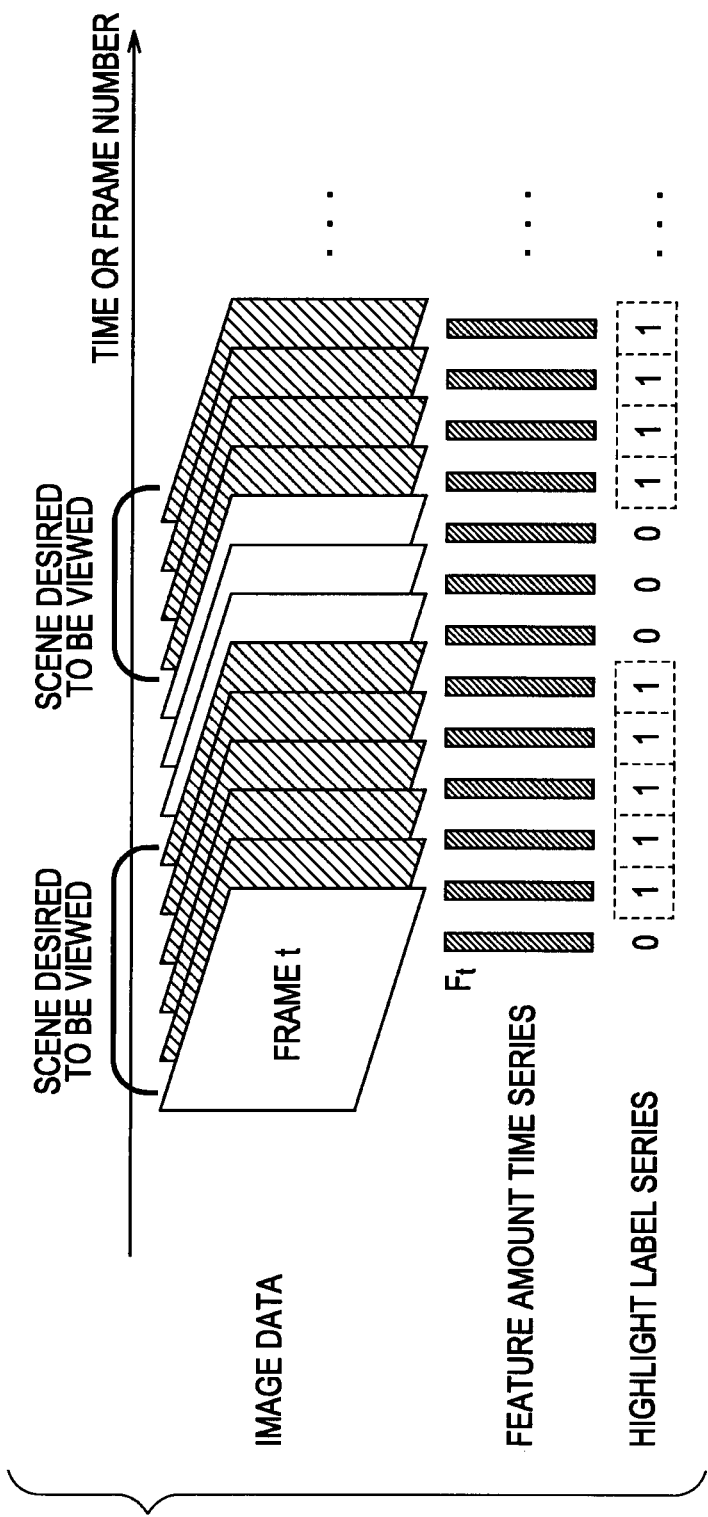
FIG. 16 is a diagram illustrating the processing of a highlight label generation unit.

FIG. 16 is a diagram illustrating the processing of a highlight label generation unit 65 in FIG. 15.

The highlight label generation unit 65 generates the highlight label which indicates that the frame does not correspond to the highlight scene, e.g. which has a value of "0", with respect to the frame (i.e. time) of the attention content that does not correspond to the user's favorable manipulation. Also, the highlight label generation unit 65 generates the highlight label which indicates that the frame corresponds to the highlight scene, e.g. which has a value of "1", with respect to the frame of the attention frame that corresponds to the user's favorable manipulation.

[Highlight Detector Learning Processing]

Figure 17:
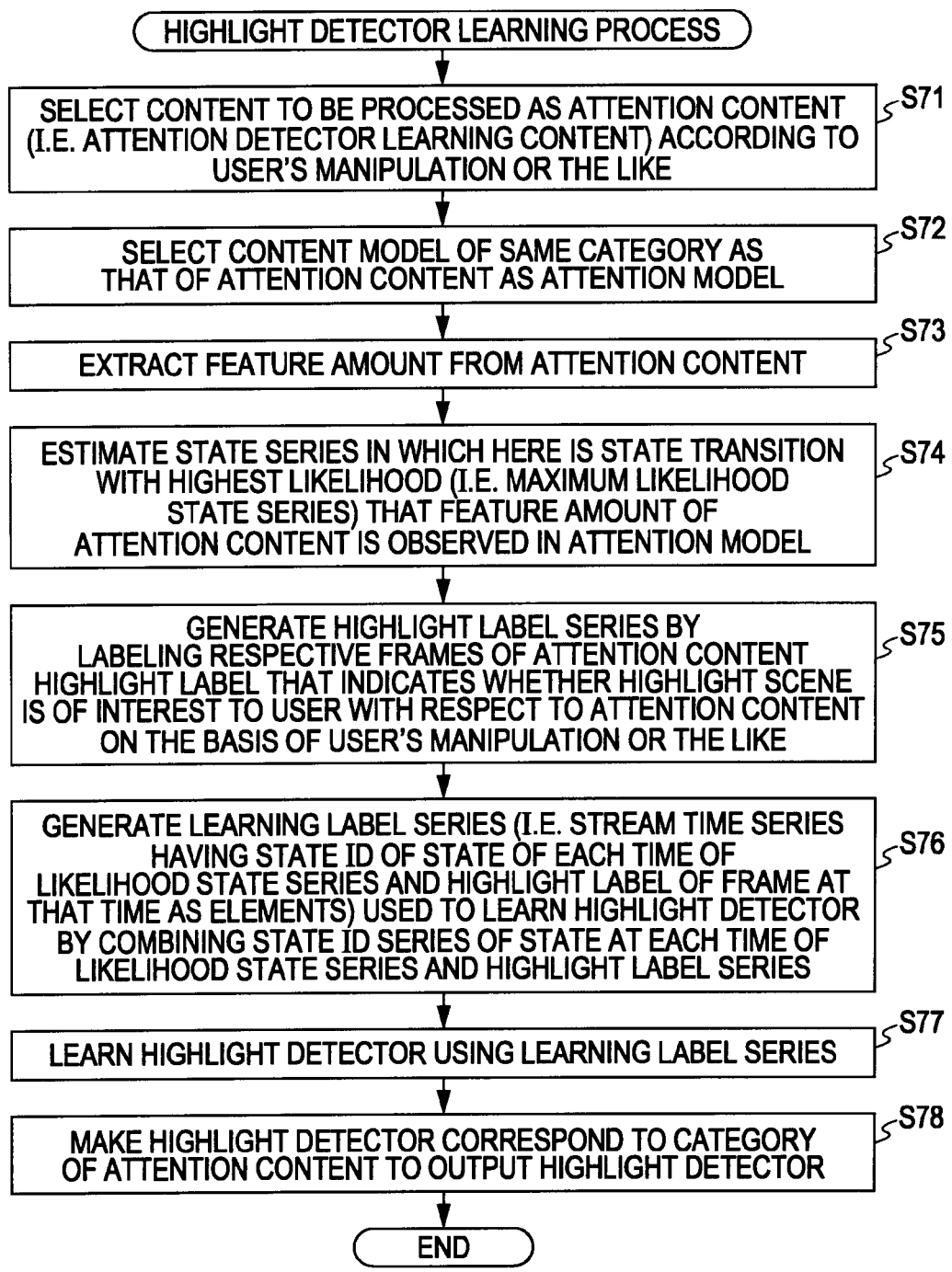
FIG. 17 is a flowchart illustrating the highlight detector learning processed by a highlight detector learning unit.

FIG. 17 is a flowchart illustrating the processing (i.e. the highlight detector learning processing) performed by a highlight detector learning unit 51 in FIG. 15.

In step S71, the content selection unit 61, for example, selects the content of which the playback is designated in accordance with a user's manipulation among the content stored in the content storage unit 11 as attention content (i.e. attention detector learning content).

Then, the content selection unit 61 provides the attention content to the feature amount extraction unit 63, recognizes and provides the category of the attention content to the model selection unit 62, and proceeds from step S71 to S72.

In step S72, the model selection unit 62 selects the content model that corresponds to the category of the attention content provided from the content selection unit 61 among the content models stored in the model storage unit 13 as the attention model.

The model selection unit 62 provides the attention model to the maximum likelihood state series estimation unit 64, and proceeds from step S72 to step S73.

In step S73, the feature amount extraction unit 63 extracts the feature amounts of the respective frames of the attention content provided from the content selection unit 61, provides the (time series of the) feature amounts of the respective frames of the attention content to the maximum likelihood state series estimation unit 64, and proceeds to step S74.

In step S74, the maximum likelihood state series estimation unit 64 estimates the maximum likelihood state series (i.e. the maximum likelihood state series of the attention model for the attention content) which is the state series where the state transition having the highest likelihood occurs and from which the (time series) of the feature amounts of the attention content provided from the feature amount extraction unit 63 is observed in the attention model provided from the model selection unit 62.

Then, the maximum likelihood state series estimation unit 64 provides the maximum likelihood state series of the attention model for the attention content to the learning label generation unit 66, and proceeds from step S74 to step S75.

In step S75, the highlight label generation unit 65 generates the highlight label series with respect to the attention content by labeling each frame of the attention content selected by the content selection unit 61 a highlight label according to a user's manipulation.

The highlight label generation unit 65 provides the highlight label series generated for the attention content to the learning label generation unit 66, and proceeds to step S76.

In step S76, the learning label generation unit 66 generates the state ID series that is the maximum likelihood state series of the attention model for the attention content from the maximum likelihood state series estimation unit 64 and the learning label series that is a pair to the highlight label series provided from the highlight label generation unit 65.

Then, the learning label generation unit 66 provides the learning label series to the learning unit 67, and proceeds from step S76 to step S77.

In step S77, the learning unit 67 performs the learning of the highlight detector that is the HMM using the learning label series provided from the learning label generation unit 66, and proceeds to step S78.

In step S78, the learning unit 67 makes the highlight detector after the learning correspond to the category of the attention content selected by the content selection unit 61, and stores the highlight detector in the storage unit 52.

As described above, the highlight detector is obtained by performing the learning of the HMM using the state ID series that is the maximum likelihood state series of the attention model for the attention content and the learning label series that is a pair to the highlight label series generated according to the user's manipulation.

Accordingly, by referring to the observation probability $b_{[HL]j}(o_{[HL]})$ of the highlight label series $o_{[HL]}$ of the respective states of the highlight detector, it can be determined whether the frame corresponding to the state is the scene (i.e. the highlight scene) that is of interest to the user.

[Configuration Example of a Highlight Detection Unit 53]

Figure 18:
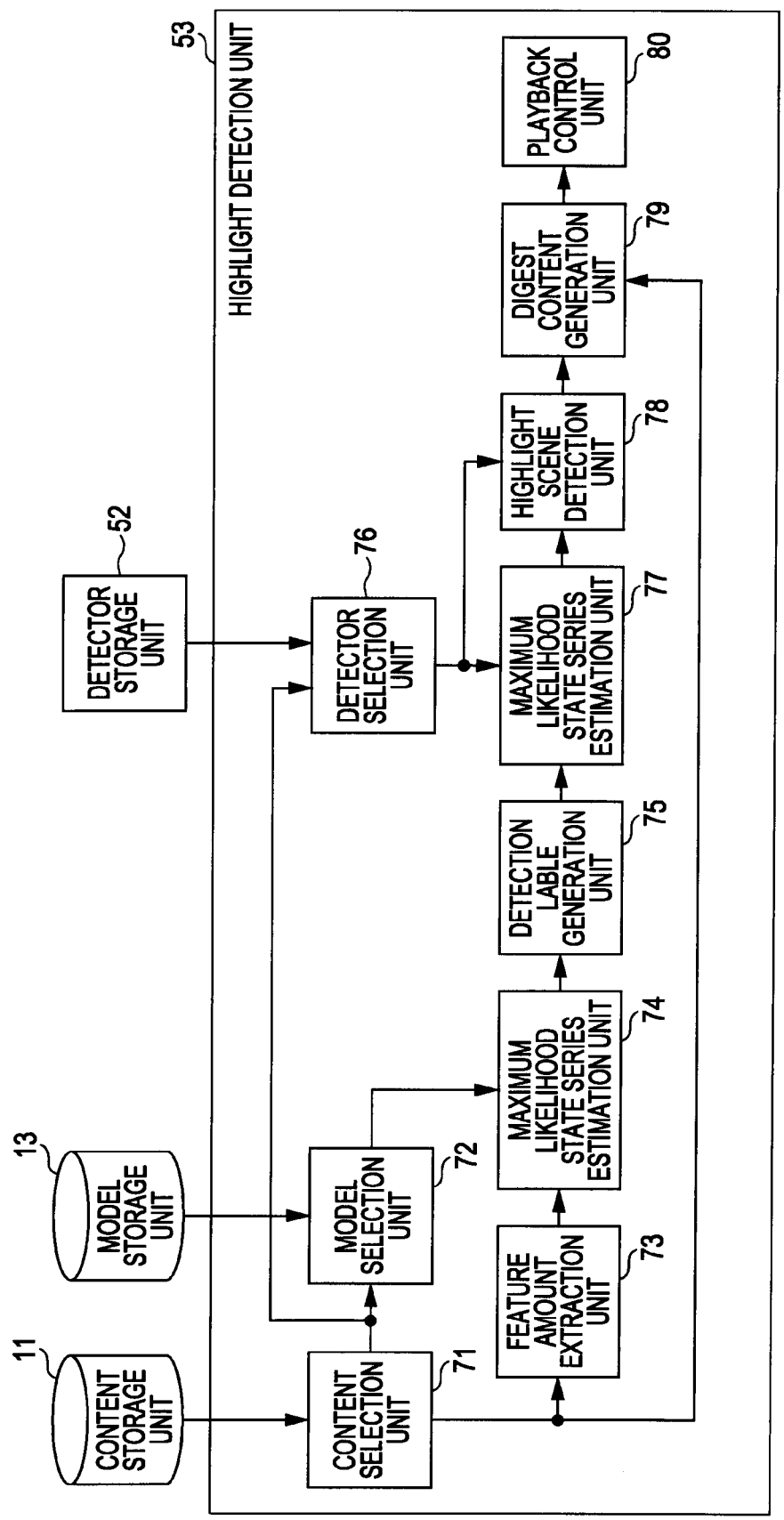
FIG. 18 is a block diagram illustrating a configuration example of a highlight detection unit.

FIG. 18 is a block diagram illustrating a configuration example of a highlight detection unit 53 of FIG. 14.

In FIG. 18, the highlight detection unit 53 includes a content selection unit 71, a model selection unit 72, a feature amount extraction unit 73, a maximum likelihood state series estimation unit 74, a detection label generation unit 75, a maximum likelihood state series estimation unit 77, a highlight scene detection unit 78, a digest content generation unit 79, and a playback control unit 80.

The content selection unit 71, for example, in accordance with a user's manipulation, selects the attention highlight detection content (hereinafter referred simply to as "attention content") that is the content for which the highlight scene is detected among the content stored in the content storage unit 11.

That is, the content selection unit 71, for example, as the content generating the digest, selects the content designated by the user as the attention content. Also, the content selection unit 71, for example, selects certain content among content of which the digest has not yet been generated as the attention content.

If the attention content is selected, the content selection unit 71 provides the attention content to the feature amount extraction unit 73, and recognizes and provides the category of the attention content to the model selection unit 72 and the detector selection unit 76.

The model selection unit 72 selects the content model that corresponds to the category of the attention content provided from the content selection unit 71 among the content models stored in the model storage unit 13 as the attention model, and provides the selected content model to the maximum likelihood state series estimation unit 74.

The feature amount extraction unit 73 extracts the feature amounts of the respective frames of the attention content provided from the content selection unit 71, in the same manner as the feature extraction unit 22 of FIG. 2 and provides the (time series of the) feature amounts of the respective frames of the attention content to the maximum likelihood state series estimation unit 74.

The maximum likelihood state series estimation unit 74 estimates the maximum likelihood state series (i.e. the maximum likelihood state series of the attention model for the attention content) which is the state series where there is a state transition with a highest likelihood that the (time series) of the feature amounts of the attention content provided from the feature amount extraction unit 73 is observed in the attention model provided from the model selection unit 72 in the same manner as the maximum likelihood state series estimation unit 34 of FIG. 9.

Then, the maximum likelihood state series estimation unit 74 provides the maximum likelihood state series of the attention model for the attention content to the learning label generation unit 75.

The detection label generation unit 75 generates the state ID series that is the maximum likelihood state series (i.e. the maximum likelihood state series obtained from the attention content) of the attention model for the attention content provided from the maximum likelihood state series estimation unit 74 and the detection label series that is a pair to the highlight label series of the highlight label indicating that the scene is not the highlight scene (or that the scene is the highlight scene).

That is, the detection label generation unit 75 generates as a dummy series and provides the highlight label series with the same length (i.e. the length of the series) as that of the maximum likelihood state series provided from the maximum likelihood state series estimation unit 74 to the highlight detector as the highlight label series of only the highlight label indicating that the scene is not the highlight scene.

Further, the detection label generation unit 75 generates the state ID that is the maximum likelihood state series provided from the maximum likelihood state series estimation unit 74, the state ID at time t (i.e. the state ID of the state that corresponds to the frame t) in the highlight label series as the dummy series, and the multi-stream learning label series that is a pair to the highlight label (i.e. the highlight label for the frame t (here, the highlight label indicating that the scene is not the highlight scene)).

Then, the detection label generation unit 75 provides the detection label series to the maximum likelihood state series estimation unit 77.

The detection unit selection unit 76 selects the highlight detector that corresponds to the category of the attention content provided from the content selection unit 71 among the highlight detectors stored in the detector storage unit 52 as the attention detector. Then, the detector selection unit 76 acquires the attention detector among the highlight detectors stored in the detector storage unit 52, and provides the acquired attention detector to the maximum likelihood state series estimation unit 77 and the highlight scene detection unit 78.

The maximum likelihood state series estimation unit 77, for example, in accordance with a Viterbi algorithm, estimates the maximum likelihood state series (hereinafter referred to as "highlight relation state series") which is the state series where there is a state transition with a highest likelihood that the detection label series provided from the detection label generation unit 75 is observed in the HMM that is the attention detector provided from the detector selection unit 76.

Then, the maximum likelihood state series estimation unit 77 provides the highlight relation state series to the highlight scene detection unit 78.

In this case, the detection label series is a multi-stream composed of the series $o_{[V]}$ of the state ID that is the maximum likelihood state series of the attention model for the attention content and the highlight label series $o_{[HL]}$ as the dummy series, and in estimating the highlight relation state series, the observation probability $b_j(o_{[V]}, o_{[HL]})$ of the detection label series is obtained by Equation (3) in the same manner as the learning label series.

However, when the observation probability $b_j(o_{[V]}, o_{[HL]})$ of the detection label series is obtained, 1.0 is used as the series weight value W of the series $o_{[V]}$ of the state ID. In this case, the series weight value 1−W of the highlight label series $o_{[HL]}$ becomes 0.0. Accordingly, the maximum likelihood state series estimation unit 77 estimates the highlight relation state series in consideration of only the maximum likelihood state series of the attention model for the attention content, without considering the highlight label series input as the dummy series.

The highlight scene detection unit 78 recognizes the observation probability $b_{[HL]j}(o_{[HL]})$ of the highlight label $o_{[HL]}$ of the respective states of the maximum likelihood state series (i.e. the highlight relation state series) obtained from the detection label series provided from the maximum likelihood state series estimation unit 77 by referring to the attention detector provided from the detector selection unit 76.

Further, the highlight scene detection unit 78 detects the frames of the highlight scene from the attention content on the basis of the observation probability $b_{[HL]j}(o_{[HL]})$ of the highlight label $o_{[HL]}$.

That is, in the state $s_j$ at time t of the highlight relation state series, if a difference $b_{[HL]j}(o_{[HL]}="1")-b_{[HL]j}(o_{[HL]}="0")$ between the observation probability $b_{[HL]j}(o_{[HL]}="1")$ of the highlight label indicating that the scene is the highlight scene and the observation probability $b_{[HL]j}(o_{[HL]}="0")$ of the highlight label indicating that the scene is not the highlight scene is larger than the predetermined threshold value THb (e.g. THb=0), the highlight scene detection unit 78 detects the frame t of the attention content that corresponds to the state $s_j$ at time t as the frame of the highlight scene.

Also, with respect to the frame of the highlight scene of the attention content, the highlight scene detection unit 78 sets a value indicating that the frame is the highlight scene frame, e.g. "1", at a one-bit highlight flag that indicates whether the frame is the highlight scene frame. Also, with respect to the frame of the non-highlight scene of the attention content, the highlight scene detection unit 78 sets a value indicating that the frame is not the highlight scene frame, e.g. "0", at the highlight flag.

The highlight scene detection unit 78 provides the (time series of the) highlight flag of the respective frames of the attention content to the digest content generation unit 79.

The digest content generation unit 79 extracts the frame of the highlight scene that is specified by the highlight flag provided from the highlight scene detection unit 78 from the frame of the attention content provided from the content selection unit 71. Also, the digest content generation unit 79 generates the digest content that is the digest of the attention content using at least the frame of the highlight scene that is extracted from the frame of the attention content, and provides the generated digest content to the playback control unit 80.

The playback control unit 80 performs the playback control of the digest content provided from the digest content generation unit 79.

FIGS. 19A and 19B illustrate examples of the digest content generated by a digest content generation unit 79 of FIG. 18.

FIG. 19A illustrates a first example of the digest content.

In FIG. 19A, the digest content generation unit 79 extracts from the attention content an image of frames of the highlight scene and audio data annexed to the image, and generates moving image content as the digest content by combining the image and audio data in a state where the temporal before-after relations are maintained.

In this case, the playback control unit 80 (see FIG. 18) controls to display only the image of the frames of the highlight scene with the same size (hereinafter referred to as "full size") as that of the original content (i.e. the attention content) and to output audio annexed to the image.

As shown in FIG. 19A, in extracting the image of the frames of the highlight scene from the attention content, the whole frames of the highlight scene may be extracted or the frames may be thinned out such as one of two frames of the highlight scene is extracted.

FIG. 19B illustrates a second example of the digest content.

In FIG. 19B, the digest content generation unit 79 generates a digest content by thinning out the frames (e.g. extracts one frame with skipping 20 frames) so that the image of the frames which are not the highlight scene among the frames of the attention content is fast-forwarded (e.g. a tape is fast-forwarded) during viewing the image, and the audio annexed to the image is not output.

In this case, the playback control unit 80 (see FIG. 18) displays an image that corresponds to a highlight scene at normal speed (e.g. 1-speed) with an output of audio annexed thereto, and displays an image that corresponds to a non-highlight image at high speed (e.g. 20-speed) without an output of audio.

In FIG. 19B, it is exemplified that the audio annexed to a non-highlight scene is not output. However, the audio annexed to a non-highlight scene may be output in the same manner as the audio annexed to a highlight scene. In this case, the audio annexed to the non-highlight scene may be output at lower volume level, and the audio annexed to the highlight scene may be output at higher volume level.

Also, in FIG. 19B, it is exemplified that the highlight scene image and the non-highlight scene image are displayed with the same size (i.e. full size). However, it is also possible to display the non-highlight scene image with a display size smaller than that of the highlight scene image (e.g. 50% reduced size in width and length) or to display the highlight scene image with a display size larger than that of the non-highlight scene image.

Further, in FIG. 19, in the case of thinning out the frames, the thinning rate may be designated by a user.

[Highlight Detection Processing]

Figure 20:
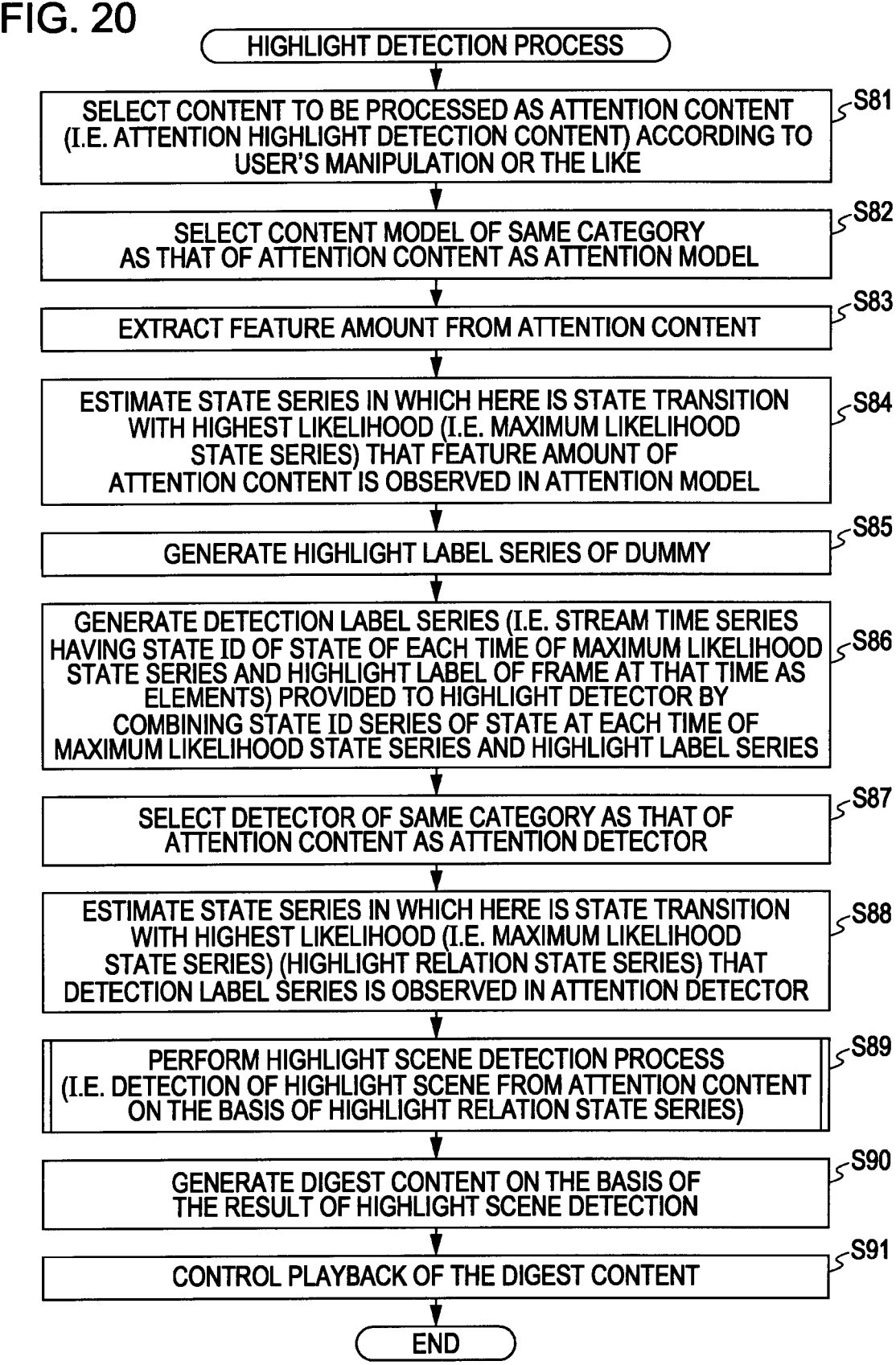
FIG. 20 is a flowchart illustrating the highlight detection processed by a highlight detection unit.

FIG. 20 is a flowchart illustrating the processing (i.e. highlight detection processing) performed by a highlight detection unit 53 of FIG. 18.

In step S81, the content selection unit 71 selects the attention content (i.e. the attention highlight detection content) that is the content for which the highlight scene is detected among the content stored in the content storage unit 11.

The content selection unit 71 provides the attention content to the feature amount extraction unit 73. Also, the content selection unit 71 recognizes and provides the category of the attention content to the model selection unit 72 and the detector selection unit 76, and proceeds from step S81 to step S82.

In step S82, the model selection unit 72 selects the content model that corresponds to the category of the attention content provided from the content selection unit 71 among the content models stored in the model storage unit 13 as the attention model.

Then, the model selection unit 72 provides the attention model to the maximum likelihood state series estimation unit 74, and proceeds from step S82 to step S83.

In step S83, the feature amount extraction unit 73 extracts the feature amounts of the respective frames of the attention content provided from the content selection unit 71, provides the extracted feature amounts to the maximum likelihood state series estimation unit 74, and proceeds to step S84.

In step S84, the maximum likelihood state series estimation unit 74 estimates the maximum likelihood state series (i.e. the maximum likelihood state series of the attention model for the attention content) which is the state series where there is a state transition with a highest likelihood that the (time series) of the feature amounts of the attention content provided from the feature amount extraction unit 73 is observed in the attention model provided from the model selection unit 72.

Then, the maximum likelihood state series estimation unit 74 provides the maximum likelihood state series of the attention model for the attention content to the detection label generation unit 75, and proceeds from step S84 to step S85.

In step S85, the detection label generation unit 75 generates the highlight label series with only the highlight label indicating that the scene is not the highlight scene (i.e. the highlight label having a value of "0") as the dummy highlight label series, and proceeds to step S86.

In step S86, the detection label generation unit 75 generates the state ID series that is the maximum likelihood state series of the attention model for the attention content provided from the maximum likelihood state series estimation unit 74 and the detection label series that is a pair to the dummy highlight label series.

Then, the detection label generation unit 75 provides the detection label series to the maximum likelihood state series estimation unit 77, and proceeds from step S86 to step S87.

In step S87, the detector selection unit 76 selects the highlight detector that corresponds to the category of the attention content provided from the content selection unit 71 among the highlight detectors stored in the detector storage unit 52 as the attention detector. Then, the detector selection unit 76 acquires the attention detector among the highlight detectors stored in the detector storage unit 52, provides the acquired attention detector to the maximum likelihood state series estimation unit 77 and the highlight scene detection unit 78, and proceeds from step S87 to step S88.

In step S88, the maximum likelihood state series estimation unit 77 estimates the maximum likelihood state series (i.e. highlight relation state series) which is the state series where there is a state transition with a highest likelihood that the detection label series provided from the detection label generation unit 75 is observed in the attention detector provided from the detector selection unit 76.

Then, the maximum likelihood state series estimation unit 74 provides the highlight relation state series to the highlight scene detection unit 78, and proceeds from step S88 to step S89.

In step S89, the highlight scene detection unit 78 detects the highlight scene from the attention content on the basis of the highlight relation state series provided from the maximum likelihood state series estimation unit 77, and processes the highlight scene detection that outputs the highlight flag.

After the completion of the highlight scene detection processing in step S89, the digest content generation unit 79, in step S90, extracts the frames of the highlight scene that is specified by the highlight flag provided from the highlight scene detection unit 78 from the frames of the attention content provided from the content selection unit 71.

Also, the digest content generation unit 79 generates the digest content of the attention content using the frames of the highlight scene that is extracted from the frames of the attention content, provides the generated digest content to the playback control unit 80, and proceeds from step S90 to step S91.

In step S91, the playback control unit 80 performs the playback control of the digest content provided from the digest content generation unit 79.

Figure 21:
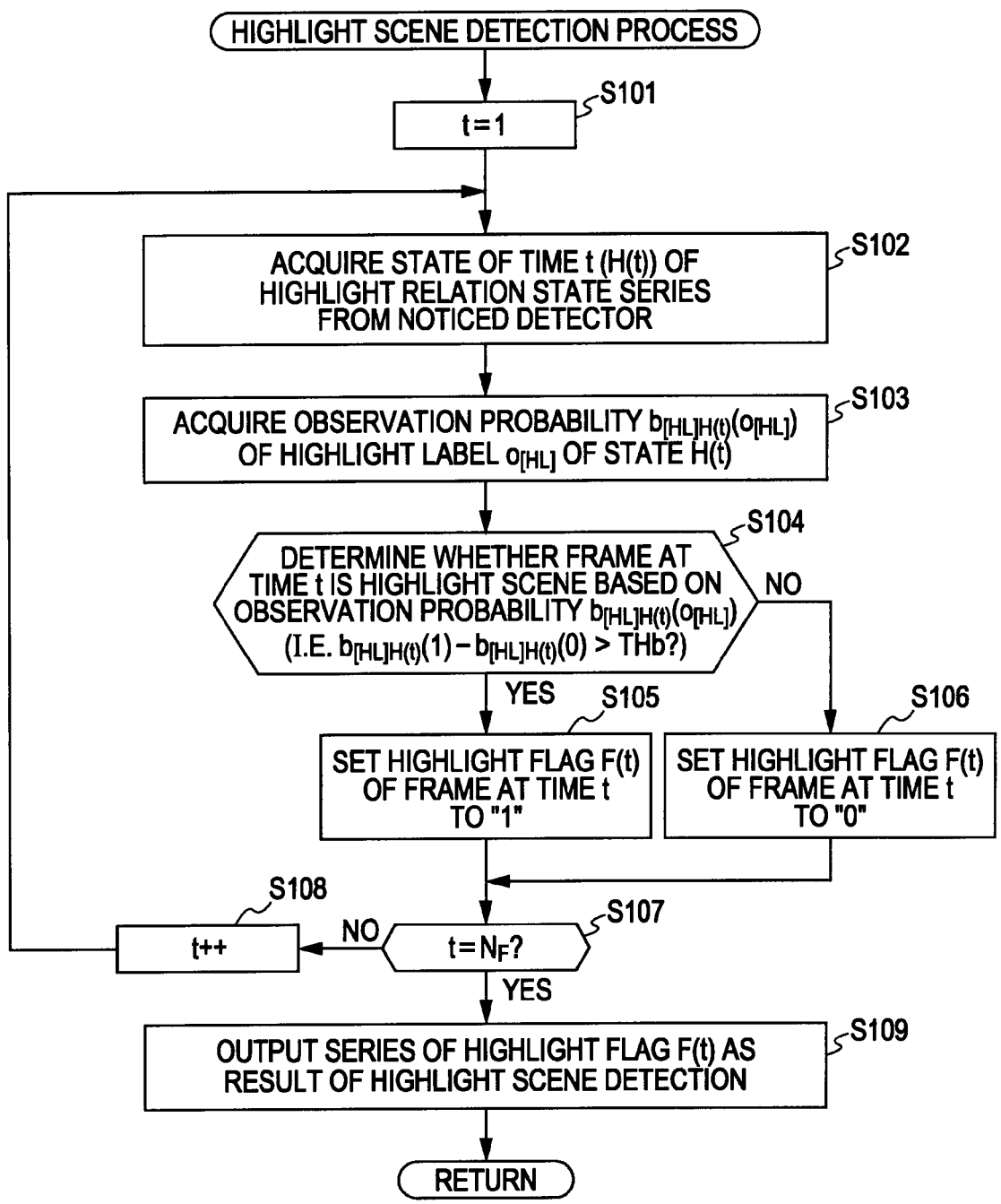
FIG. 21 is a flowchart illustrating the highlight scene detection processing.

FIG. 21 is a flowchart illustrating the highlight scene detection processing performed by the highlight scene detection unit 78 (see FIG. 18) in step S89 of FIG. 20.

In step S101, the highlight scene detection unit 78 sets "1" as an initial value of a variable t that counts time (i.e. the number of frames of the attention content), and proceeds to step S102.

In step S102, the highlight scene detection unit 78 acquires (i.e. recognizes) the state $H(t)=s_j$ (the t-th state from the front end) at time t of the highlight relation state series provided from the maximum likelihood state series estimation unit 77 among the states $s_1$ to $s_{N'}$ of the HMM (where N' denotes the total number of states of the HMM as the attention detector) as the attention detector provided from the detector selection unit 76 (see FIG. 18).

Then, in step S103, the highlight scene detector 78 acquires the observation probability $b_{[HL]H(t)}(o_{[HL]})$ of the highlight label $o_{[HL]}$ of the state $H(t)=s_j$ at time t from the attention detector provided from the detector selection unit 76, and proceeds to step S104.

In step S104, the highlight scene detection unit 78 determines whether the frame at time t of the attention content corresponds to the highlight scene on the basis of the observation probability $b_{[HL]H(t)}(o_{[HL]})$ of the highlight label $o_{[HL]}$.

In step S104, if it is determined that the frame at time t of the attention content corresponds to the highlight scene, for example, if a difference $b_{[HL]j}(o_{[HL]}="1")-b_{[HL]j}(o_{[HL]}="0")$ between the observation probability $b_{[HL]H(t)}(o_{[HL]}="1")$ of the highlight label indicating that the scene is the highlight scene and the observation probability $b_{[HL]H(t)}(o_{[HL]}="0")$ of the highlight label indicating that the scene is not the highlight scene among the observation probability $b_{[HL]H(t)}(o_{[HL]})$ of the highlight label $o_{[HL]}$ is larger than the predetermined threshold value THb, the highlight scene detection unit 78 proceeds to step S105 and sets a value indicating that the frame is the highlight scene frame, e.g. "1", at a highlight flag of the frame at time t of the attention content.

Also, in step S104, if it is determined that the frame at time t of the attention content does not correspond to the highlight scene, for example, if a difference $b_{[HL]j}(o_{[HL]}="1")-b_{[HL]j}(o_{[HL]}="0")$ between the observation probability $b_{[HL]H(t)(o[HL]}="1")$ of the highlight label indicating that the scene is the highlight scene and the observation probability $b_{[HL]H(t)}(o_{[HL]}="0")$ of the highlight label indicating that the scene is not the highlight scene among the observation probability $b_{[HL]H(t)}(o_{[HL]})$ of the highlight label $o_{[HL]}$ is not larger than the predetermined threshold value THb, the highlight scene detection unit 78 proceeds to step S106 and sets a value indicating that the frame is not the highlight scene frame, e.g. "0", at a highlight flag F(t) of the frame at time t of the attention content.

After steps S105 and S106, the highlight scene detection unit 78 proceeds to step S107 and determines whether the variable t is equal to the total number $N_F$ of frames of the attention content.

In step S107, if it is determined that the variable t is equal to the total amount $N_F$ of frames, the highlight scene detection unit proceeds to step S108, increases the variable t by 1, and returns to step S102.

In step S107, if it is determined that the variable t is equal to the total number $N_F$ of frames, i.e. if the highlight flag F(t) is obtained for each frame in which the feature amount is obtained of the attention content, the highlight scene detection unit 78 proceeds to step S109, and outputs the series of the highlight flag F(t) of the frames of the attention content to the digest content generation unit 79 (see FIG. 18) as the result of highlight scene detection to return.

As described above, in the highlight detector, the highlight detection unit 53 (see FIG. 18) estimates the state ID series that is the maximum likelihood state series of the attention model for the attention content and the highlight relation state series that is the maximum likelihood state series when the detection label series that is a pair to the dummy highlight label series is observed, detects the highlight scene frames from the attention content on the basis of the observation probability of the highlight label of the respective states of the highlight relation state series, and generates the digest content using the highlight scene frames.

Also, the highlight detector is obtained by performing the learning of the HMM using the state ID series that is the maximum likelihood state series of the content model for the content and the highlight label series generated according to the user's manipulation.

Accordingly, if the learning of the content model, which uses the content of the same category as that of the attention content, and the highlight detector is performed even in a state in which the attention content that generates the digest content is not used to learn the content model or the highlight detector, it possible to easily obtain a digest (i.e. digest content) in which scenes that have interest for a user are collected as highlight scenes, using the content model and the highlight detector.

[Configuration Example of a Scrapbook Generation Unit 16]

Figure 22:
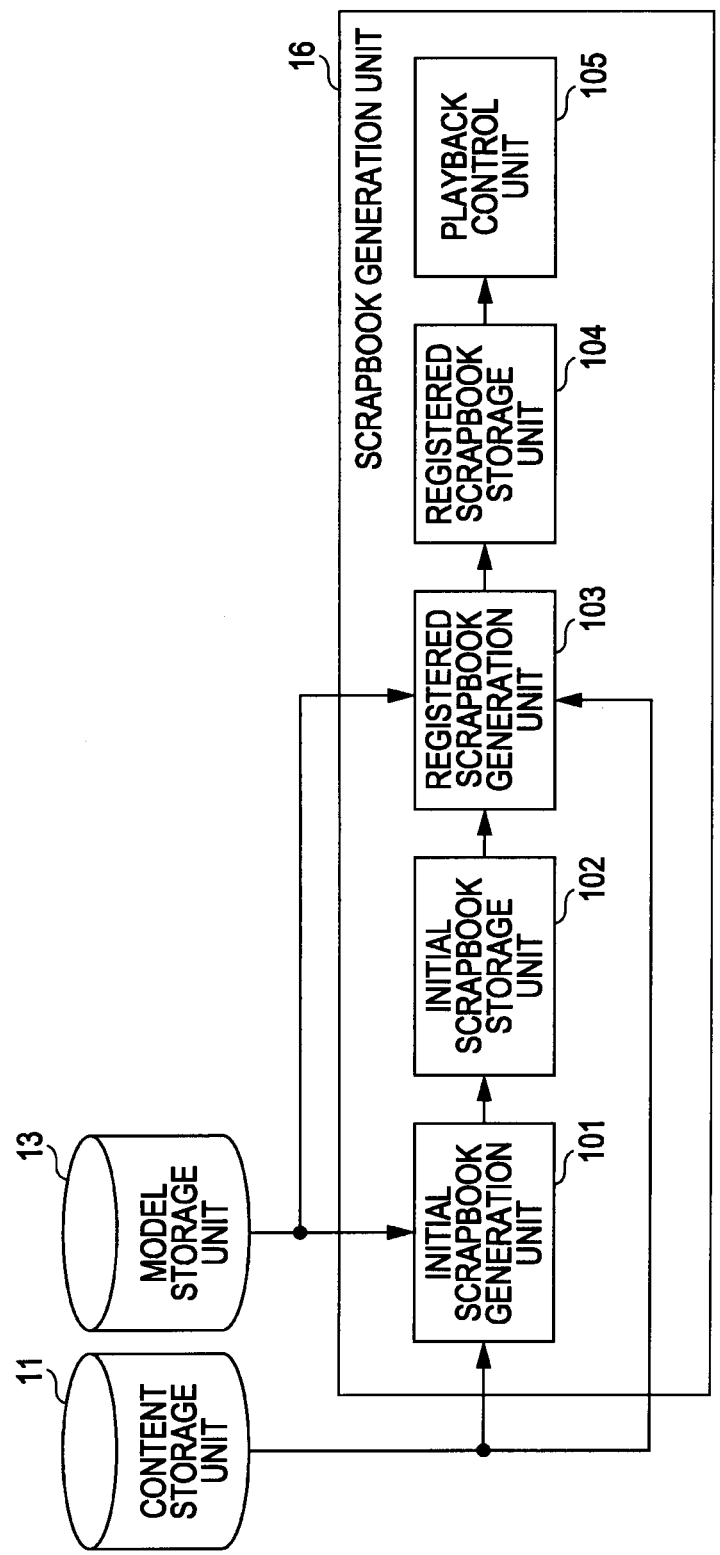
FIG. 22 is a block diagram illustrating a configuration example of a scrapbook generation unit.

FIG. 22 is a block diagram illustrating a configuration example of a scrapbook generation unit 16 of FIG. 1.

The scrapbook generation unit 16 includes an initial scrapbook generation unit 101, an initial scrapbook storage unit 102, a registered scrapbook generation unit 103, a registered scrapbook storage unit 104, and a playback control unit 105.

The initial scrapbook generation unit 101 generates an initial scrapbook to be described later using the content stored in the content storage unit 11 and the content model stored in the model storage unit 13, and provides the initial scrapbook to the initial scrapbook storage unit 102.

The initial scrapbook storage unit 102 stores the initial scrapbook provided from the initial scrapbook generation unit 101.

The registered scrapbook storage unit 103 generates registered scrapbook using the content stored in the content storage unit 11, the content model stored in the model storage unit 13, and the initial scrapbook stored in the initial scrapbook storage unit 102, and provides the generated registered scrapbook to the registered scrapbook storage unit 104.

The registered scrapbook storage unit 104 stores the registered scrapbook provided from the registered scrapbook generation unit 103.

The playback control unit 105 performs the playback control of the registered scrapbook stored in the registered scrapbook storage unit 104.

[Configuration Example of an Initial Scrapbook Generation Unit 101]

Figure 23:
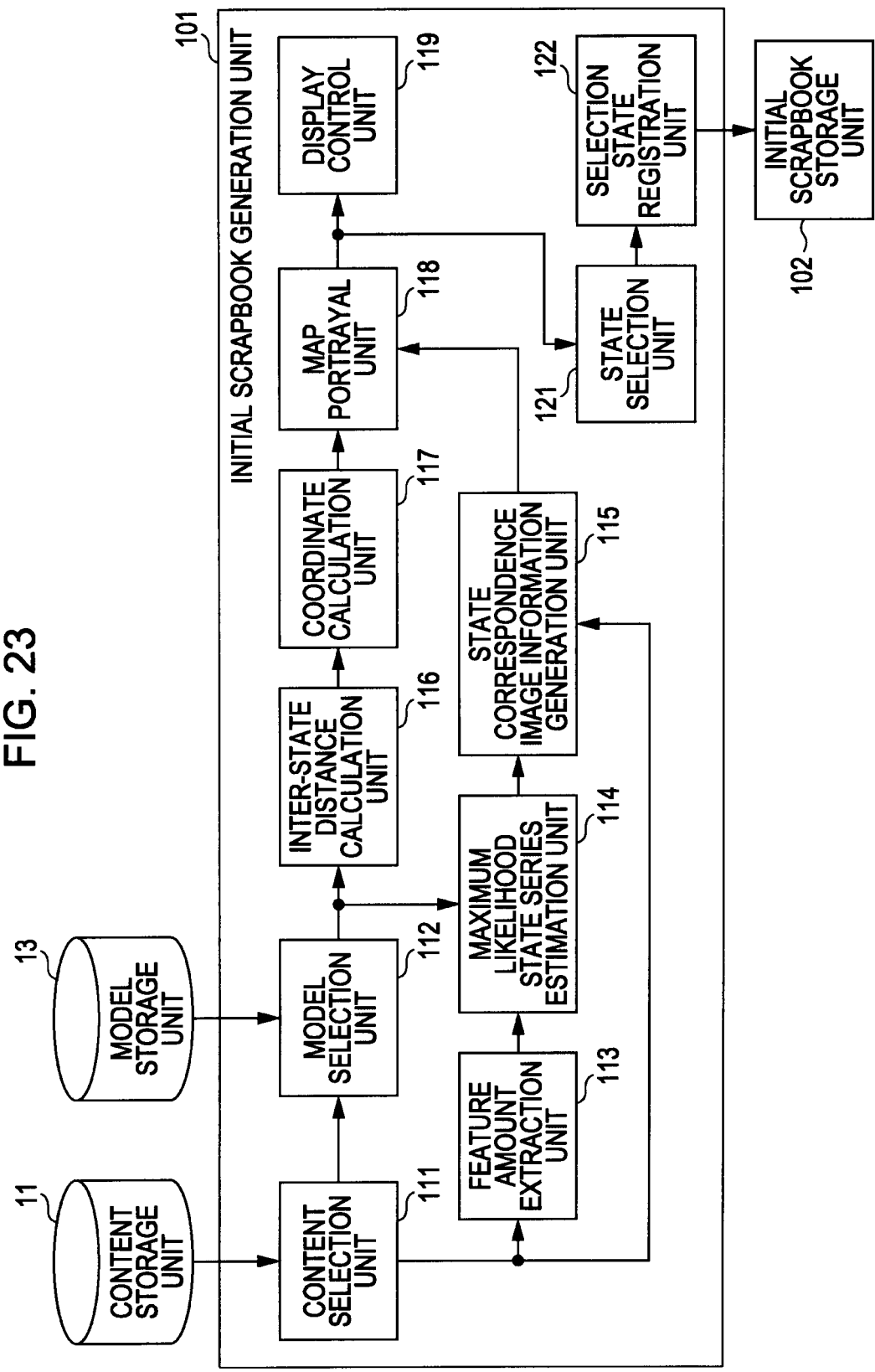
FIG. 23 is a block diagram illustrating a configuration example of an initial scrapbook generation unit.

FIG. 23 is a block diagram illustrating a configuration example of an initial scrapbook generation unit 101 of FIG. 22.

In FIG. 23, the initial scrapbook generation unit 101 includes a content selection unit 111, a model selection unit 112, a feature amount extraction unit 113, a maximum likelihood state series estimation unit 114, a state correspondence image information generation unit 115, an inter-state distance calculation unit 116, a coordinate calculation unit 117, a map portrayal unit 118, a display control unit 119, a state selection unit 121, and a selection state registration unit 122.

The content selection unit 111 to the display control unit 119 have the same configuration as that of the content selection unit 31 to the display control unit 39 of the content structure presentation unit 14 (see FIG. 9), and perform the content structure presentation processing as described above with reference to FIG. 13.

In this case, the map portrayal unit 118, in the same manner as the map portrayal unit 38 of FIG. 9, provides the model map to the display control unit 119 and the state selection unit 121.

If the state of the model map (see FIGS. 11 and 12) indicated by the content structure presentation processing is designated by the user's manipulation, the state selection unit 121 selects the designated state as the selection state. Further, the state selection unit 121 recognizes the state ID of the selection state with reference to the model map provided from the map portrayal unit 118, and provides the recognized state ID to the selection state registration unit 122.

The selection state registration unit 122 generates an empty scrapbook, and registers the state ID of the selection state provided from the state selection unit 121. Also, the selection state registration unit 122 provides the scrapbook in which the state ID has been registered to the initial scrapbook storage unit 102 as the initial scrapbook to store the scrapbook in the initial scrapbook storage unit.

Here, the scrapbook generated by the selection state registration unit 122 is an electronic storage capable of storing (memorizing) data such as still image (e.g. photograph), moving image, audio (e.g. music), or the like.

The empty scrapbook is a scrapbook in which nothing is registered, and the initial scrap book is a scrapbook in which the state ID is registered.

The initial scrapbook generation unit 101 as configured above performs the content structure presentation processing (see FIG. 13), and the model map (see FIGS. 11 and 12) is displayed on a display (not illustrated). Also, if the state of the model map is designated by the user's manipulation, the state ID of the designated state (i.e. selection state) is registered in the (empty) scrapbook.

Figure 24:
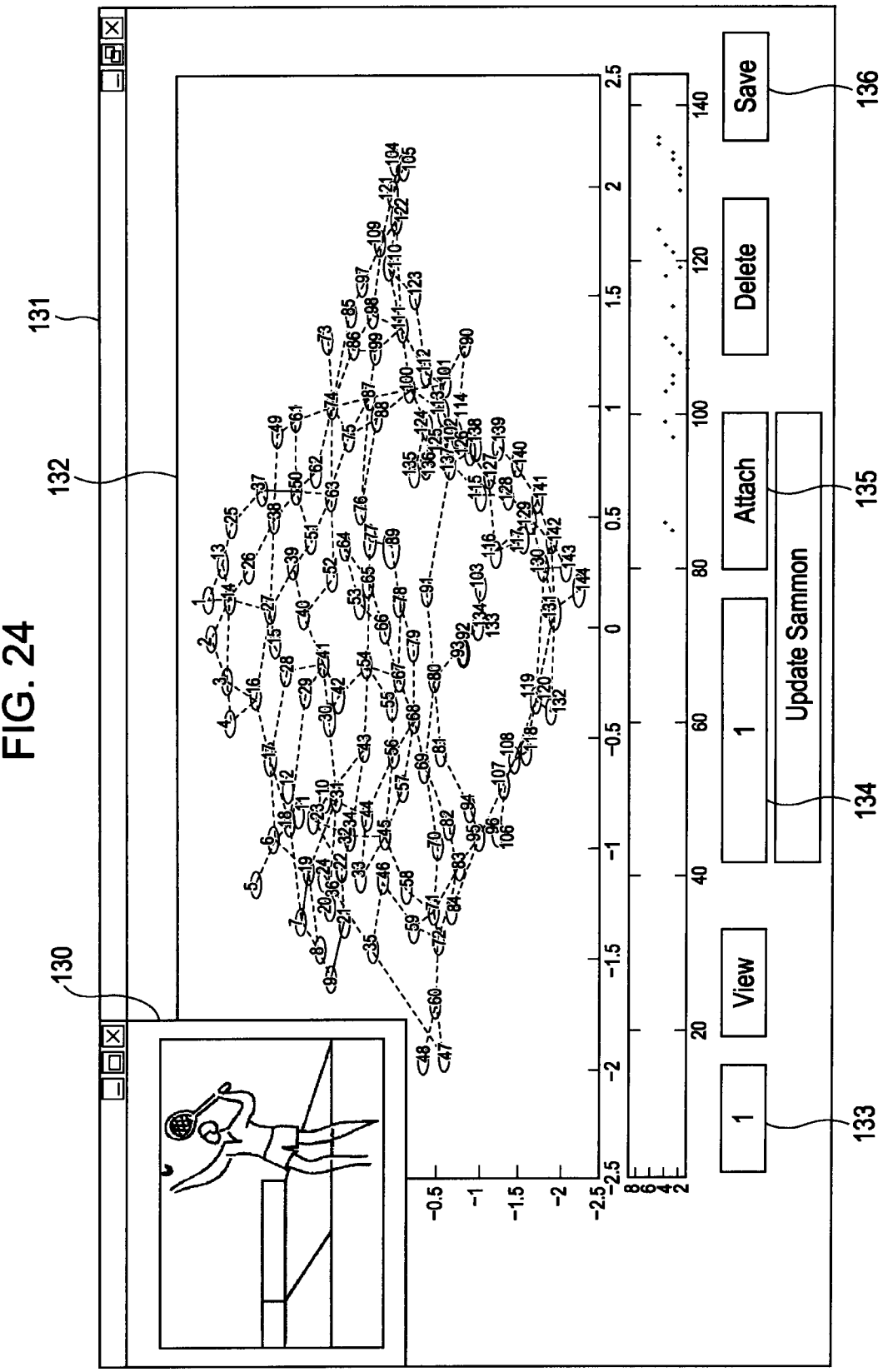
FIG. 24 is a diagram illustrating an example of a user interface for a user to designate the state on a model map.

FIG. 24 is a diagram illustrating an example of a user interface for a user to designate the state on a model map, which is displayed as the display control unit 119 performs the display control.

In FIG. 24, the model map 132 generated by the map portrayal unit 118 is displayed in a window 131.

The state on the model map 132 in the window 131 is designated by a user, and thus so called focus match can be achieved. The user's designation of the state may be performed by clicking with a pointing device such as a mouse, moving a cursor to a position where the focus match can be achieved according to the manipulation of the pointing device, or the like.

Also, the state having already been selected and the state having not yet been selected among the states on the model map 132 may be displayed with different display types such as different colors.

On the lower part of the window 131, the state ID input column 133, a scrapbook ID input column 134, a registration button 135, and a save button 136.

In the state ID input column 133, the state ID of the focus match state among the states on the model map 132 is displayed.

Also, in the state ID input column 133, a user may directly input the state ID.

In the scrapbook ID input column 134, a scrapbook ID that is information specifying the scrapbook in which state ID of the selection state is registered is displayed.

In this case, in the scrapbook ID input column 134, a user's manipulation (e.g. clicking with a pointing device such as a mouse) is possible, and the scrapbook ID that is displayed in the scrapbook ID input column 134 may be changed according to the user's manipulation on the scrapbook ID input column 134. Accordingly the user can change the scrapbook for registering the state ID by manipulating the scrapbook ID input column 134.

The registration button 135 is manipulated when the state ID of the focus match state (i.e. the state in which the state ID is displayed on the state ID input column 133) is registered in the scrapbook. That is, in the case of manipulating the registration button 135, the focus match state may be selected (confirmed) as the selection state).

The save button 136 is manipulated, for example, when the display of the model map 132 is terminated (i.e. when the window 131 closed.

The window 130, if the state correspondence image information generated in the content structure presentation processing is linked in a focus match state among the states on the model map 132, is opened. Also, in the window 130, the state correspondence image information that is linked with the focus match state is displayed.

In this case, in the window 130 (or in a window (not illustrated) except for the window 130), the focus link state on the model map 132, the state correspondence image information linked with the states in positions close to the states, the state correspondence image information linked with all the states on the model map 132, may be displayed sequentially in time or in parallel in space, instead of the state correspondence image information linked with the focus link state.

The user can designate a certain state on a model map 132 displayed in the window 131 by clicking the corresponding state.

If the state is designated by the user, the display control unit 119 (see FIG. 23) displays in the window 130 the state correspondence image information linked with the state designated by the user.

Accordingly, the user can acquire an image of frames corresponding to the state on the model map 132.

If the user is interested in the image displayed in the window 130 and desires to register the image in the scrapbook, the user manipulates the registration button 135.

If the registration button 135 is manipulated, the state selection unit 121 (see FIG. 23) selects the state on the model map 132 that is designated by the user as the selection state.

Then, if the user manipulates the save button 136, the state selection unit 121 provides the state ID of the selection state selected until then to the selection state registration unit 122 (see FIG. 23).

The selection state registration unit 122 registers the state ID of the selection state provided from the state selection unit 121 in an empty scrapbook, and stores the scrapbook in which the state ID has been registered in the initial scrapbook storage unit 102 as the initial scrapbook. Then, the display control unit 119 (see FIG. 23) closes the windows 131 and 141.

[Initial Scrapbook Generation Processing]

Figure 25:
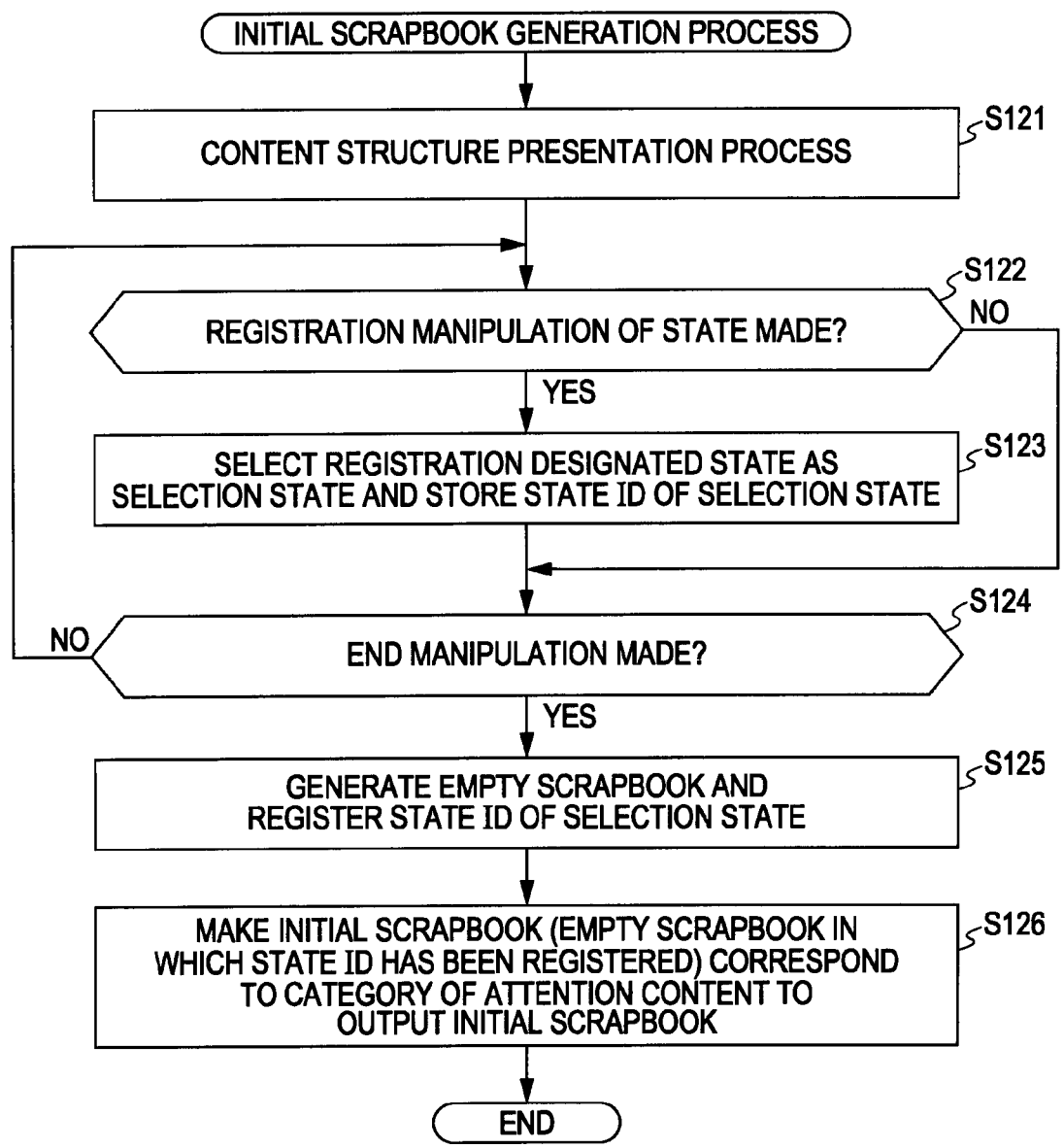
FIG. 25 is a flowchart illustrating the initial scrapbook generation processed by an initial scrapbook generation unit.

FIG. 25 is a flowchart illustrating the processing (i.e. initial scrapbook generation processing) performed by the initial scrapbook generation unit 101 in FIG. 23.

In step S121, the content selection unit 111 to the display control unit 119 have the same configuration as that of the content selection unit 31 to the display control unit 39 of the content structure presentation unit 14 (see FIG. 9), and perform the same content structure presentation processing (see FIG. 13). Accordingly, the window 131 (see FIG. 24) that includes the model map 132 is displayed on a display (not illustrated).

Then, the process proceeds from step S121 to step S122, and the state selection unit 121 determines whether the state registration manipulation has been performed by the user.

In step S122, if it is determined that the state registration manipulation has been performed, i.e. if the state on the model map 132 is designated by the user and the registration button 135 (see FIG. 24) (of the window 131) is manipulated, the state selection unit 121 selects the state on the model map 132 which has been registered when the registration button 135 is manipulated as the selection state in step S123.

Further, the state selection unit 121 stores the state ID of the selection state in a memory (not illustrated), and proceeds from step S123 to step S124.

Also, in step S122, if it is determined that the state registration manipulation has not been performed, the step S123 is skipped, and the step S124 is proceeded.

In step S124, the state selection unit 121 determines whether the save manipulation has been performed by the user.

In step S124, if it is judged that the save manipulation has not been performed, the processing is returned to step S122 to repeat the same processing.

Also, in step S124, if it is determined that the save manipulation has been performed, i.e. if the user has manipulated the save button 136 (FIG. 24), the state selection unit 121 provides all the state IDs of the selection states stored in step S123 to the selection state registration unit 122, and proceeds to step S125.

In step S125, the selection state registration unit 122 generates the empty scrapbook, and registers the state ID of the selection state provided from the state selection unit 121 in the empty scrapbook.

Further, the selection state registration unit 122 considers the scrapbook in which the state ID has been registered as the initial scrapbook, and makes the initial scrapbook correspond to the category of the content selected as the attention content (i.e. attention presentation content) in the content structure presentation processing (see FIG. 13) in step S121.

Then, the selection state registration unit 122 provides the initial scrapbook that corresponds to the category of the attention content to the initial scrapbook storage unit 102 to store the initial scrapbook in the initial scrapbook storage unit 102.

Thereafter, the window 131 (see FIG. 24) displayed in the content structure presentation processing in step S121 is closed to terminate the initial scrapbook generation processing.

[Configuration Example of a Registered Scrapbook Generation Unit 103]

Figure 26:
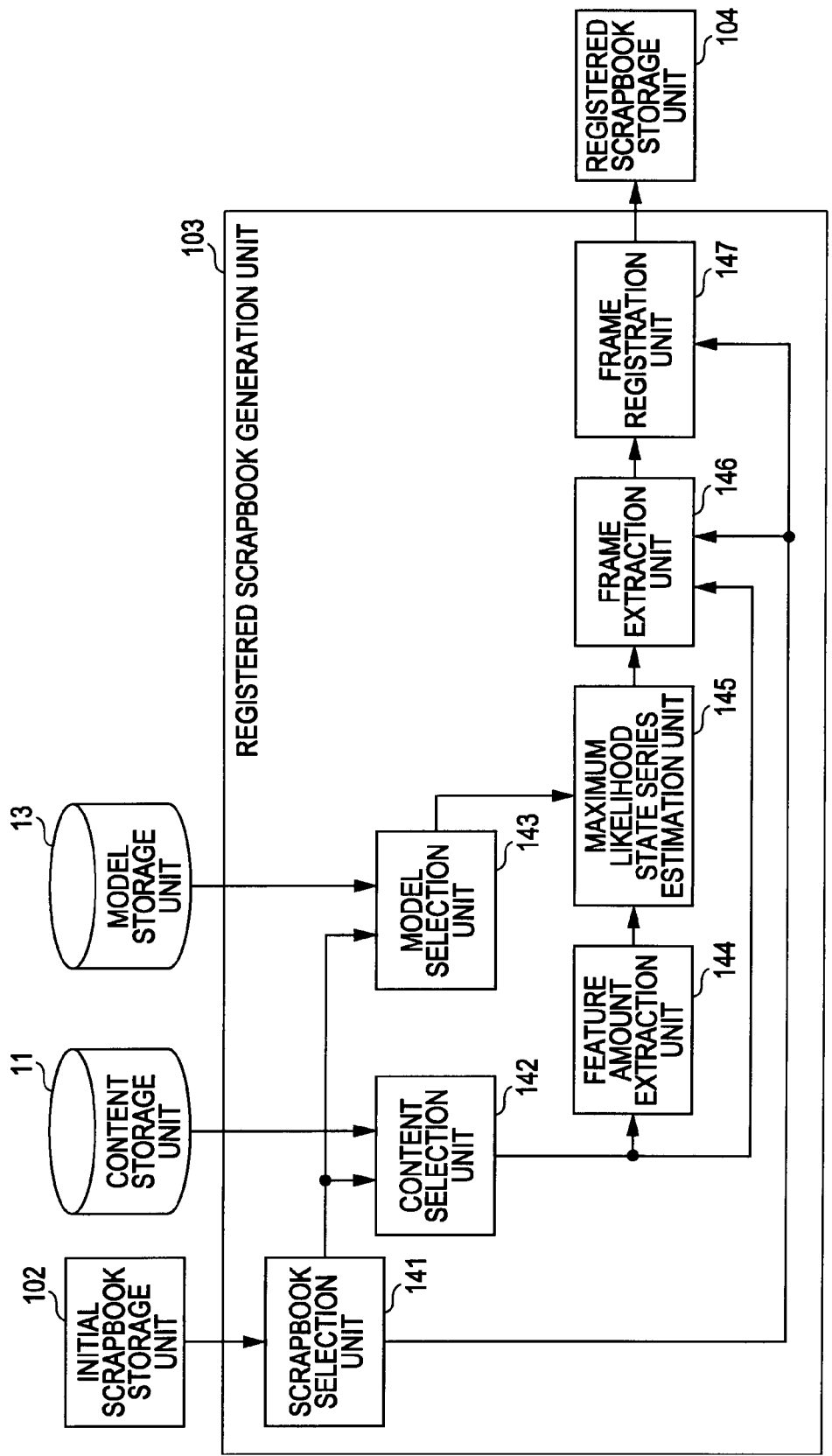
FIG. 26 is a block diagram illustrating a configuration example of a registered scrapbook generation unit.

FIG. 26 is a block diagram illustrating a configuration example of a registered scrapbook generation unit 103 of FIG. 22.

In FIG. 26, the registered scrapbook generation unit 103 includes a scrapbook selection unit 141, a content selection unit 142, a model selection unit 143, a feature amount extraction unit 144, a maximum likelihood state series estimation unit 145, a frame extraction unit 146, and a frame registration unit 147.

The scrapbook selection unit 141 selects one initial scrapbook stored in the initial scrapbook storage unit 102 as the attention scrapbook, and provides the selected initial scrapbook to the frame extraction unit 146 and the frame registration unit 147.

Also, the scrapbook selection unit 141 provides the category corresponding to the attention scrapbook to the content selection unit 142 and the model selection unit 143.

The content selection unit 142 selects content of the category provided from the scrapbook selection unit 141 among contents stored in the content storage unit 11 as the attention scrapbook content (hereinafter referred simply to as "attention content").

Then, the content selection unit 142 provides the attention content to the feature amount extraction unit 144 and the frame extraction unit 146.

The model selection unit 143 selects the content model corresponding to the category provided from the scrapbook selection unit 141 among the content models stored in the model storage unit 13 as the attention model, and provides the selected model to the maximum likelihood state series estimation unit 145.

The feature amount extraction unit 144 extracts the feature amounts of the respective frames (of an image) of the attention content provided from the content selection unit 142 in the same manner as the feature extraction unit 22 of FIG. 2, and provides the (time series of the) feature amounts of the respective frames of the attention content to the maximum likelihood state series estimation unit 145.

The maximum likelihood state series estimation unit 145, for example, in accordance with the Viterbi algorithm, estimates the maximum likelihood state series (i.e. the maximum likelihood state series of the attention model for the attention content) which is the state series where there is a state transition with a highest likelihood that the (time series) feature amount of the attention content provided from the feature amount extraction unit 144 is observed in the attention model provided from the model selection unit 143.

Then, the maximum likelihood state series estimation unit 145 provides the maximum likelihood state series of the attention model for the attention content to the frame extraction unit 146.

The frame extraction unit 146 determines whether each state ID of the maximum likelihood state series provided from the maximum likelihood state series estimation unit 145 coincides with the state ID of the selection state registered in the attention scrapbook provided from the scrapbook selection unit 141 (hereinafter referred to as "registration state ID").

Further, the frame extraction unit 146 extracts the frame that corresponds to the state in which the state ID of the maximum likelihood state series provided from the maximum likelihood state series estimation unit 145 coincides with the state ID of the selection state registered in the attention scrapbook provided from the scrapbook selection unit 141 from the attention content provided from the content selection unit 142, and provides the extracted frame to the frame registration unit 147.

The frame registration unit 147 registers the frame provided from the frame extraction unit 146 in the attention scrapbook provided from the scrapbook selection unit 141. Further, the frame registration unit 147 provides the attention scrapbook after registration of the frame to the registered scrapbook storage unit 104 as the registered scrapbook to store the attention scrapbook in the registered scrapbook storage unit 104.

[Registered Scrapbook Generation Processing]

Figure 27:
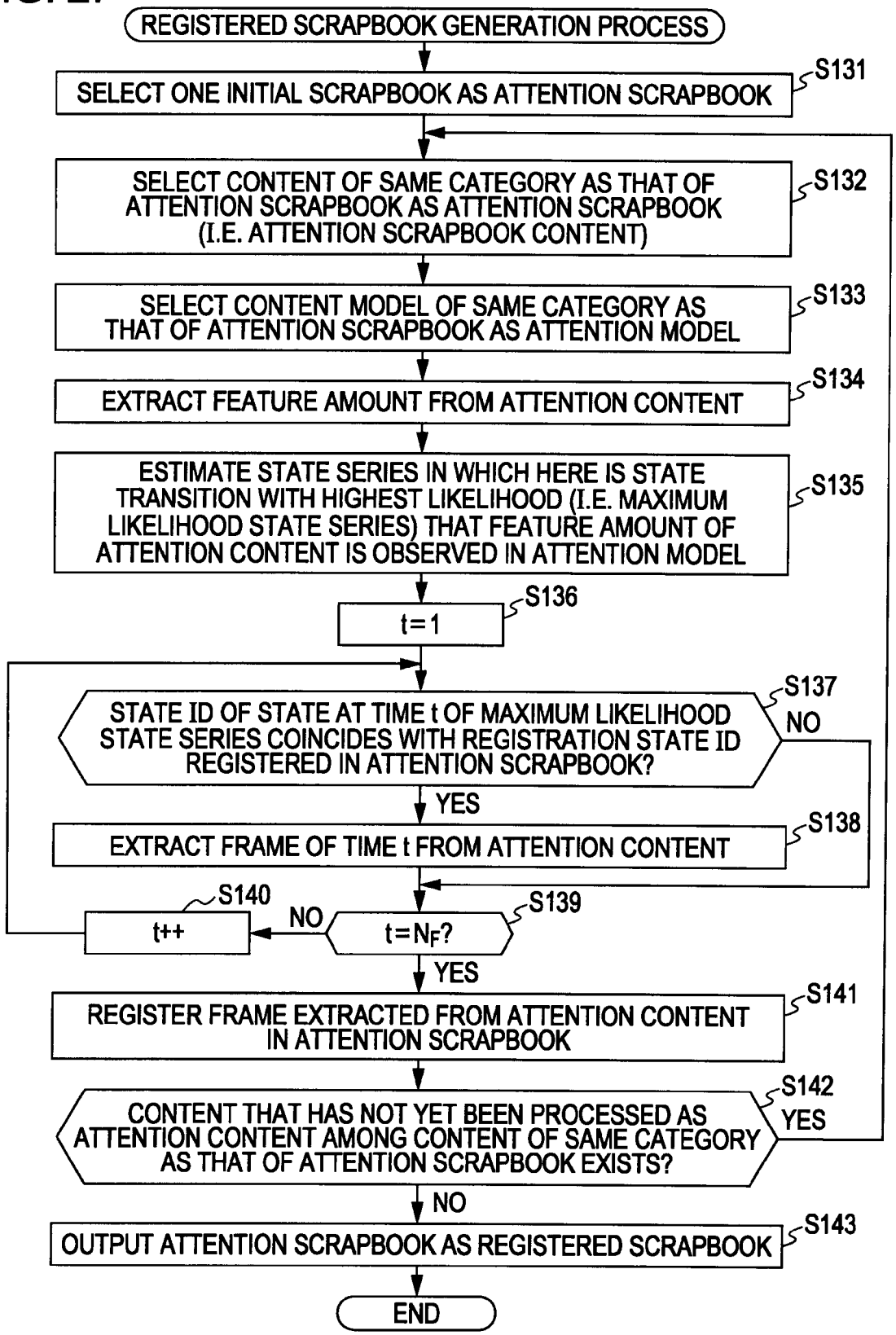
FIG. 27 is a flowchart illustrating the registered scrapbook generation processed by a registered scrapbook generation unit.

FIG. 27 is a flowchart illustrating the registered scrapbook generation processing that is performed by the registered scrapbook generation unit 103 of FIG. 26.

In step S131, the scrapbook selection unit 141 selects one initial scrapbook which has not yet been selected as the attention scrapbook among the initial scrapbooks stored in the initial scrapbook storage unit 102 as the attention scrapbook.

The scrapbook selection unit 141 provides the attention scrapbook to the frame extraction unit 146 and the frame registration unit 147. Also, the scrapbook selection unit 141 provides the category corresponding to the attention scrapbook to the content selection unit 142 and the model selection unit 143, and proceeds from step S131 to step S132.

In step S132, the content selection unit 142 selects the content which has not yet been selected as the attention content (i.e. attention scrapbook content) among content of the category provided from the scrapbook selection unit 141 among the content stored in the content storage unit 11 as the attention content.

Then, the content selection unit 142 provides the attention content to the feature amount extraction unit 144 and the frame extraction unit 146, and proceeds from step S132 to step S133.

In step S133, the model selection unit 143 selects the content model corresponding to the category provided from the scrapbook selection unit 141 among the content models stored in the model storage unit 13 as the attention model.

Then, the model selection unit 143 provides the attention model to the maximum likelihood state series estimation unit 145, and proceeds from step S133 to step S134.

In step S134, the feature amount extraction unit 144 extracts the feature amounts of the respective frames of the attention content provided from the content selection unit 142, and provides the (time series of the) feature amounts of the respective frames of the attention content to the maximum likelihood state series estimation unit 145.

Then, the process proceeds from step S134 to step S135, and the maximum likelihood state series estimation unit 145 estimates the maximum likelihood state series (i.e. the maximum likelihood state series of the attention model for the attention content) which is the state series where there is a state transition with a highest likelihood that the (time series) feature amount of the attention content provided from the feature amount extraction unit 144 is observed in the attention model provided from the model selection unit 143.

Then, the maximum likelihood state series estimation unit 145 provides the maximum likelihood state series of the attention model for the attention content to the frame extraction unit 146, and proceeds from step S135 to step S136.

In step S136, the frame extraction unit 146 sets "1" as an initial value of a variable t that counts time (i.e. the number of frames of the attention content), and proceeds to step S137.

In step S137, the frame extraction unit 146 determines whether the state ID of the state at time t (i.e. t-th state from the front end) of the maximum likelihood state series (i.e. the maximum likelihood state series of the attention model for the attention content) provided from the maximum likelihood state series estimation unit 145 coincides with any one of the registration state IDs of the selection states registered in the attention scrapbook provided from the scrapbook selection unit 141.

In step S137, if it is determined that the state ID of the state at time t of the maximum likelihood state series of the attention model for the attention content coincides with any one of the registration state IDs of the selection states registered in the attention scrapbook, the frame extraction unit 146 proceeds to step S138, extracts the frame at time t from the attention content provided from the content selection unit 142, provides the extracted frame to the frame registration unit 147, and then proceeds to step S139.

Also, in step S137, if it is determined that the state ID of the state at time t of the maximum likelihood state series of the attention model for the attention content does not coincide with any one of the registration state IDs of the selection states registered in the attention scrapbook, the frame extraction unit 146 skips step S138, and proceeds to step S139.

In step S139, the frame extraction unit 146 determines whether the variable t is equal to the total number $N_F$ of frames of the attention content.

In step S139, if it is determined that the variable t is equal to the total number $N_F$ of frames of the attention content, the proceeding proceeds to step S141, and the frame registration unit 147 registers all frames provided from the frame extraction unit 146, i.e., all frames extracted from the attention content, in the attention scrapbook from the scrapbook selection unit 141.

In step S139, if it is determined that the variable t is equal to the total number $N_F$ of frames of the attention content, the frame registration unit 147 proceeds to step S141, and registers frames provided from the frame extraction unit 146, i.e. all frames extracted from the attention content, in the attention scrapbook provided from the scrapbook selection unit 141.

Then, the process proceeds from step S141 to step S142, and the content selection unit 142 determines whether there is any content that has not yet been selected as the attention content among the content of which the category stored in the content storage unit 11 is equal to the category corresponding to the attention scrapbook.

In step S142, if it is determined that there is the content that has not yet been selected as the attention content among the content of which the category stored in the content storage unit 11 is equal to the category corresponding to the attention scrapbook, the content selection unit 142 returns to step S132 and repeats the same process.

Also, in step S142, if it is determined that there is no content that has not yet been selected as the attention content among the content of which the category stored in the content storage unit 11 is equal to the category corresponding to the attention scrapbook, the step goes to step S143, and the frame registration unit 147 outputs the attention scrapbook to the registered scrapbook storage unit 104 as the registered scrapbook to terminate the registered scrapbook generation processing.

Referring to FIGS. 28A to 28E, the registered scrapbook generation processing that is performed by the registered scrapbook generation unit 103 (see FIG. 26) will be described in more detail.

Figure 28:
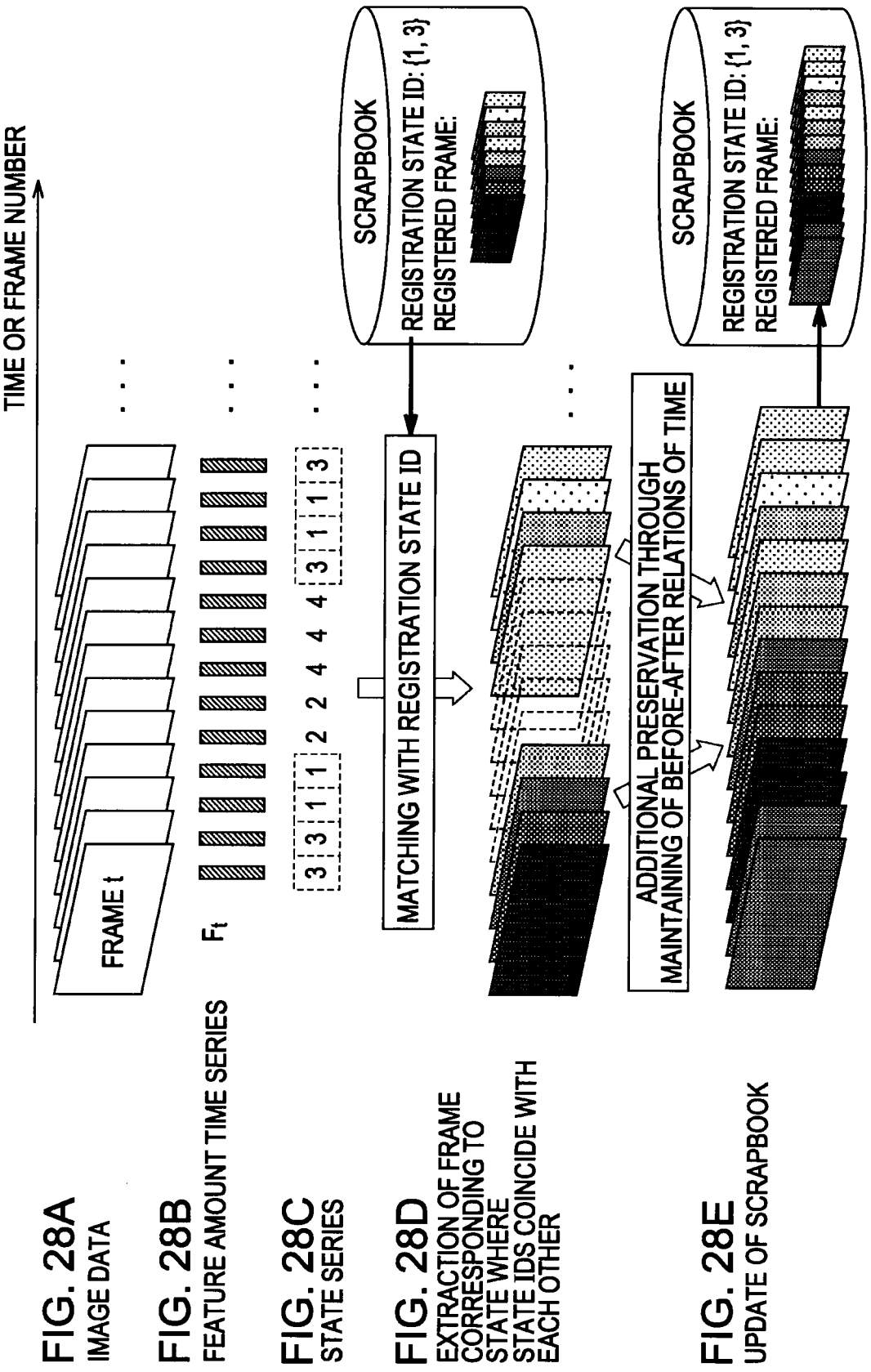
FIGS. 28A to 28E are diagrams illustrating the registered scrapbook generation processing.

FIG. 28A illustrates the time series of frames of content selected by the content selection unit 142 (see FIG. 26) as the attention content (i.e. attention scrapbook content).

FIG. 28B illustrates the time series of the feature amounts of the frame of FIG. 28A, extracted by the feature amount extraction unit 144 (see FIG. 26).

FIG. 28C illustrates the maximum likelihood state series (i.e. the maximum likelihood state series of the attention model for the attention content) from which the time series of the feature amounts of the attention content of FIG. 28B are observed in the attention model estimated by the maximum likelihood state series estimation unit 145 (see FIG. 26).

Here, the substance of the maximum likelihood state series of the attention model for the attention content is the series of the state ID. Also, the t-th state ID from the front end of the maximum likelihood state series of the attention model for the attention content is the state ID of the state from which the feature amount of the t-th (i.e. at time t) frame (the state ID of the state corresponding to the frame t) is observed.

FIG. 28D illustrates the frame extracted by the frame extraction unit 146 (see FIG. 26).

In FIG. 28D, "1" and "3" are registered as the registered state IDs of the attention scrapbook, and respective frames having state IDs of "1" and "3" are extracted from the attention content.

FIG. 28E illustrates a scrapbook (i.e. registered scrapbook) in which frames extracted from the attention content are registered.

In the scrapbook, the frames extracted from the attention content are registered, for example, as moving images in the form in which the temporal before-after relations are maintained.

As described above, since the registered scrapbook generation unit 103 extracts the feature amounts of the respective frames of the image of the attention content, estimates the maximum likelihood state series which is the state series where there is a state transition with a highest likelihood that the feature amount of the attention content is observed in the attention model, extracting the frames corresponding to the state that coincides with the state ID (i.e. registration state ID) of the state of the model map indicated by a user in the initial scrapbook generation processing (see FIG. 25) among the maximum likelihood state series from the attention content, and registers the frames extracted from the attention content in the scrapbook, the user can obtain the scrapbook in which the frames and the frames having the same contents are collected by only designating the state corresponding to the interesting frame (e.g. a frame in which a singer's face is closed up in the scene where the singer is singing) in the model map.

In FIG. 27, although it is exemplified that the registered scrapbook is generated in a state in which all content of the category corresponding to the attention scrapbook are considered as the attention content, it is also possible that the generation of the registered scrapbook is performed by considering only the content designated by the user as the attention content.

Although it is exemplified that in the registered scrapbook generation processing in FIG. 27, the scrapbook selection unit 141 registers the frame extracted from the attention content by selecting the attention scrapbook amount the initial scrapbooks stored in the initial scrapbook storage unit 102, it is also possible to select the attention scrapbook among the registered scrapbook stored in the registered scrapbook storage unit 104.

That is, if a registered scrapbook that corresponds to the category of new content already exists in the case in which the new content is stored in the content storage unit 11, it is possible to perform the registered scrapbook generation processing (see FIG. 27) by considering the new content as the attention content and considering the registered scrapbook that corresponds to the category of the attention content as the attention scrapbook.

Also, in the registered scrapbook generation unit 103 (see FIG. 26), the frame extraction unit 146 may extract audio annexed to the frame (image) in addition to the frame. From the attention content, and the frame registration unit 147 may register the extracted audio in the initial scrapbook.

Also, if a registered scrapbook that corresponds to the category of new content already exists in the case in which the new content is stored in the content storage unit 11, the new state ID may be additionally registered in the registered scrapbook by performing the initial scrapbook generation processing (see FIG. 25) including the content structure presentation processing (see FIG. 13) with the new content considered as the attention content.

Also, in the case of additionally registering the new state ID in the registered scrapbook through the initial scrapbook generation processing, the frame of which the state ID coincides with the new state ID additionally registered in the registered scrapbook may be extracted from the content stored in the content storage unit 11 through performing of the registered scrapbook generation processing (see FIG. 27) with the registered scrapbook considered as the attention scrapbook, and the extracted frame may be additionally registered in the registered scrapbook.

In this case, another frame f' of which the state ID coincides with the new state ID additionally registered in the registered scrapbook may be newly extracted from the content c from which the frame f that has already been registered in the registered scrapbook has been extracted, and additionally registered in the registered scrapbook.

As described above, the additional registration of the frame f' is performed in a state in which the temporal before-after relations between the frame f' and the frame f extracted from the content c from which the frame f' has been extracted.

In this case, since it may be necessary to specify the content c from which the frame f registered in the registered scrapbook has been extracted, the content ID may be registered in the registered scrapbook together with the frame f as the information that specifies the content c from which the frame f has been extracted.

Here, according to the highlight scene detection technology described in Japanese Unexamined Patent Application Publication No. 2005-189832, the average value and dispersion of the size of the motion vector extracted from the image of the content are quantized into four or five labels and the feature amount extracted from audio of the content is classified into labels of "hand clapping", "batting", "woman's voice", "man's voice", "music", "music+voice", and "noise" by a neural net classifier, so that the image label time series and audio label time series are obtained.

Also, in the highlight scene detection technology described in Japanese Unexamined Patent Application Publication No. 2005-189832, in the post-processing, a detector that detects the highlight scene is acquired by learning using label clock series.

That is, data in a highlight scene section among data of the content is determined as learning date to be used in learning the HMM that is a detector, and image and audio label time series obtained from the learning data are provided to the HMM, s that the learning of the discrete HMM (i.e. HMM of which the observed values are discrete values) is performed.

Thereafter, the image and audio label time series of a predetermined length (i.e. window length) are extracted from the content to be detected from which the highlight scene is to be detected by a sliding window processing and provided to the HMM after the leaning, so that the likelihood from which the label time series is observed is obtained in the HMM.

Also, in the case in which the likelihood becomes larger than a predetermined threshold value, the section of the label series from which the likelihood is obtained is detected as the highlight scene section.

According to the highlight scene detection technology described in Japanese Unexamined Patent Application Publication No. 2005-189832, only by providing data in the highlight scene section among data of the content to the HMM as the learning data, the HMM can be obtained as the detector detecting the highlight scene by learning even without designing prior knowledge from experts, such as which feature amount or event scene will be the highlight scene.

As a result, for example, by providing data of the scene that is of interest to a user to the HMM as the leaning data, it becomes possible to detect the scene that is of interest to a user as the highlight scene.

However, according the highlight scene detection technology described in Japanese Unexamined Patent Application Publication No. 2005-189832, content of a specified genre is determined as the content to be detected, and (audio) feature amounts suitable to the labeling of, for example, "hand clapping", "batting", "woman's voice", "man's voice", "music", "music+voice", and "noise" are extracted from such content of a specified genre.

Accordingly, according to the highlight scene detection technology described in Japanese Unexamined Patent Application Publication No. 2005-189832, the content to be detected is limited to the content of the specified genre, and in order to avoid such limits, it is necessary to design (or determine) and extract the feature amount suitable for the genre whenever the genre of the content to be detected differs. Also, although it is necessary to determine the threshold value of the likelihood that is used in detecting the highlight scene for each genre of the content, it may be difficult to determine such threshold value.

By contrast, in the recorder of FIG. 1, the learning of the content model (i.e. HMM) is performed using the feature amount as it is without labeling that indicates the contents of the content, such as "hand clapping", and the content structure is self-systematically acquired. Accordingly, a general feature amount, which is generally used in classifying (or identifying) the scene, rather than the feature amount suitable for the specified genre, can be adopted.

Accordingly, in the recorder of FIG. 1, even in the case in which the content of diverse genres is selected as the content to be detected, it is necessary to perform the learning of the content model for each genre, but it is not necessary to change the feature amount that is extracted from the content for each genre.

From the foregoing, it can be confirmed that the highlight scene detection technology by the recorder of FIG. 1 has a very high generalization and does not depend upon the genre of the content.

Also, according to the recorder of FIG. 1, a user can designate a scene (i.e. frame) that is of interest to a user, the highlight label series, which is obtained by labeling each frame of the content the highlight label that indicates whether the scene is the highlight scene, is generated according to the designation, and the learning of the HMM as the highlight detector is performed by the multi-stream that adopts the highlight label series as the constituent element series. Accordingly, the HMM as the highlight detector can be easily obtained without designing prior knowledge from the experts, such as which feature amount or event scene will be the highlight scene.

As described above, the highlight detection technology according to the recorder of FIG. 1 has a high degree of generalization since the prior knowledge from the experts is not necessary.

Also, the recorder of FIG. 1 learns the user's taste, detects the scene that belongs to the taste (i.e. the scene having interest for a user) as the highlight scene, and provide a digest in which such highlight scenes are collected. Accordingly, so called "personalization" is realized in viewing the content to widen the content enjoying methods.

[Application of a Server Client System]

Although it is possible to configure the recorder of FIG. 1 as a single body device, it may be configured by a server client system composed of a server and a client.

Here, as the content model, and further the content used to learn the content model, content (or content model) that is common to all users may be adopted.

On the other hand, scenes that have interest for a user, i.e. user's highlight scenes, may differ by users.

Accordingly, in the case of configuring the recorder of FIG. 1 by a server client system, the management (e.g. storage) of the content used to learn the content model may be performed, for example, by a server.

Also, the learning of the content structure, i.e. the learning of the content model, may be performed by the server in accordance with the category of the content such as genre of the content, and further, the management (e.g. storage) of the content model after learning may be performed by the server.

Also, for example, in the content model, the server can estimate the maximum likelihood state series which is the state series where there is a state transition with a highest likelihood that the feature amounts of the content, and further can manage (or store) the content model after learning.

In the server client system, the client requests information necessary to perform the learning from the server, and the server provides or transmits the requested information to the client. Then, the client performs necessary processing using the information provided from the server.

Figure 29:
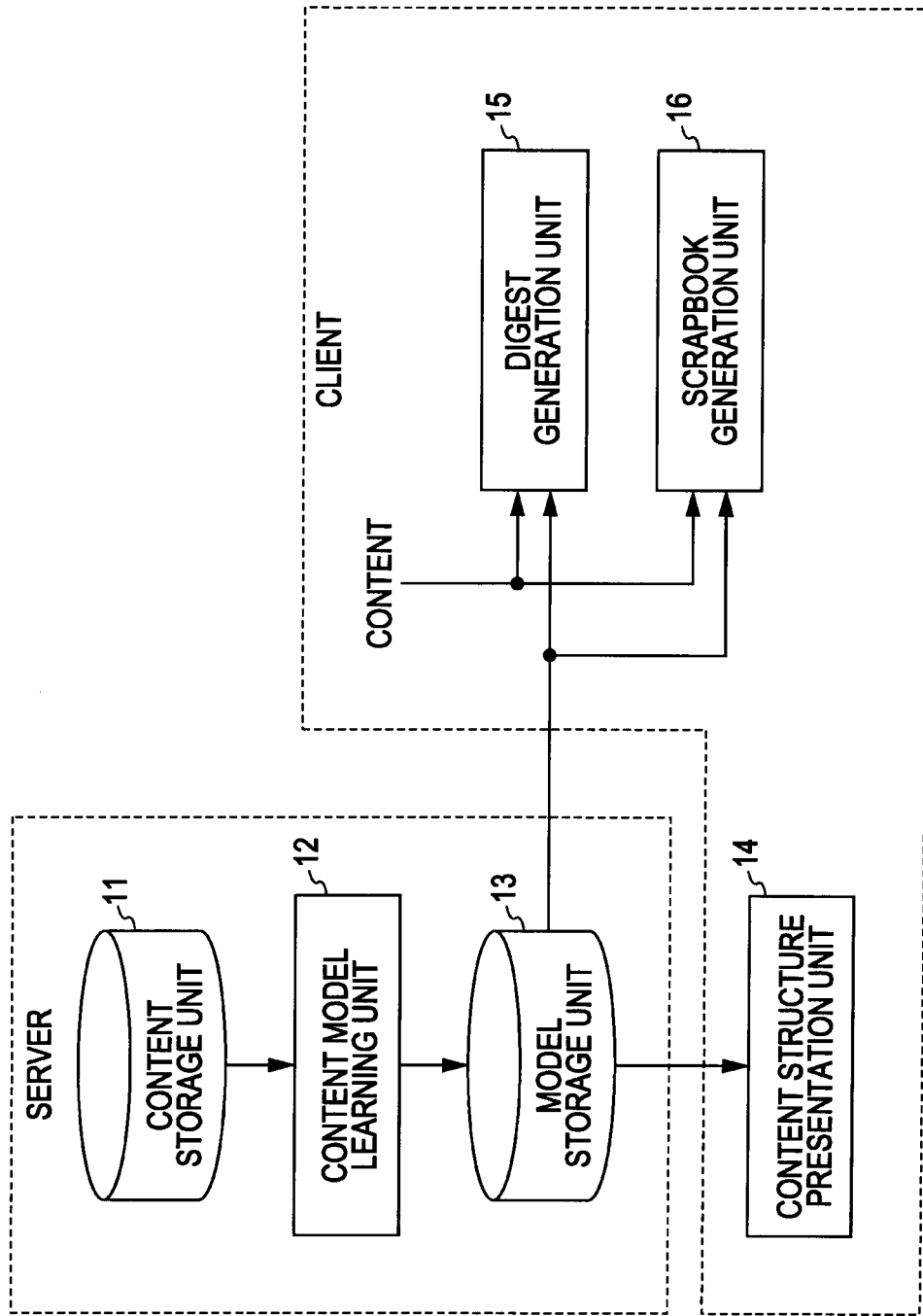
FIG. 29 is a block diagram illustrating a first configuration example of a server client system.

FIG. 29 is a block diagram illustrating a configuration example (i.e. a first configuration example) of the server client system in the case in which the recorder of FIG. 1 is configured by the server client system.

In FIG. 29, the server includes a content storage unit 11, a content model learning unit 12, and a model storage unit 13, and the client includes a content structure presentation unit 14, a digest generation unit 15, and a scrapbook generation unit 16.

In this case, as shown in FIG. 29, the content may be provided from the content storage unit 11 to the client, or may be provided from another block (not illustrated) (e.g. a tuner).

Although in FIG. 29, the content structure presentation unit 14 is installed on the client side as a whole, a part of the content structure presentation unit 14 may be configured as the server, and the remaining part thereof may be configured as the client.

Figure 30:
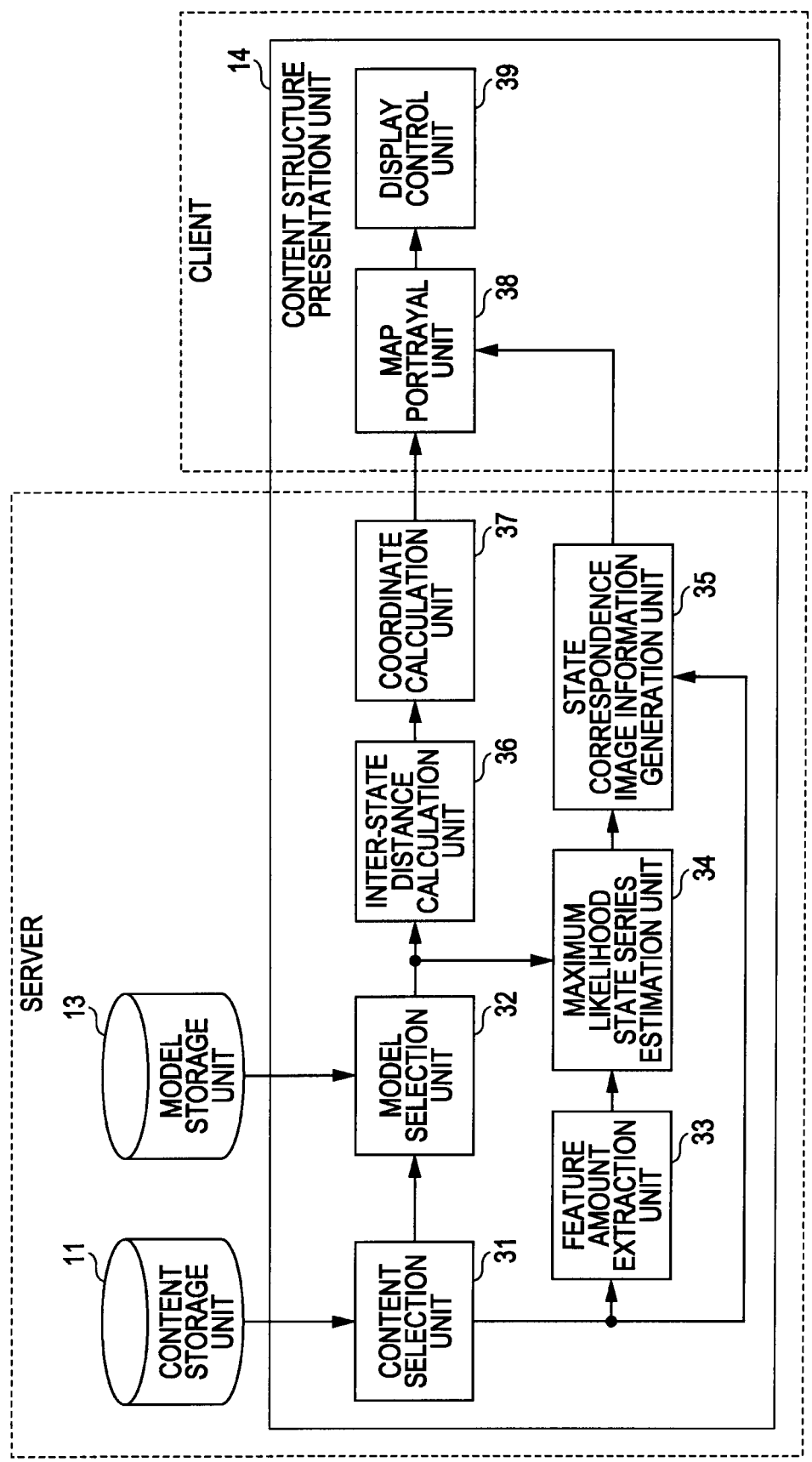
FIG. 30 is a block diagram illustrating a second configuration example of a server client system.

FIG. 30 is a block diagram illustrating a configuration example (i.e. a second configuration example) of the server client system.

In FIG. 30, as a part of the content structure presentation unit 14 (see FIG. 9), the content selection unit 31 to the coordinate calculation unit 37 are installed in the server, and as the remaining part of the content structure presentation unit 14, the map portrayal unit 38 and the display control unit 39 are installed in the client.

In FIG. 30, the client transmits the content ID that is information specifying the content used to portray the model map to the server.

The server selects the content that is specified by the content ID provided from the client as the attention content by the content selection unit 31, obtains state coordinates necessary for the generation (e.g. portrayal) of the model map, and generates the state correspondence image information.

Further, the serve transmits the state coordinates and the state correspondence image information to the client, and the client portrays the model map using the state coordinates provided from the server. The state correspondence image information provided from the server is linked with the model map, and the model map is display on the client.

Although in FIG. 29, the digest generation unit 15 (see FIG. 14) including the highlight detector learning unit 51 is installed on the client side as a whole, a part of the highlight detector learning unit 51 (see FIG. 15) may be configured as the server, and the remaining part thereof may be configured as the client.

Figure 31:
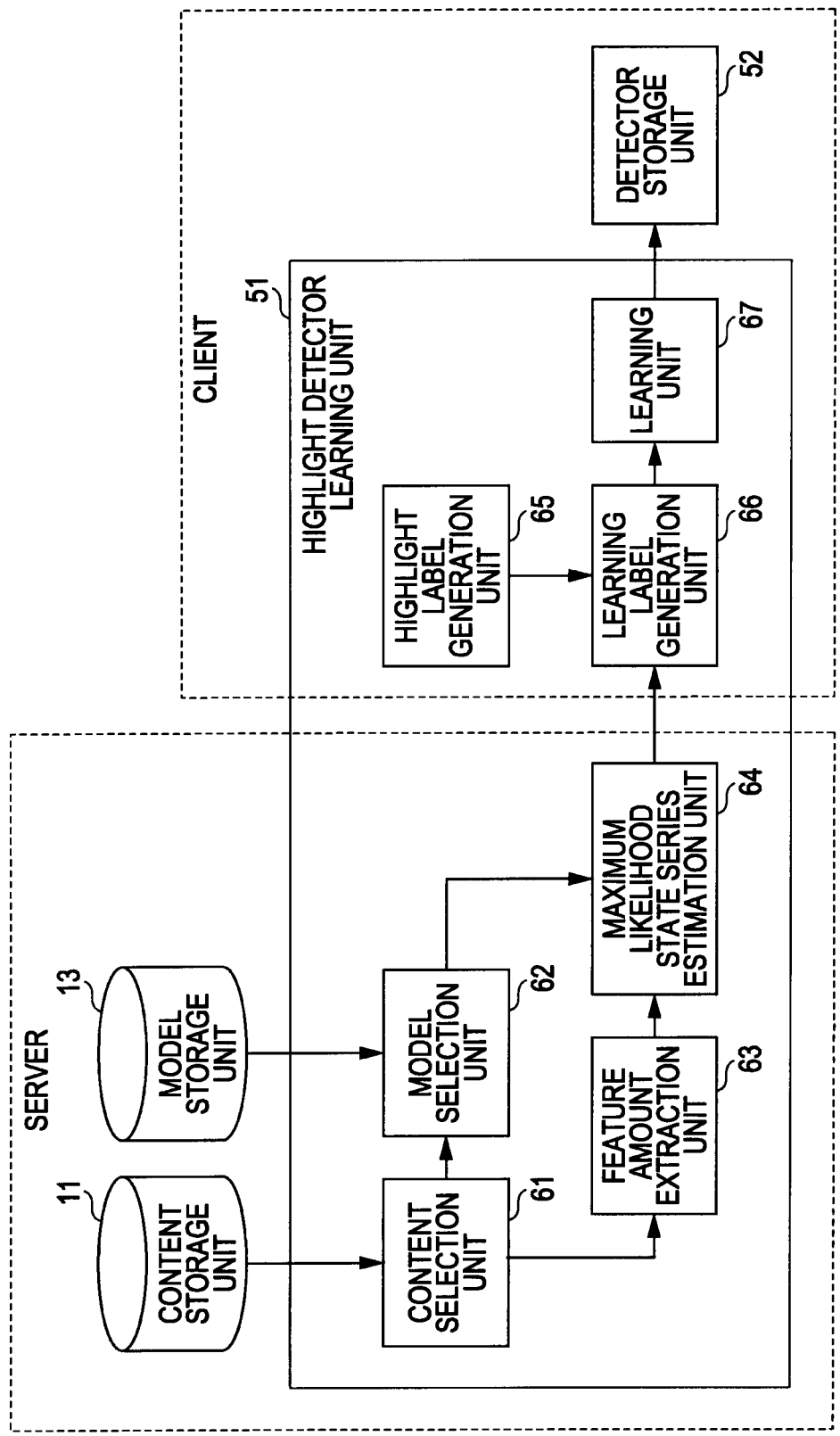
FIG. 31 is a block diagram illustrating a third configuration example of a server client system.

FIG. 31 is a block diagram illustrating a configuration example (i.e. a third configuration example) of the server client system.

In FIG. 31, as a part of the highlight detector learning unit 51 (see FIG. 15), the content selection unit 61 to the maximum likelihood state series estimation unit 64 are installed in the server, and as the remaining part thereof, the highlight label generation unit 65 to the learning unit 67 are installed in the client.

In FIG. 31, the client transmits the content ID of the content used to learn the highlight detector to the server.

The server selects the content that is specified by the content ID provided from the client as the attention content by the content selection unit 61, and obtains the maximum likelihood state series for the attention content. The server provides the maximum likelihood state series for the attention content to the client.

The client generates the learning label series using the maximum likelihood state series provided from the server, and performs the learning of the highlight detector using the learning label series. Also, the client stores the highlight detector after the learning in the detector storage unit 52.

Although in FIG. 29, the digest generation unit 15 (see FIG. 14) including the highlight detection unit 53 is installed on the client side as a whole, a part of the highlight detection unit 53 (see FIG. 18) may be configured as the server, and the remaining part thereof may be configured as the client.

Figure 32:
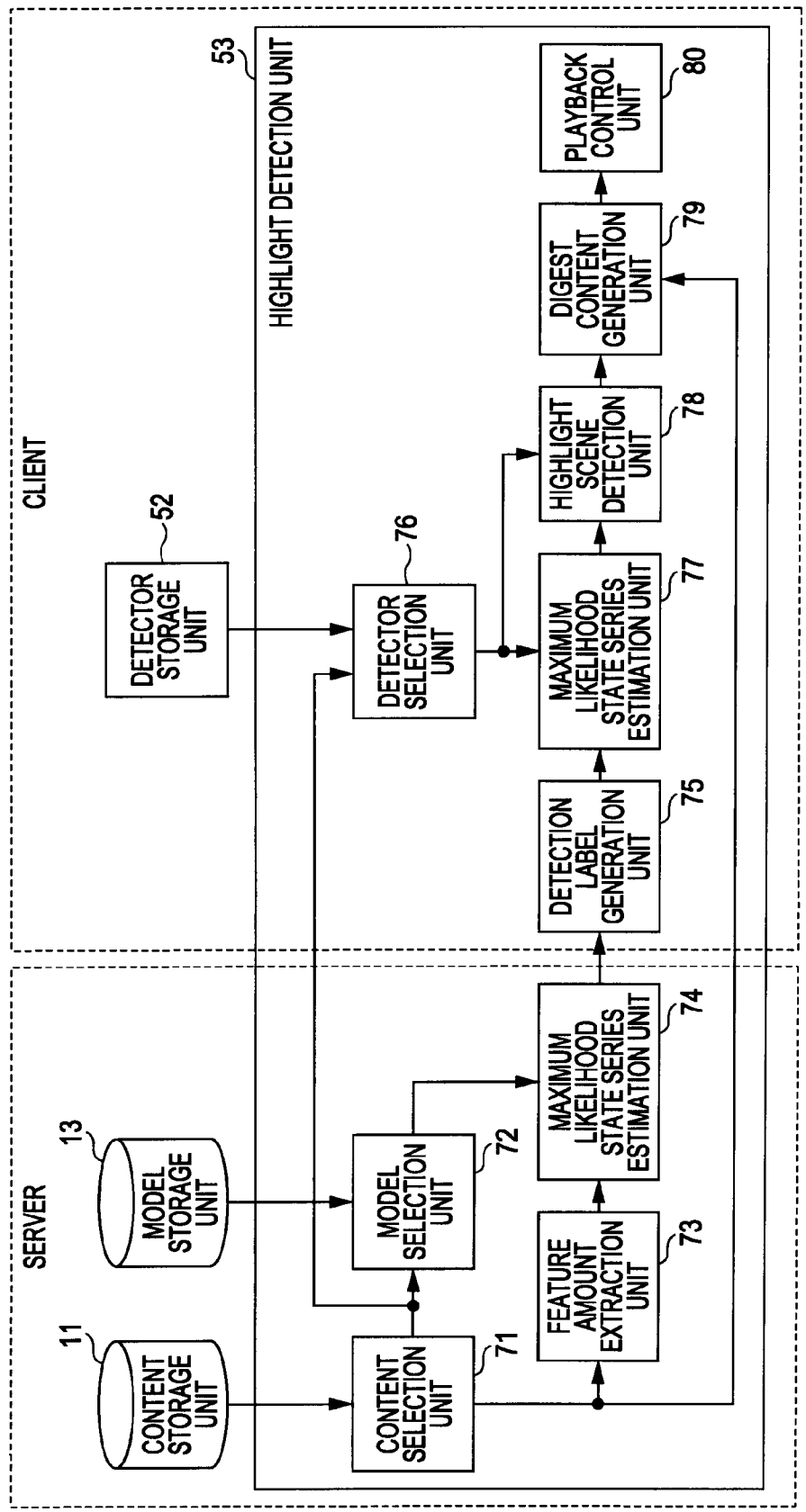
FIG. 32 is a block diagram illustrating a fourth configuration example of a server client system.

FIG. 32 is a block diagram illustrating a configuration example (i.e. a fourth configuration example) of the server client system.

In FIG. 32, as a part of the highlight detection unit 53 (see FIG. 18), the content selection unit 71 to the maximum likelihood state series estimation unit 74 are installed in the server, and as the remaining part thereof, the detection label generation unit 75 to the playback control unit 80 are installed in the client.

In FIG. 32, the client transmits the content ID of the content for the detection of the highlight scene to the server.

The server selects the content that is specified by the content ID provided from the client as the attention content by the content selection unit 111, and obtains the maximum likelihood state series for the attention content. The server provides the maximum likelihood state series for the attention content to the client.

The client generates the detection label series using the maximum likelihood state series provided from the server, and performs the detection of the highlight scene using the highlight detector stored in the detector storage unit 52 and the generation of the digest content using the highlight scene.

Then, although in FIG. 29, the scrapbook generation unit 16 (see FIG. 22) including the initial scrapbook generation unit 101 is installed on the client side as a whole, a part of the initial scrapbook generation unit 101 (see FIG. 23) may be configured as the server, and the remaining part thereof may be configured as the client.

Figure 33:
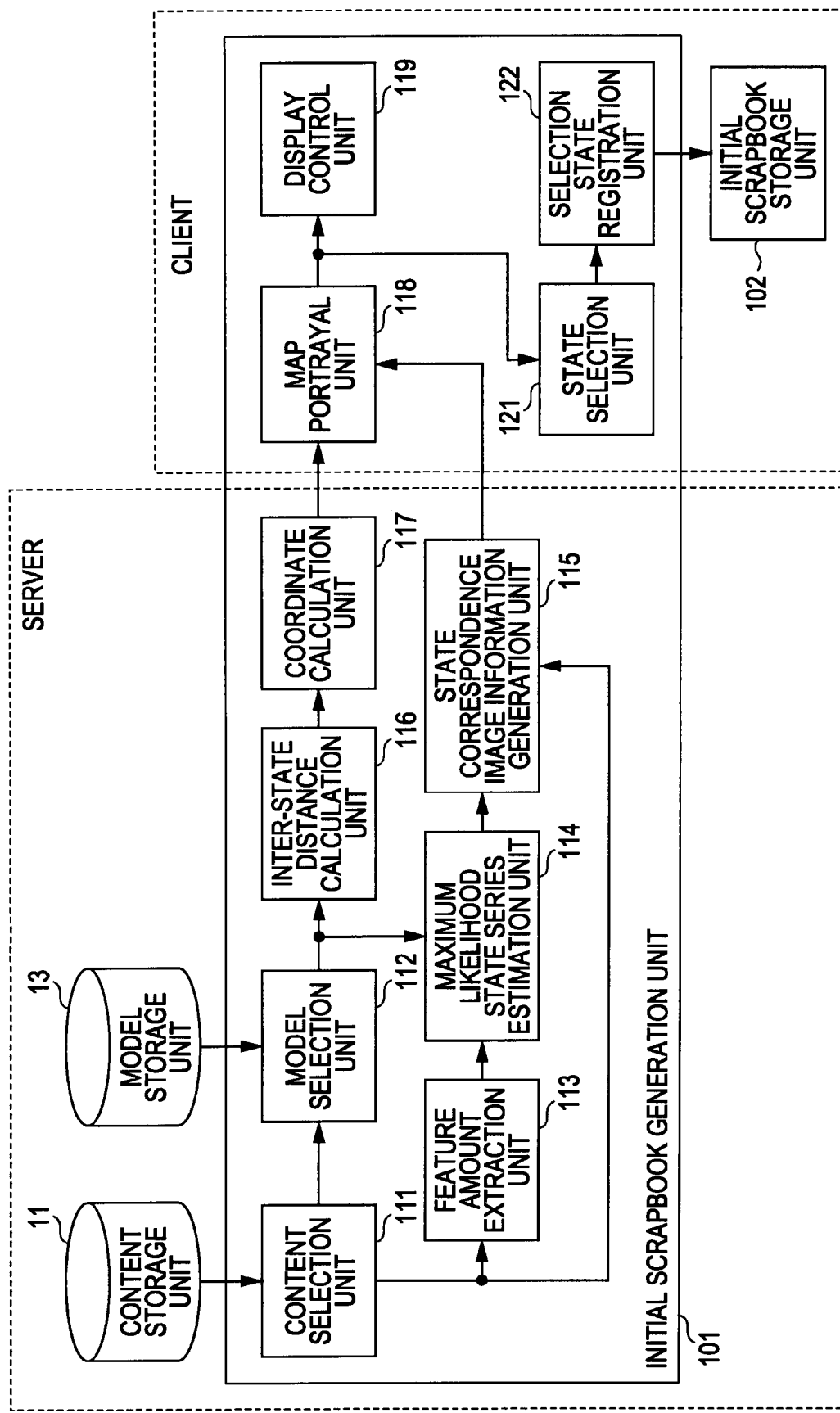
FIG. 33 is a block diagram illustrating a fifth configuration example of a server client system.

FIG. 33 is a block diagram illustrating a configuration example (i.e. a fifth configuration example) of the server client system.

In FIG. 33, as a part of the initial scrapbook generation unit 101 (see FIG. 23), the content selection unit 111 to the coordinate calculation unit 117 are installed in the server, and as the remaining part thereof, the map portrayal unit 118, the display control unit 119, the state selection unit 121, and the selection state registration unit 122 are installed in the client.

In FIG. 33, the client transmits the content ID that is information specifying the content used to portray the model map to the server.

The server selects the content that is specified by the content ID provided from the client as the attention content by the content selection unit 111, obtains the state coordinates necessary to generate (e.g. portray) the model map, and generates the state correspondence image information.

Further, the server transmits the state coordinates and the state correspondence image information to the client, and the client portrays the model map using the state coordinates from the server. The state correspondence image information provided from the server is linked with the model map, and the model map is displayed on the client.

Also, the client selects the state on the model map as the selection state according to the user's manipulation, and recognizes the state ID of the selection state. Also, in the client, the state ID of the selection state is registered in the scrapbook, and the scrapbook is stored in the initial scrapbook storage unit 102 as the initial scrapbook.

Then, although in FIG. 29, the scrapbook generation unit 16 (see FIG. 22) including the registered scrapbook generation unit 103 is installed on the client side as a whole, a part of the registered scrapbook generation unit 103 (see FIG. 26) may be configured as the server, and the remaining part thereof may be configured as the client.

Figure 34:
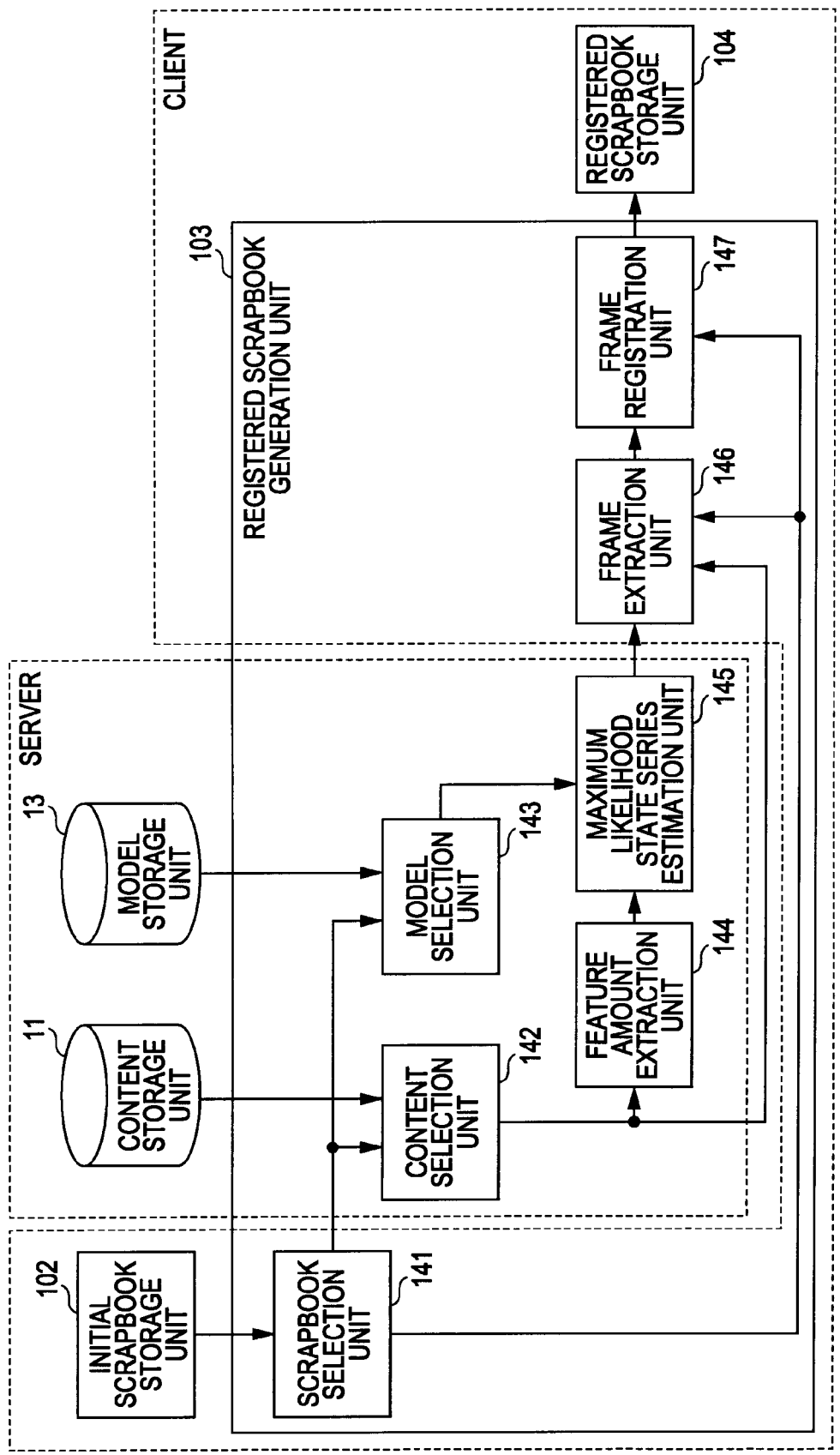
FIG. 34 is a block diagram illustrating a sixth configuration example of a server client system.

FIG. 34 is a block diagram illustrating a configuration example (i.e. sixth configuration example) of the server client system as described above.

In FIG. 34, the content selection unit 142 to the maximum likelihood state series estimation unit 145 are installed in the server as a part of the registered scrapbook generation unit 103 (see FIG. 26), and the scrapbook selection unit 141, the frame extraction unit 146, and the frame registration unit 147 are installed in the client as the remaining part thereof.

In FIG. 34, the client sends the category that corresponds to the attention scrapbook selected by the scrapbook selection unit 141 to the server.

In the server, the maximum likelihood status series of the content model that corresponds to the category sent from the client is estimated, and then is provided to the client together with the content of the category sent from the client.

In the client, the frame that corresponds to the state in which the state ID among the states of the maximum likelihood state series provided from the server coincides with the state ID (i.e. registration state ID) that is registered in the attention scrapbook selected by the scrapbook selection unit 141 is extracted from the content in the server, and registered in the scrapbook.

As described above, by configuring the recorder of FIG. 1 so that the recorder is divided into the server and the client, even the client of which the hardware performance is not high can perform a prompt processing.

In this case, so far as the processing of a part in which the user's taste is reflected among the processing performed by the recorder of FIG. 1 is performed by the client, it is not specially limited how to divide the recorder of FIG. 1 into the server and the client.

[Configuration Example of Other Recorders]

As described above, it is exemplified that by self-systematically structurizing the video content using the feature amount obtained from an image in the unit of a frame, the content model is learned, the content structure is presented, and a digest video or video scrap is generated. However, in learning the content model, other than the image in the unit of a frame may be used as the feature amount, and for example, an object in audio or image may be used as the feature amount.

Figure 35:
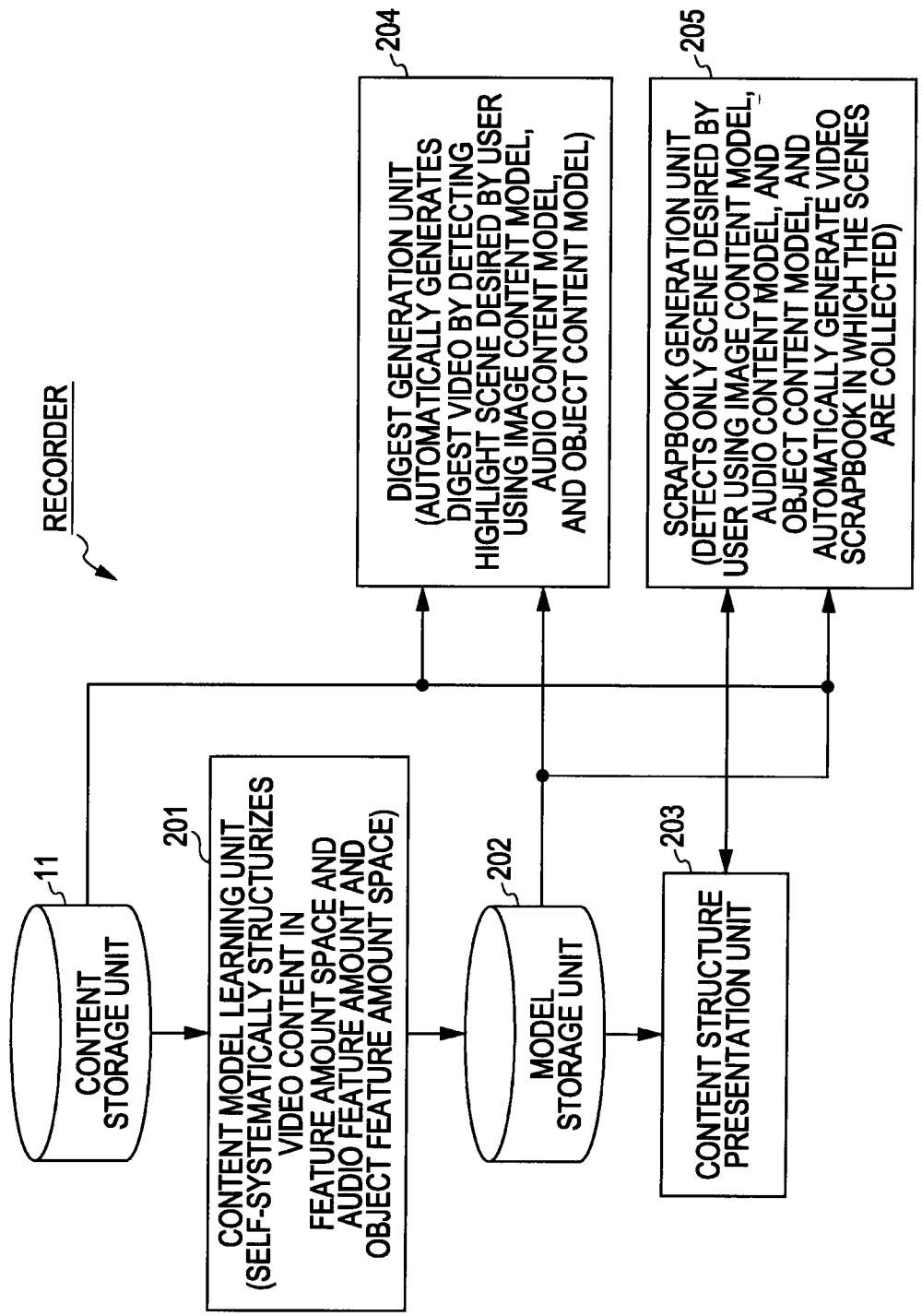
FIG. 35 is a block diagram illustrating a configuration example of a recorder to which an embodiment of the present invention is applied according to another embodiment of the present invention.

FIG. 35 is a block diagram illustrating the configuration of another example of a recorder to which the image processing apparatus according to an embodiment of the present invention, which uses the feature amount other than the image in the unit of a frame, is applied. In this case, the same reference numerals are given to the constituent elements having the same function as that in the recorder of FIG. 1, and the description thereof will be properly omitted.

The recorder of FIG. 35 includes a content model learning unit 201, a model storage unit 202, a content structure presentation unit 203, a digest generation unit 204, and a scrapbook generation unit 205, instead of the content model learning unit 12, the model storage unit 13, the content structure presentation unit 14, the digest generation unit 15, and the scrapbook generation unit 16 which are included in the recorder of FIG. 1.

The basic functions of the content model learning unit 201, the model storage unit 202, the content structure presentation unit 203, the digest generation unit 204, and the scrapbook generation unit 205 are the same as those of the content model learning unit 12, the model storage unit 13, the content structure presentation unit 14, the digest generation unit 15, and the scrapbook generation unit 16 which are included in the recorder of FIG. 1. However, unlike the recorder of FIG. 1, the recorder of FIG. 35 adopts three kinds of feature amounts, i.e. an audio feature amount and an object feature amount in addition to an image feature amount. Hereinafter, an example of handing three kinds of feature amounts will be described. However, the kinds of the feature amounts are not limited thereto, and more than three kinds of feature amounts may also be used.

[Configuration Example of the Content Model Learning Unit 201]

Figure 36:
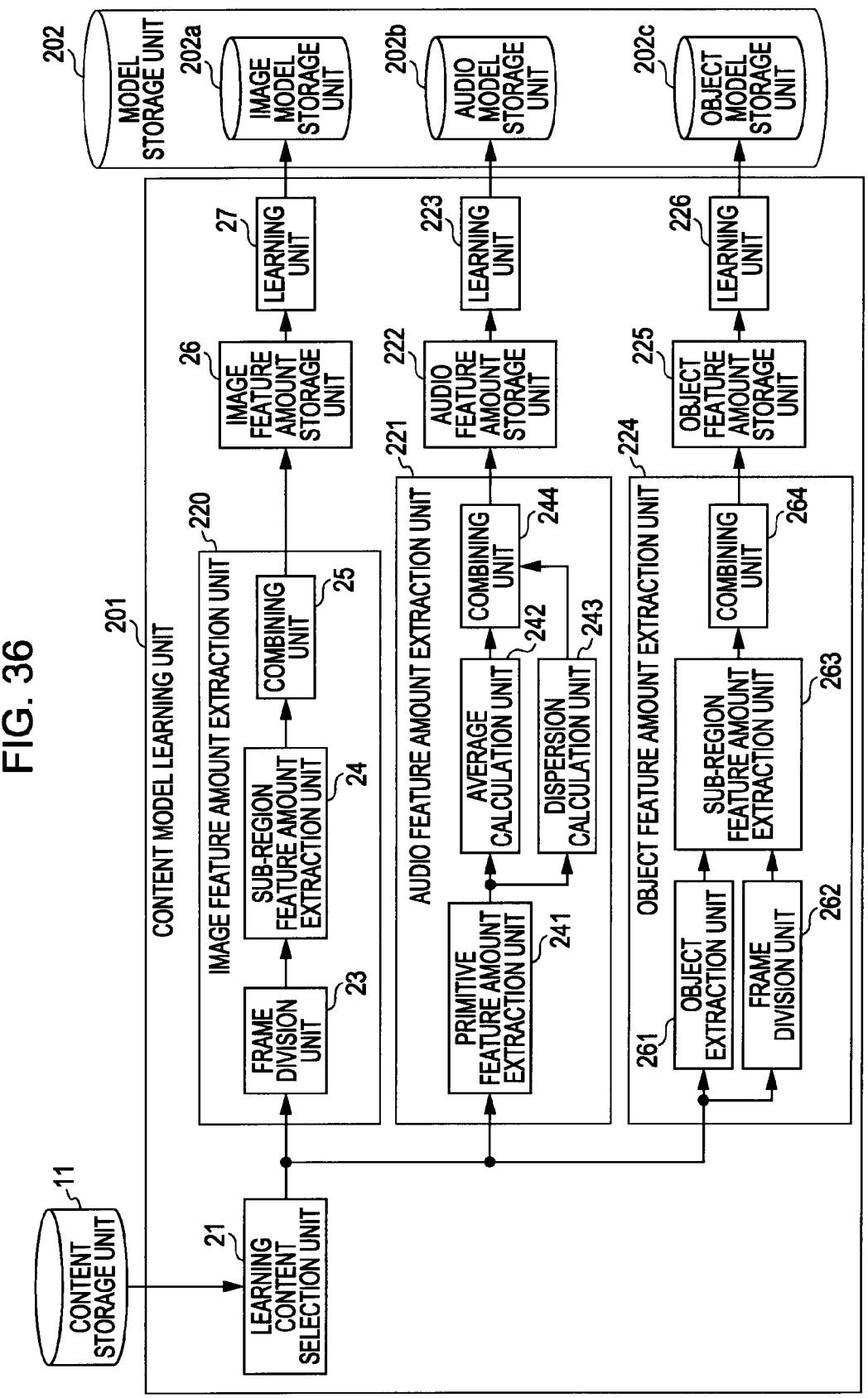
FIG. 36 is a block diagram illustrating a configuration example of a content model learning unit.

FIG. 36 is a block diagram illustrating a configuration example of the content model learning unit 201 of FIG. 35. In the configuration of the content model learning unit 201 illustrated in FIG. 36, the same reference numerals are given to the configuration having the same function as that of the content model learning unit 12 as shown in FIG. 2.

The content model learning unit 201 extracts the image feature amount, the audio feature amount, and the object feature amount as the feature amounts of each frame of an image of the learning content that is the content used to learn the state transition probability model that is prescribed as the state transition probability for the state transition and an observation probability for the observation of a predetermined observation value. Then, the content model learning unit 201 performs the learning of the respective state transition probability models using the image feature amount, audio feature amount, and the object feature amount of the learning content.

The image feature amount extraction unit 220 is the same as the feature amount extraction unit 22, and further, the image feature amount storage unit 26 and the learning unit 27 are the same as those in FIG. 2. That is, the configuration for processing the image feature amount is the same as the content model learning unit 12 of FIG. 2. Also, in the learning unit 27, the content model obtained by the learning is stored in the image model storage unit 202a in the model storage unit 202. That is, the image model storage unit 202a is the same as the model storage unit 13 in FIG. 2. In this case, since the content model is obtained by the image feature amount, it is hereinafter called an image content model.

The audio feature amount extraction unit 221 extracts the feature amount by making the audio of the learning content correspond to the respective frames of the image.

The audio feature amount extraction unit 221 demultiplexes the learning content provided from the learning content selection unit 21 into image and audio data, extracts the feature amount of the audio by making the data correspond to the respective frames, and provides the extracted feature amount to the audio feature amount storage unit 222. Hereinafter, the audio feature amount in the unit of a frame will be called the audio feature amount.

That is, the audio feature amount extraction unit 221 includes a primitive feature amount extraction unit 241, an average calculation unit 242, a dispersion calculation unit 243, and a combining unit 244.

The primitive feature amount extraction unit 241 extracts a primitive feature amount as an original feature amount for generating an audio feature amount suitable to classify the audio, such as the audio feature amount used in the sound classification or audio classification field, into scenes (e.g. "music", "non-music", "noise", "human voice", "human voice+music", "audience", and the like). The primitive feature amount may be energy, zero cross rate, spectrum center, or the like, which are obtained through calculation from the audio signal in a relative short time unit, for example, such as in the order of about 10 msec using an audio feature amount extraction method used in the audio classification field.

More specifically, the primitive feature amount extraction unit 241 extracts the primitive feature amount by a feature amount extraction method, for example, that is discussed in Zhu Liu; Jincheong Huang; Yao Wang; Tsuhan Chen, Audio feature extraction and analysis for scene classification, First Workshop on Mulitmedia Signal Processing, 1997., IEEE Volume, Issue, 23-25 Jun. 1997 Page(s): 343-348, and Brezeale, D. Cook, D. J., Automatic Video Classification: A Survey of the Literature, IEEE Transactions on Systems, Man, and Cybernetics, Part C: Applications and Reviews, May 2008, Volume:38, Issue:3, pp. 416-430.

The average calculation unit 242 extracts the feature amount in time series in a longer time unit by calculating an average value as the statistical amount in a longer time unit (generally equal to or more than 1 sec) from the primitive feature amount time series, and provides the extracted feature amount to the combining unit 244.

The dispersion calculation unit 243 extracts the feature amount in time series in a longer time unit by calculating the dispersion as the statistical amount in a longer time unit (generally equal to or more than 1 sec) from the primitive feature amount time series, and provides the extracted feature amount to the combining unit 244.

The combining unit 244 combines the average value and dispersion obtained as the statistical amount from the primitive feature amount time series, and provides the result of combining to the audio feature amount storage unit 26 as the feature amount of the attention frame.

More specifically, the audio feature amount may be necessary to be extracted so that it synchronizes with the above-described image feature amount to realize the following process. Accordingly, since the audio feature amount is to extract the audio feature amount suitable to discriminate the scene by audio at respective times when the image feature amount is extracted, it is generated by the following method.

Figure 37:
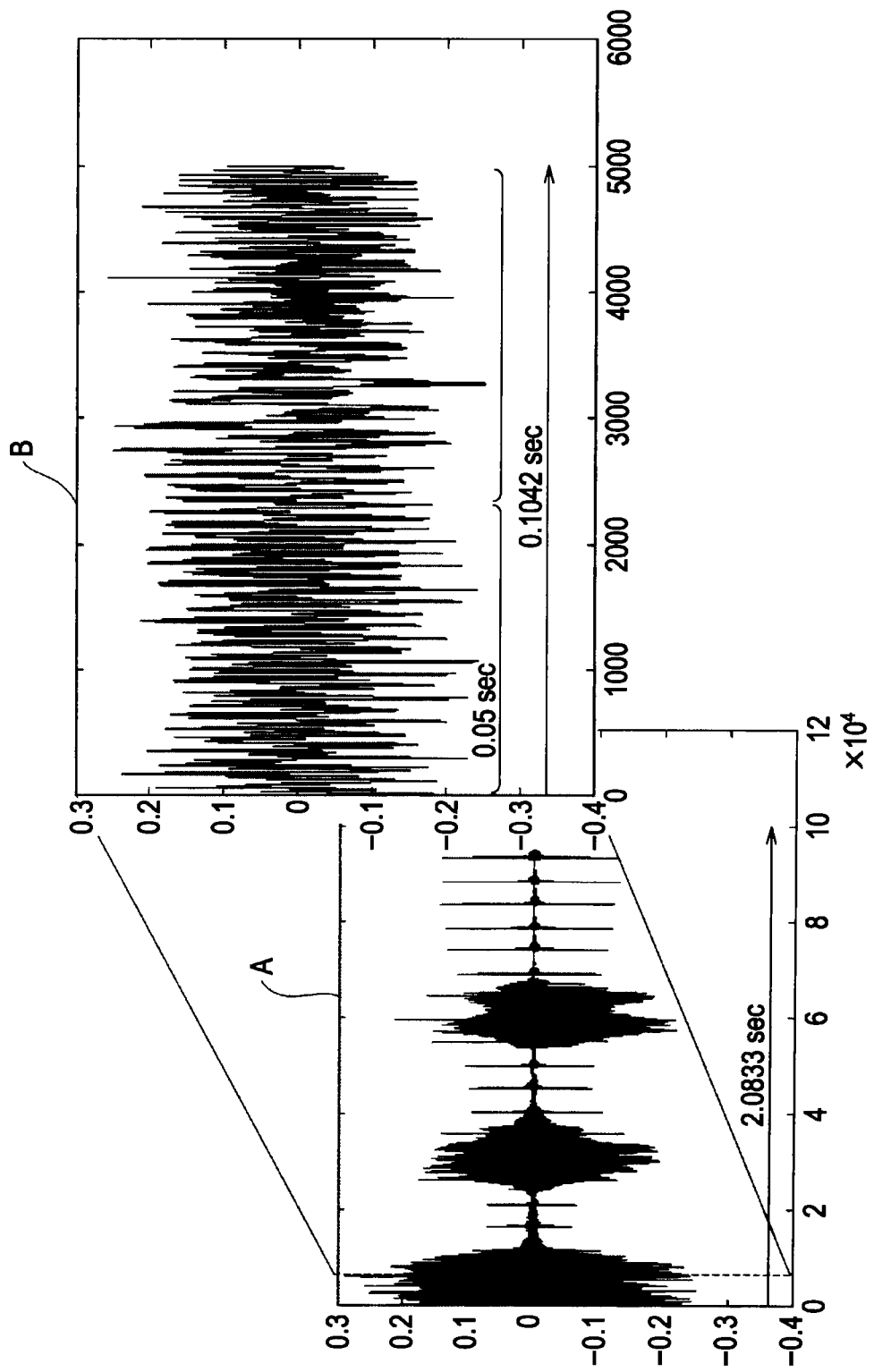
FIG. 37 is a diagram illustrating the feature amount extraction processed by an audio feature amount extraction unit.

That is, the primitive feature amount extraction unit 241 converts the sound signal into a monaural sound signal if the sound signal is a stereo sound signal. Then, as illustrated in FIG. 37, the primitive feature amount extraction unit 241 extracts the primitive feature amount in a successive time width unit of 0.05 sec with a step width of 0.05 sec, indicated as the waveform "B", from the energy waveform of the audio signal indicated as the waveform "A". Here, in the waveform diagram of A and B, the vertical axis represents energy of the audio signal, and the horizontal axis represents time. Also, the waveform B is displayed with its resolution heightened with respect to a part of the waveform A. The waveform A is in the range of $0(\times 10^4)$ to $10(\times 10^4)$ at a scale of 2.0833 sec. Also, the waveform B is in the range of 0 to 5000 at a scale of 0.1042 sec. On the other hand, the primitive feature amount may be extracted in duplicate in a predetermined time range that is considered as the same time. In this case, the primitive feature amount extraction unit 241 combines them as elements to form a feature amount vector as the primitive feature amount.

Then, at the respective times when the image feature amount is extracted, as illustrated in FIGS. 38A to 38D, the average calculation unit 242 and the dispersion calculation unit 243 obtain the average value and the dispersion of the energy of the audio signal with respect to 0.5 sec before-after period (i.e. window size of 1.0 sec) of the primitive feature amount corresponding to that time, and considers the feature amount vector at the corresponding time as the audio feature amount.

In FIGS. 38A to 38D, the waveform A is a waveform indicating the relations between the identifier Sid for identifying the sampling data of the audio information and the size of energy that is the primitive feature amount, and the waveform B is a waveform indicating the relations between the identifier Vid for identifying the image frame and the image feature amount (GIST). In the waveforms A and B, circles indicate the primitive feature amount and the image feature amount, respectively.

The waveform diagrams C and D are waveform diagrams which are the basis of the waveform diagrams A and D and of which the display intervals of the identifiers Sid and Vid on a horizontal axis is enlarged. In FIGS. 38A to 38D, it is exemplified that the sampling rate fq_s of the primitive feature amount of the audio is 20 Hz and the sampling rate fq_v of the image feature amount is 3 Hz.

As described above, since the audio feature amount and the image feature amount necessitate synchronization with each other, as shown as waveform diagrams A and B of FIGS. 38A to 38D, the audio identifier Sid and the image identifier Vid have the relations indicated in Equation (4) as follows.

$$Sid = ceil((Vid-1) \times (fq\_s/fq\_v)) + 1 \qquad (4)$$

Here, ceil( ) denotes a function that indicates rounding in a positive infinite direction.

The relations between the identifiers Sid and Vid as determined above become the relations indicated in waveform diagrams A and B in FIGS. 38A to 38D. That is, the range of the primitive feature amount of the identifier Sid that exists to correspond to the identifier Vid of the image feature amount and the three before-after primitive feature amounts (seven in total) becomes the window size W(=1.0 sec), and the average value and the dispersion in the window size W becomes the audio feature amount that corresponds to the frame image of the identifier Vid. Here, the window size W is defined by Equation (5) below.

$$W = round(K \times (fq\_s/fq\_v)) \qquad (6)$$

Here, round( ) is a function having the nearest integer, and K is a predetermined integer. In FIGS. 38A to 38D, K becomes 1.

The audio feature amount extracted as above is stored in the audio feature amount storage unit 222. On the other hand, since the functions of the audio feature amount storage unit 222 and the learning unit 223 are the same as those of the image feature amount storage unit 26 and the learning unit 27, their explanation will be omitted. Further, the content model obtained by learning processing by the learning unit 223 is stored in the audio model storage unit 202*b* of the model storage unit 202 as the audio content model.

The object feature amount extraction unit 224 extracts the feature amount by making the object correspond to the respective frames of the image of the learning content.

The object feature amount extraction unit 224 detects the object, for example, which may be a character and a face, included in the frame of the image, as a tetragonal image by demultiplexing the learning content provided from the learning content selection unit 21 into image and audio data. Also, the object feature amount extraction unit 224 extracts the feature amount using the detected tetragonal image, and provides the extracted feature amount to the object feature amount storage unit 225.

That is, the object feature amount extraction unit 224 includes an object extraction unit 261, a frame division unit 262, a sub-region feature amount extraction unit 263, and a combining unit 264.

The object extraction unit 261 demultiplexes the content video into image and audio data. Then, the object extraction unit 261 performs the object detection, for example, detects objects OB1 and OB2 composed of a tetragonal region within the frame F1 as shown as in left upper part of FIG. 39 under the assumption that the object corresponds to the external whole body of the character. Then, the object extraction unit 261 outputs vectors (X1, Y1, W1, H1) and (X2, Y2, W2, H2) composed of left upper coordinates, width, and height of the tetragonal region including the detected object, which is indicated by an oblique line in the left lower part of FIG. 39 to the sub-region feature amount extraction unit 263. At this time, if a plurality of objects is detected and a plurality of tetragonal regions is outputted, this information is output to frame 1 as many as the number of detections.

Figure 39:
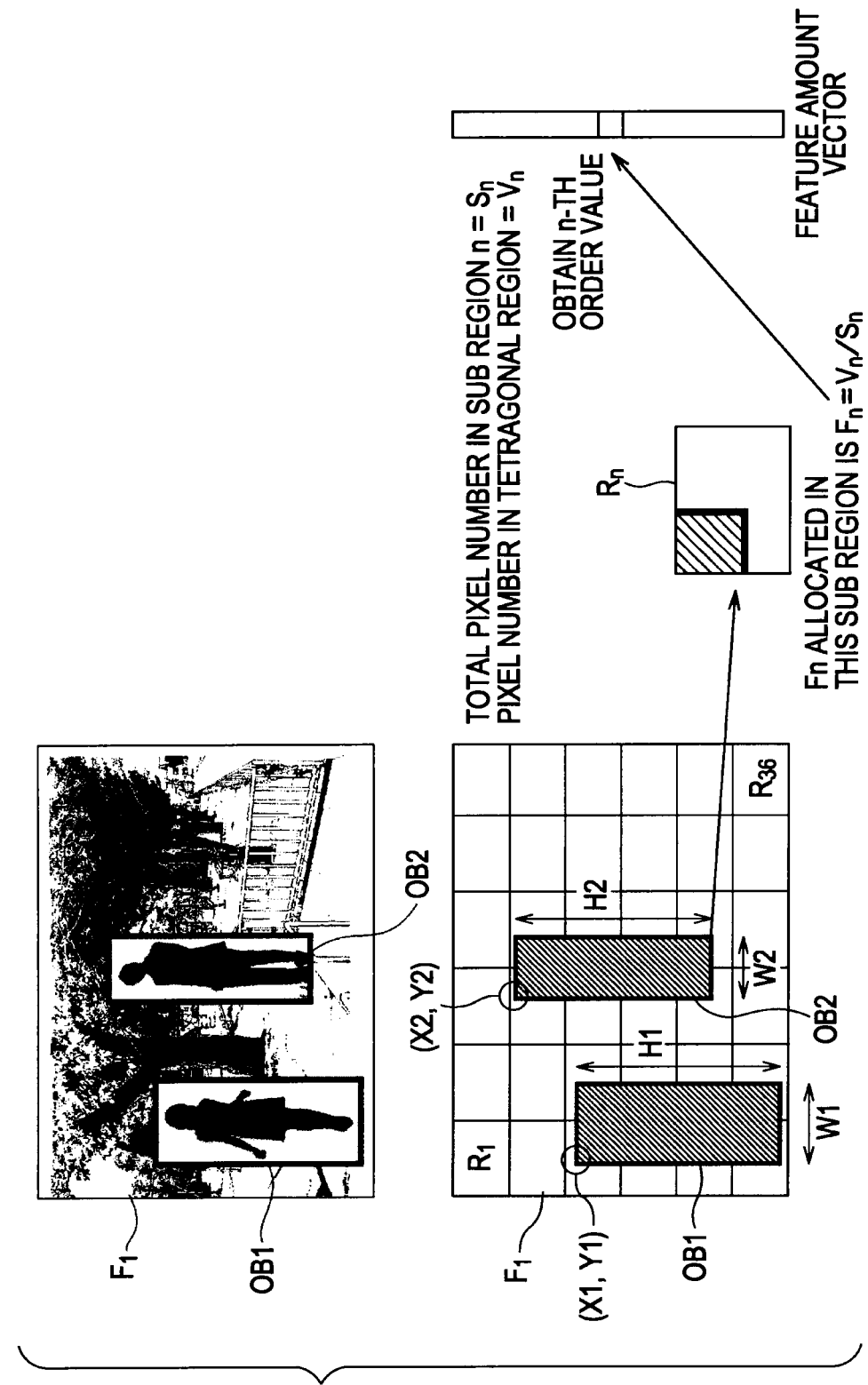
FIG. 39 is a diagram illustrating the feature amount extraction processed by an object feature amount extraction unit.

Simultaneously, the frame division unit 262, in the same manner as the frame division unit 23, divides the frame into sub regions R1 to R36(6×6) as shown in a left lower part of FIG. 39, and provides the divided sub regions to the sub-region feature amount extraction unit 263.

The sub-regions feature amount extraction unit 263, as illustrated in the center lower part of FIG. 39, counts the number of pixels $V_n$ in the tetragonal region for the respective sub regions $R_n$ and accumulates the counted value as many as the number of detections. Also, the sub-regions feature amount extraction unit 263 normalizes the image size by dividing the pixel numbers $V_n$ in the tetragonal region by the total number of pixels $S_n$ in the sub region, and outputs the result of division to the combining unit 264.

The combining unit 264, as shown in the right lower part of FIG. 39, generates object feature amount vectors constituting the object feature amount by combining the calculated values in the respective regions, and outputs the generated object feature amount vectors to the object feature amount storage unit 225. At this time, since the functions of the object feature amount storage unit 225 and the learning unit 226 are the same as those of the image feature amount storage unit 26 and the learning unit 27, the explanation thereof will be omitted. Further, the content model obtained by the learning processed by the learning unit 226 is stored in the object model storage unit 202c of the model storage unit 202 as the object content mode.

[Content Model Learning Processing Performed by the Content Model Learning Unit 201]

Next, the content model learning process performed by the content model learning unit 201 of FIG. 36 will be described. The content model learning process performed by the content model learning unit 201 of FIG. 36 is constituted of an image content model learning process, an audio content model learning process and an object content model learning process according to the kind of feature amount. Among them, the image content model learning process is similar to the content model learning process which is described with reference to FIG. 8, except that the created image content model is stored in an image model storage unit 202a, and thus the description thereof will be omitted.

Figure 40:
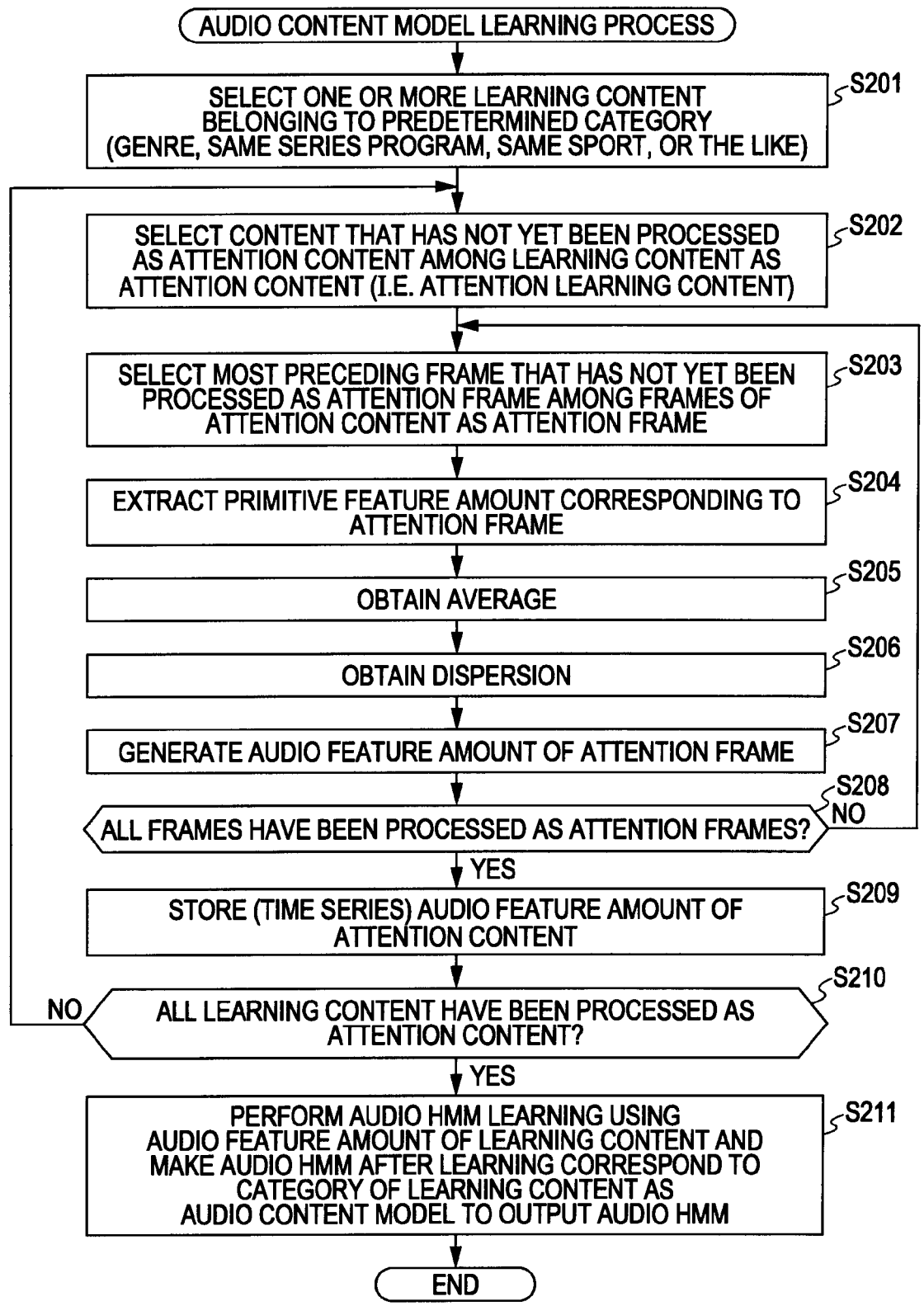
FIG. 40 is a flowchart illustrating the audio content mode learning processed by a content model learning unit.

Next, the audio content model learning process performed by the content model learning unit 201 of FIG. 36 will be described with reference to the flowchart of FIG. 40. In this instance, the process of step S201 in FIG. 40 is similar to the process of step S11 in FIG. 8, and thus the description thereof will be omitted.

In step S202, the primitive feature amount extraction unit 241 of the audio feature amount extraction unit 221 selects content that has not yet been processed as attention learning content (hereinafter referred to as "attention content") among learning content provided from the learning content selection unit 21 as the attention content.

Then, the primitive feature amount extraction unit 241 proceeds from step S202 to step S203, and selects the most visually preceding frame that has not yet been processed as the attention frame among frames of the attention content as the attention frame to proceed to step S204.

In step S204, the primitive feature amount extraction unit 241 extracts a primitive feature amount as a primitive feature amount for generating an audio feature amount suitable to classify a scene from the audio, as described with reference to FIGS. 37 and 38. The primitive feature amount extraction unit 241 supplies the extracted primitive feature amount to an average calculation unit 242 and a dispersion calculation unit 243.

In step S205, the average calculation unit 242 calculates an average value of the attention frames among the supplied primitive feature amounts, and supplies it to a combining unit 244.

In step S206, the dispersion calculation unit 243 calculates a dispersion of the attention frames among the supplied primitive feature amounts, and supplies it to a combining unit 244.

In step S207, the combining unit 244 constitutes a feature amount vector by combining the average value of the primitive feature amount of the attention frame supplied from the average calculation unit 242 and the dispersion of the primitive feature of the attention frame supplied from the dispersion calculation unit 243. The combining unit 244 generates the feature vector as the audio feature amount of the attention frame, and the process proceeds to step S208.

In step S208, the frame division unit 23 judges whether all the frames of the notice content have been processed as the attention frames.

In step S208, if it is judged that any frame that has not yet been processed as the attention frame exists, the frame division unit 23 returns to step S203 to repeat the same process.

In step S208, if it is judged that all the frames have been processed as the attention frames, the combining unit 224 proceeds to step S209, and provides (time series) feature amounts of the respective frames of the notice content to the feature amount storage unit 222 to store the feature amounts in the feature amount storage unit 222.

Then, the primitive feature amount extraction unit 241 proceeds from step S209 to step S210, and judges whether all the learning content provided from the learning content selection unit 21 have been processed as the attention content.

In step S210, if it is judged that any content that has not yet been processed as the attention content exists, the primitive feature amount extraction unit 241 returns to step S202 to repeat the same process.

In step S210, if it is judged that all the content have been processed as the attention content, the learning unit 223 proceeds to step S211, and performs the learning of audio HMM using the audio feature amount of the learning content (i.e. time series of the audio feature amounts of the respective frames) stored in the audio feature amount storage unit 222.

Then, the learning unit 223 makes the audio HMM after learning correspond to the category of the learning content as the audio content model, and outputs (i.e. provides) the audio HMM to the audio model storage unit 202b to complete the audio content model learning.

The audio content model learning process may start at certain timing.

According to the above-described audio content model learning processing, in the audio HMM, the content structure (e.g. the structure in which audio or the like occurs) that is latent in the learning content is self-systematically acquired.

As a result, each state of the audio HMM as the audio content model, which is obtained according to the audio content model learning processing, corresponds to elements of the content acquired by the learning, and the state transition expresses a temporal transition between the elements of the content structure.

Also, the state of the audio content model is expressed through combination of frame groups (i.e. similar scenes) of which spatial distances in an audio feature amount space (i.e. space of audio feature amount extracted by the audio feature amount extraction unit 221 (See FIG. 36) are close to one another and of which the temporal before-after relations are similar to one another.

Figure 41:
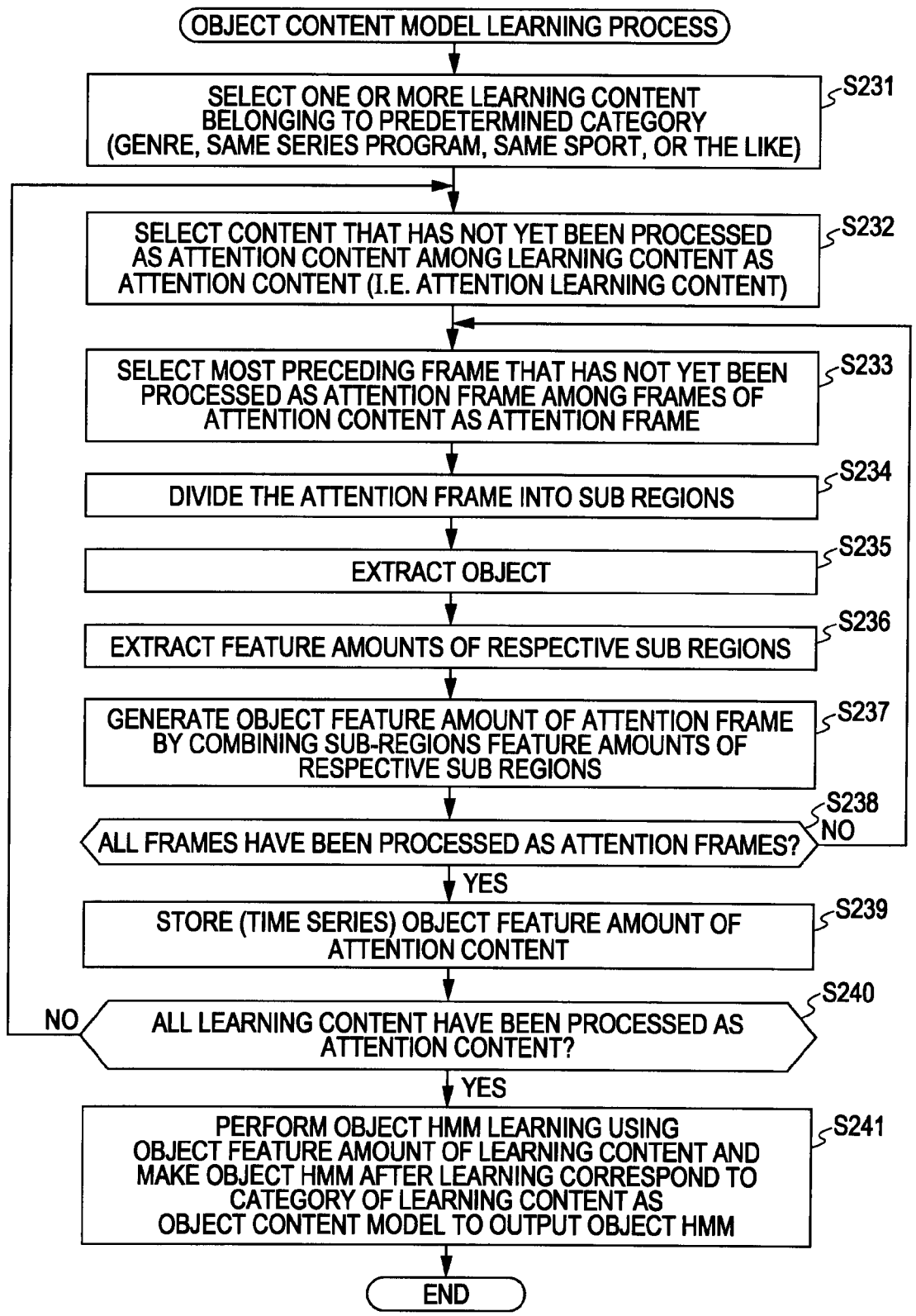
FIG. 41 is a flowchart illustrating the object content mode learning processed by a content model learning unit.

Next, with reference to the flowchart of FIG. 41, the object content model learning process performed by the content model learning unit 201 of FIG. 36 will be described. In this instance, the process of step S231 in FIG. 41 is similar to step S11 of FIG. 8, and thus the description thereof will be omitted herein.

In step S232, the frame division unit 262 of the object feature amount extraction unit 224 selects content that has not yet been processed as attention learning content (hereinafter referred to as "attention content") among learning content provided from the learning content selection unit 21 as the attention content.

Then, the frame division unit 262 proceeds from step S232 to step S233, selects the most visually preceding frame that has not yet been processed as the attention frame among frames of the attention content as the attention frame, and proceeds to step S234.

In step S234, the frame division unit 262 divides the attention frame into a plurality of sub regions, provides the divided sub regions to the sub-region feature amount extraction unit 263, and proceeds to step S235.

In step S235, the object extraction unit 261 detects an object contained in the attention frame, makes a region containing the detected object into a rectangular region, and outputs a vector constituted of upper left coordinates of the rectangular region, a width and a height to the sub-region feature amount extraction unit 263.

In step S236, the sub-region feature amount extraction unit 263 counts the number of pixels of the object rectangular region among plural sub-regions from the frame division unit 262. Further, the sub-region feature amount extraction unit 263 calculates and normalizes the number of pixels of the object rectangular region in each sub region, and provides the normalized number of pixels to the combining unit 264 as the sub-region feature amount.

In step S237, the combining unit 264 generates the feature amount of the attention frame by combining the sub-region feature amounts of the plurality of sub regions constituting the attention frame from the sub-region feature amount extraction unit 263, and proceeds to step S238.

In step S238, the frame division unit 262 judges whether all the frames of the notice content have been processed as the attention frames.

In step S238, if it is judged that any frame that has not yet been processed as the attention frame exists, the frame division unit 262 returns to step S233 to repeat the same process.

Further, in step S238, if it is judged that all the frames have been processed as the attention frames, the combining unit 244 proceeds to step S239, and provides (time series) feature amounts of the respective frames of the notice content to the feature amount storage unit 225 to store the feature amounts in the feature amount storage unit 225.

Then, the frame division unit 262 proceeds from step S239 to step S240, and judges whether all the learning content provided from the learning content selection unit 21 have been processed as the attention content.

In step S240, if it is judged that any content that has not yet been processed as the attention content exists, the frame division unit 262 returns to step S232 to repeat the same process.

Further, in step S240, if it is judged that all the content have been processed as the attention content, the process proceeds to step S241. In step S241, the learning unit 226 performs the learning of the object HMM using the feature amount of the learning content (i.e. time series feature amounts of the respective frames) stored in the object feature amount storage unit 225.

Then, the learning unit 226 makes the object HMM after learning correspond to the category of the learning content as the content model, and outputs (i.e. provides) the HMM to the object model storage unit 202*c* to complete the content model learning.

At this time, the object content model learning process may start at certain timing.

According to the above-described object content model learning processing, in the object HMM, the content structure (e.g. the structure in which appearance of an object or the like occurs) that is latent in the learning content is self-systematically acquired.

As a result, each state of the object HMM as the object content model, which is obtained according to the content model learning processing, corresponds to elements of the content acquired by the learning, and the state transition expresses a visual transition between the elements of the content structure.

Also, the state of the object content model is expressed through combination of frame groups (i.e. similar scenes) of which spatial distances in an object feature amount space (i.e. space of object feature amount extracted by object the feature amount extraction unit 224 (See FIG. 36) are close to one another and of which the temporal before-after relations are similar to one another.

Next, the configuration example of the content structure presentation unit 203 will be described. The configuration example of the content structure presentation unit 203 is similar to that of an initial scrapbook generation unit 371 (FIG. 48) which will be described below, except for a state selection unit 419 and a selection state registration unit 420. The reason is that it is configured by installing the content structure representation unit 14 corresponding to each of the image content model, the audio content model and the object content model.

In addition, the content structure presentation unit 203 processes a map image of each content structure of the image content model, the audio content model and the object content model to display the map image separately on a window or on independent window. Consequently, with respect to each of the image content model, the audio content model and the object content model, the same process as that of the content structure presentation process (FIG. 13) in the above-described content structure presentation unit 14 (FIG. 9) is performed.

From the above description, the construction example of the content structure presentation unit 203 and the content structure presentation process thereof will be not described herein.

[Configuration Example of a Digest Generation Unit 204]

Figure 42:
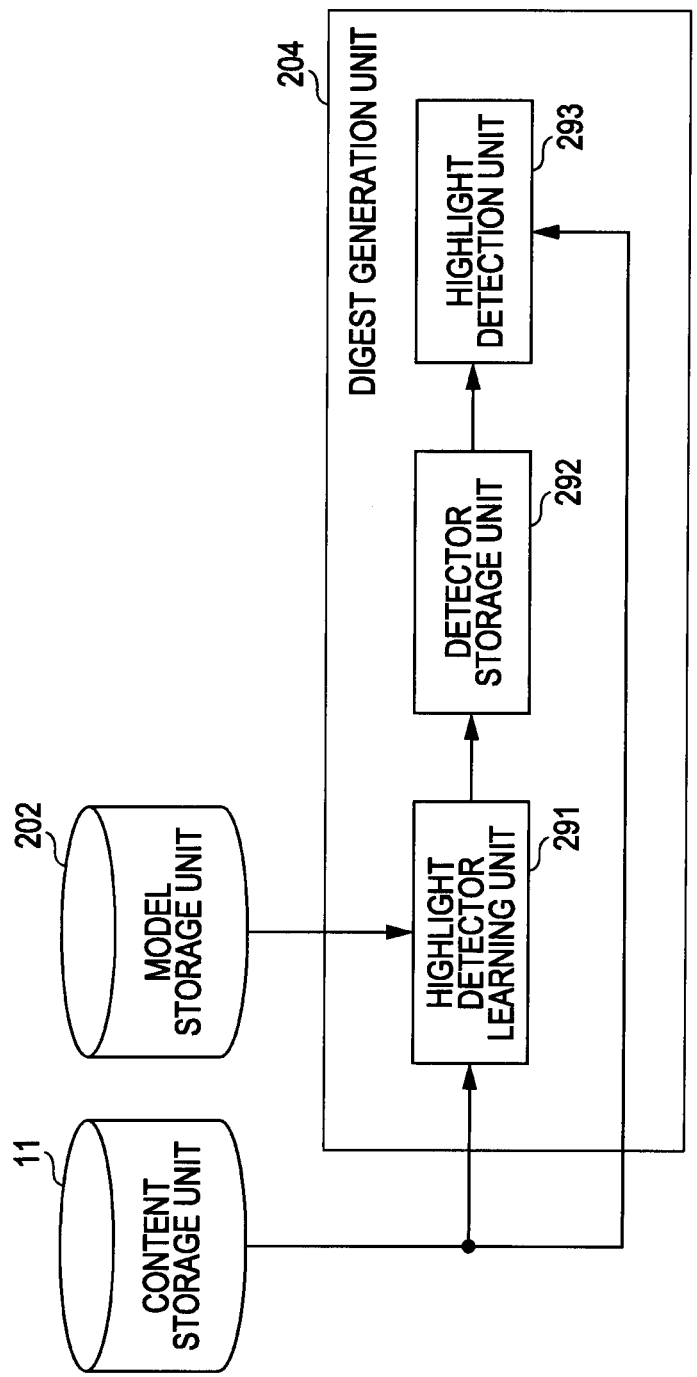
FIG. 42 is a block diagram illustrating a configuration example of a digest generation unit.

FIG. 42 is a block diagram illustrating a configuration example of the digest generation unit 204 of FIG. 35.

The digest generation unit 204 includes a highlight detection learning unit 291, a detector storage unit 292, and a highlight detection unit 293.

The highlight detection learning unit 291, the detector storage unit 292, and the highlight detection unit 293 have the same function as that of the highlight detection learning unit 51, the detector storage unit 52, and the highlight detection unit 53, but can perform the process corresponding to the image content model, the audio content model and the object content model.

[Configuration Example of the Highlight Detector Learning Unit 291]

Figure 43:
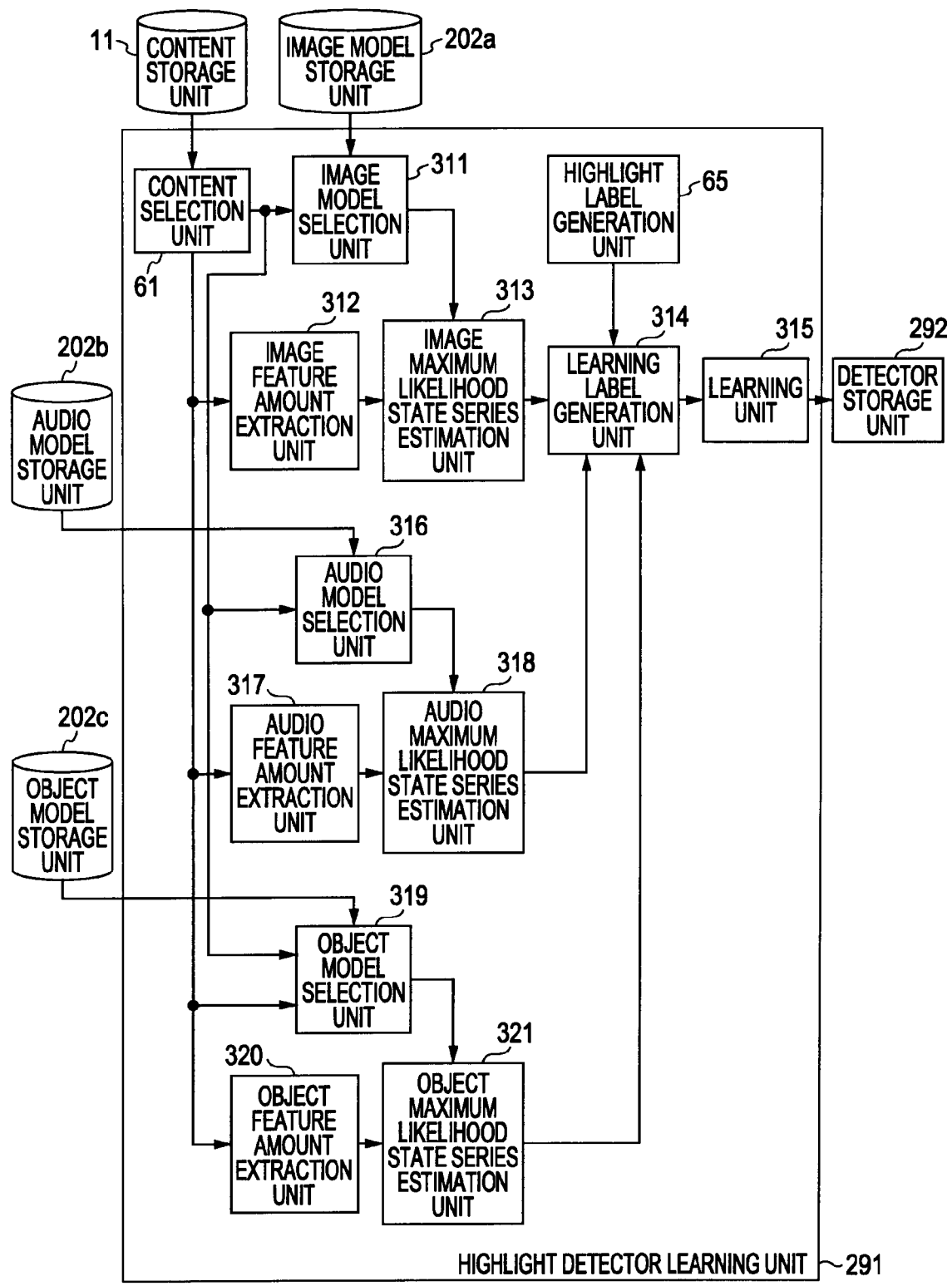
FIG. 43 is a block diagram illustrating a configuration example of a highlight detector learning unit.

FIG. 43 is a block diagram illustrating a configuration example of the highlight detector learning unit 291 of FIG. 42. In this instance, the configuration of the highlight detector learning unit 291 in FIG. 43 which is identical to that of the highlight detector learning unit 51 illustrated in FIG. 15 is denoted by the same reference numeral, and the description thereof will be omitted herein.

Namely, the highlight detector learning unit 291 is similar to the highlight detector learning unit 51, except for the model selection unit 62, the feature amount extraction unit 63 and the maximum likelihood state series estimation unit 64 which correspond to the image feature amount, the audio feature amount and the object feature amount. More specifically, the highlight detector learning unit 291 includes an image model selection unit 311, an image feature amount extraction unit 312 and an image maximum likelihood state series estimation unit 313. Further, the highlight detector learning unit 291 includes an audio model selection unit 316, an audio feature amount extraction unit 317 and an audio maximum likelihood state series estimation unit 318. In addition, the highlight detector learning unit 291 includes an object model selection unit 319, an object feature amount extraction unit 320 and an object maximum likelihood state series estimation unit 321.

The image model selection unit 311, the image feature amount extraction unit 312 and the image maximum likelihood state series estimation unit 313 which target the image content model are similar to the model selection unit 62, the feature amount extraction unit 63 and the maximum likelihood state series estimation unit 64. Further, the audio model selection unit 316, the audio feature amount extraction unit 317 and the audio maximum likelihood state series estimation unit 318 are similar to the model selection unit 62, the feature amount extraction unit 63 and the maximum likelihood state series estimation unit 64 in view of the basic function thereof, except that the treated feature amount is the audio feature amount. In addition, the object model selection unit 319, the object feature amount extraction unit 320 and the object maximum likelihood state series estimation unit 321 are similar to the model selection unit 62, the feature amount extraction unit 63 and the maximum likelihood state series estimation unit 64 in view of the basic function thereof, except that the treated feature amount is the audio feature amount.

In addition, the image model selection unit 311 selects any one of the image content models in the image model storage unit 202a of the model storage unit 202. The audio model selection unit 316 selects any one of the audio content models in the audio model storage unit 202b of the model storage unit 202. The object model selection unit 319 selects any one of the object content models in the object model storage unit 202c of the model storage unit 202.

Further, the highlight detector learning unit 291 of FIG. 43 includes a learning label generation unit 314, instead of the learning label generation unit 66. The learning label generation unit 314 is similar to the learning label generation unit 66 in view of the basic function thereof. The learning label generation unit 314 obtains a state ID series of the maximum likelihood state series (referred to also as the image maximum likelihood state series) corresponding to the image feature amount of the attention model for the attention content corresponding to the image feature amount in the image maximum likelihood state series estimation unit 313. The learning label generation unit 314 obtains a state ID series of the maximum likelihood state series (referred to also as the audio maximum likelihood state series) corresponding to the audio feature amount of the attention model for the attention content corresponding to the audio feature amount in the audio maximum likelihood state series estimation unit 318. The learning label generation unit 314 obtains a state ID series of the maximum likelihood state series (referred to also as the object maximum likelihood state series) corresponding to the object feature amount of the attention model for the attention content corresponding to the object feature amount in the object maximum likelihood state series estimation unit 319. The highlight label generation unit 314 obtains a highlight label series from the highlight label generation unit 65. The learning label generation unit 314 generates a learning label series constituting of the state ID series of the image maximum likelihood state series, the audio maximum likelihood state series and the object maximum likelihood state series, and the highlight label series.

That is, the learning label generation unit 314 generates the state ID that is the maximum likelihood state series of each of the image, the audio and the object, the state ID at time t in the highlight label series, and multi-stream learning label series that is a pair to the highlight label.

Accordingly, the learning label generation unit 314 generates the learning label series based on the multi-stream of element series of M=4 in Equation 2 above. The learning label generation unit 314 provides the learning label series which is based on the multi-stream to the learning unit 315.

The learning unit 315 performs the learning of the highlight detector that is the ergodic type multi-stream HMM in Baum-Welch re-estimation method using the learning label series provided from the learning label generation unit 314.

Then, the learning unit 315 makes the highlight detector after the learning correspond to the category of the attention content selected by the content selection unit 61, and provides and stores the highlight detector in the storage unit 292.

In this instance, in the learning of the multi-stream HMM in the learning unit 315, since the multi-stream is constituted of four kinds of constituent element series which are M=4, as described above, the series weighted value of each series is set to $W_1$ to $W_4$, and for example, if all the series weighed values are uniformly divided, all of them may be set as ¼ (=0.25). Further, if the constituent element series M is normalized, all weighed values may be 1/M, in a case where the series weighted value of each series is equalized.

[Highlight Detector Learning Processing]

Figure 44B:
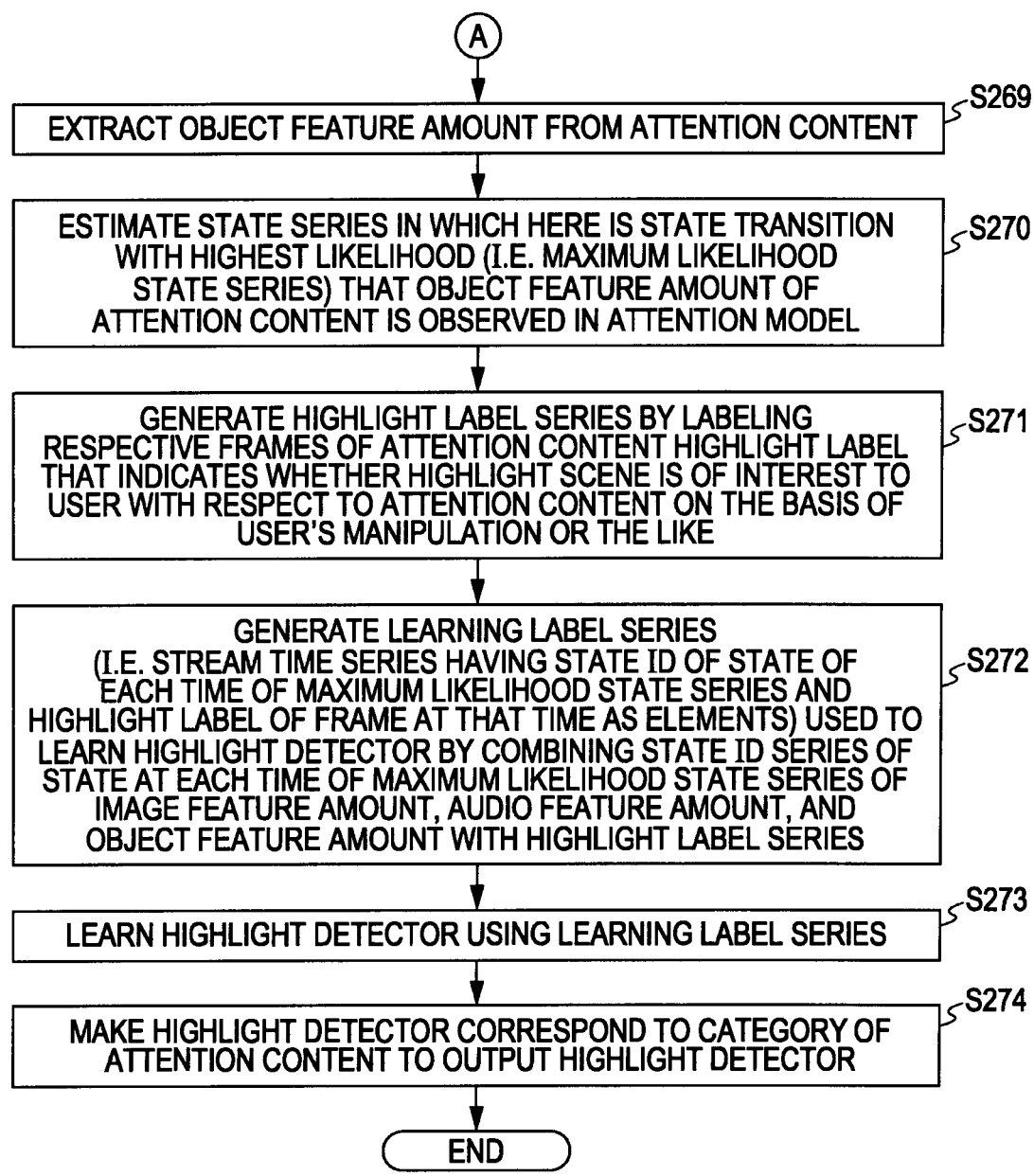
FIG. 44 is a flowchart illustrating the highlight detector learning processed by a highlight detector learning unit.

FIG. 44 is a flowchart illustrating the processing (i.e. the highlight detector learning processing) performed by a highlight detector learning unit 291 of FIG. 43.

In step S261, the content selection unit 61, for example, selects the content of which the playback is designated in accordance with a user's manipulation among the content stored in the content storage unit 11 as attention content (i.e. attention detector learning content).

Then, the content selection unit 61 provides the attention content to the image feature amount extraction unit 312, the audio feature amount extraction unit 317 and the object feature amount extraction unit 320, respectively. Further, the content selection unit 61 recognizes and provides the category of the attention content to the image model selection unit 311, the audio model selection unit 316 and the object model selection unit 319, and proceeds from step S261 to S262.

In step S262, the image model selection unit 311 selects the content model that corresponds to the category of the attention content provided from the content selection unit 61 among the content models stored in the image model storage unit 202a as the attention model.

The image model selection unit 311 provides the attention model to the maximum likelihood state series estimation unit 313, and proceeds from step S262 to step S263.

In step S263, the image feature amount extraction unit 312 extracts the feature amounts of the respective frames of the attention content provided from the content selection unit 61, provides the (time series of the) feature amounts of the respective frames of the attention content to the maximum likelihood state series estimation unit 313, and proceeds to step S264.

In step S264, the maximum likelihood state series estimation unit 313 estimates the maximum likelihood state series from which the (time series) of the feature amounts of the attention content provided from the image feature amount extraction unit 312 is observed in the attention model provided from the image model selection unit 311.

Then, the image maximum likelihood state series estimation unit 313 provides the image maximum likelihood state series of the attention model for the attention content to the learning label generation unit 314, and proceeds from step S264 to step S265.

In step S265, the audio model selection unit 316 selects the content model corresponding to the category of the attention content among the audio content models stored in the audio model storage unit 202b from the content selection unit 61 as the attention model.

Then, the audio model selection unit 316 provides the attention model to the audio maximum likelihood state series estimation unit 318, and proceeds from step S265 to step S266.

In step S266, the audio feature amount extraction unit 317 extracts the audio feature amount of each frame of the attention content supplied from the content selection unit 61, provides the (time series) of the audio feature amount of each frame of the attention content to the audio maximum likelihood state series estimation unit 318, and proceeds to step S267.

In step S267, the audio maximum likelihood state series estimation unit 318 estimates the maximum likelihood state series from which the (time series) of the audio feature amounts of the attention content provided from the audio feature amount extraction unit 317 is observed in the attention model provided from the audio model selection unit 316.

Then, the audio maximum likelihood state series estimation unit 318 provides the audio maximum likelihood state series of the attention model for the attention content to the learning label generation unit 314, and proceeds from step S267 to step S268.

In step S268, the object model selection unit 319 selects the content model corresponding to the category of the attention content among the object content models stored in the object model storage unit 202c from the content selection unit 61 as the attention model.

Then, the object model selection unit 319 provides the attention model to the object maximum likelihood state series estimation unit 321, and proceeds from step S268 to step S269.

In step S269, the object feature amount extraction unit 320 extracts the object feature amount of each frame of the attention content supplied from the content selection unit 61, provides the (time series) of the object feature amount of each frame of the attention content to the object maximum likelihood state series estimation unit 321, and proceeds to step S270.

In step S270, the object maximum likelihood state series estimation unit 321 estimates the maximum likelihood state series from which the (time series) of the object feature amounts of the attention content provided from the object feature amount extraction unit 320 is observed in the attention model provided from the object model selection unit 319.

Then, the object maximum likelihood state series estimation unit 321 provides the object maximum likelihood state series of the attention model for the attention content to the learning label generation unit 314, and proceeds from step S270 to step S271.

In step S271, the highlight label generation unit 65 generates highlight label series with respect to the attention content by labeling each frame of the attention content selected by the content selection unit 61 a highlight label according to a user's manipulation.

The highlight label generation unit 65 provides the highlight label series generated for the attention content to the learning label generation unit 314, and proceeds to step S272.

In step S272, the learning label generation unit 314 obtains the state ID series of the image maximum likelihood state series of the attention model to the attention content from the image maximum likelihood state series estimation unit 313. Further, the learning label generation unit 314 obtains the state ID series of the audio maximum likelihood state series of the attention model to the attention content from the audio maximum likelihood state series estimation unit 318. In addition, the learning label generation unit 314 obtains the state ID series of the object maximum likelihood state series of the attention model to the attention content from the object maximum likelihood state series estimation unit 321. Further, the learning label generation unit 314 obtains the highlight label series from the highlight label series generation unit 65. Then, the learning label generation unit 314 generates the learning label series by combining four series of each state ID series of the image maximum likelihood state series, the audio maximum likelihood state series, and the object maximum likelihood state series, and the highlight label series.

Then, the learning label generation unit 314 provides the learning label series to the learning unit 315, and proceeds from S272 to step S273.

In step S273, the learning unit 315 performs the learning of the highlight detector that is the multi-stream HMM using the learning label series provided from the learning label generation unit 314. Then, the process proceeds to step S274.

In step S274, the learning unit 315 makes the highlight detector after the learning correspond to the category of the attention content selected by the content selection unit 61, and provides and stores the highlight detector in the detector storage unit 292.

As described above, the highlight detector is obtained by the learning of multi-stream HMM using four series of learning label series of the state ID series of the image maximum likelihood state series, the audio maximum likelihood state series, and the object maximum likelihood state series of the attention model of the attention content, and the highlight label series.

Accordingly, it can be judged whether the frame corresponding to the state is a scene that is of interest to a user (highlight scene) by referring to the observation probability of the highlight label series of the respective states.

[Configuration Example of the Highlight Detection Unit 293]

Figure 45:
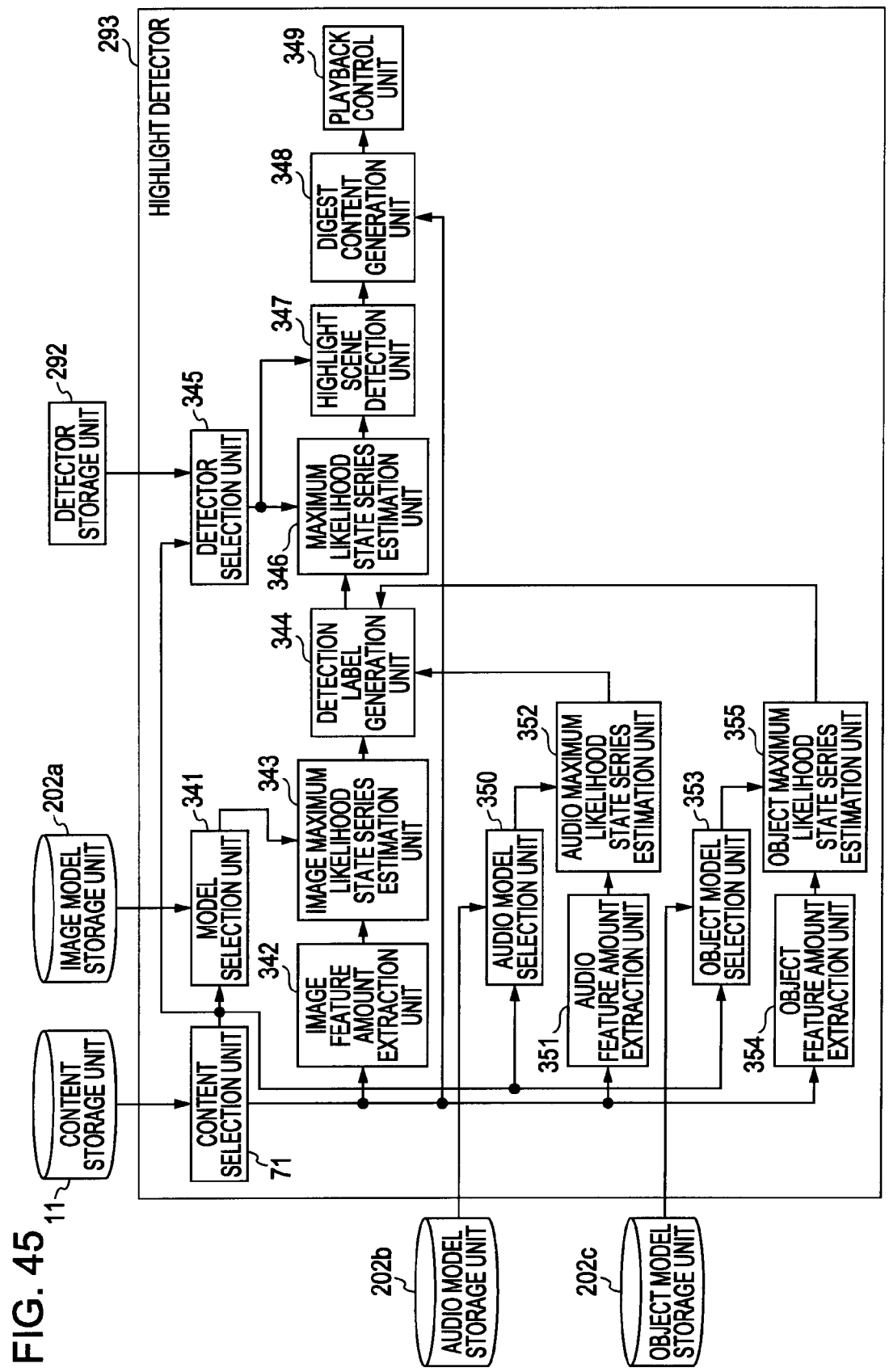
FIG. 45 is a block diagram illustrating a configuration example of a highlight detection unit.

FIG. 45 is a block diagram illustrating a configuration example of the highlight detection unit 293 of FIG. 42. In the highlight detection unit 293 in FIG. 45, same reference numerals are given to the configuration having the same functions as those of the configuration of the highlight detection unit 53 in FIG. 18, and the description thereof will be omitted.

In FIG. 45, the highlight detection unit 293 has the same function as that of the highlight detection unit 53 of FIG. 18, except for generating the detection label according to the image feature amount, the audio feature amount and the object feature amount.

That is, the image model selection unit 341, the image feature amount extraction unit 342, and the image maximum likelihood state series estimation unit 343 are similar to the image model selection unit 311, the image feature amount extraction unit 312, and the image maximum likelihood state series estimation unit 313 of the highlight detection learning unit 291 of FIG. 43. Further, the audio model selection unit 350, the audio feature amount extraction unit 351, and the audio maximum likelihood state series estimation unit 352 are similar to the audio model selection unit 316, the audio feature amount extraction unit 317, and the audio maximum likelihood state series estimation unit 318 of the highlight detection learning unit 291 of FIG. 43. In addition, the objection model selection unit 353, the objection feature amount extraction unit 354, and the objection maximum likelihood state series estimation unit 355 are similar to the objection model selection unit 319, the objection feature amount extraction unit 320, and the objection maximum likelihood state series estimation unit 321 of the highlight detection learning unit 291 of FIG. 43.

With the above configuration, the learning label generation unit 344 is provided with the respective sate ID series of the image maximum likelihood state series, the audio maximum likelihood state series and the object maximum likelihood state series for the attention content.

The detection label generation unit 344 generates the respective state ID series of the image maximum likelihood state series, the audio maximum likelihood state series and the object maximum likelihood state series for the attention content, and the highlight label series of only the highlight label.

That is, the detection label generation unit 344 generates as a dummy series and provides the highlight label series with the same length (i.e. the length of the series) as that of the of the image maximum likelihood state series, the audio maximum likelihood state series and the object maximum likelihood state series to the highlight detector as the highlight label series of only the highlight label indicating that the scene is not the highlight scene.

Further, the detection label generation unit 344 generates the state ID of the image maximum likelihood state series, the audio maximum likelihood state series and the object maximum likelihood state series, the state ID at time t in the highlight label series as the dummy series, and the multi-stream learning label series that is a pair to the highlight label.

Then, the detection label generation unit 344 provides the detection label series to the maximum likelihood state series estimation unit 346.

In this instance, the series weighted values $W_1$ to $W_4$ of the respective series of the image maximum likelihood state series, the audio maximum likelihood state series and the object maximum likelihood state series, and the highlight label series as the dummy series when obtaining the observation probability of the detection label series use $(W_1:W_2:W_3:W_4)=(1/3:1/3:1/3:0)$. Accordingly, the maximum likelihood state series estimation unit 346 performs the estimation of the highlight relation state series not in view of the highlight label series as the dummy series, but in view of only the image maximum likelihood state series, the audio maximum likelihood state series and the object maximum likelihood state series of the attention model for the attention content. Also, if the weighted value is normalized in the case of the series number M, the weighted values of all the series become $1/(M-1)$ in the case in which the weighted value of the highlight label series is set to "0", and the weighted value of other series is set to be uniform.

In addition, the detector selection unit 345, the maximum likelihood state series estimation unit 346, the highlight scene detection unit 347, the digest content generation unit 348 and the playback control unit 349 become a detection label series constituted of four streams. Regarding other points, the functions thereof are substantially similar to the detector selection unit 76, the maximum likelihood state series estimation unit 77, the highlight scene detection unit 78, the digest content generation unit 79 and the playback control unit 80 illustrated in FIG. 18, and the description thereof will be omitted.

[Highlight Detection Processing]

Figures 46, 46A:
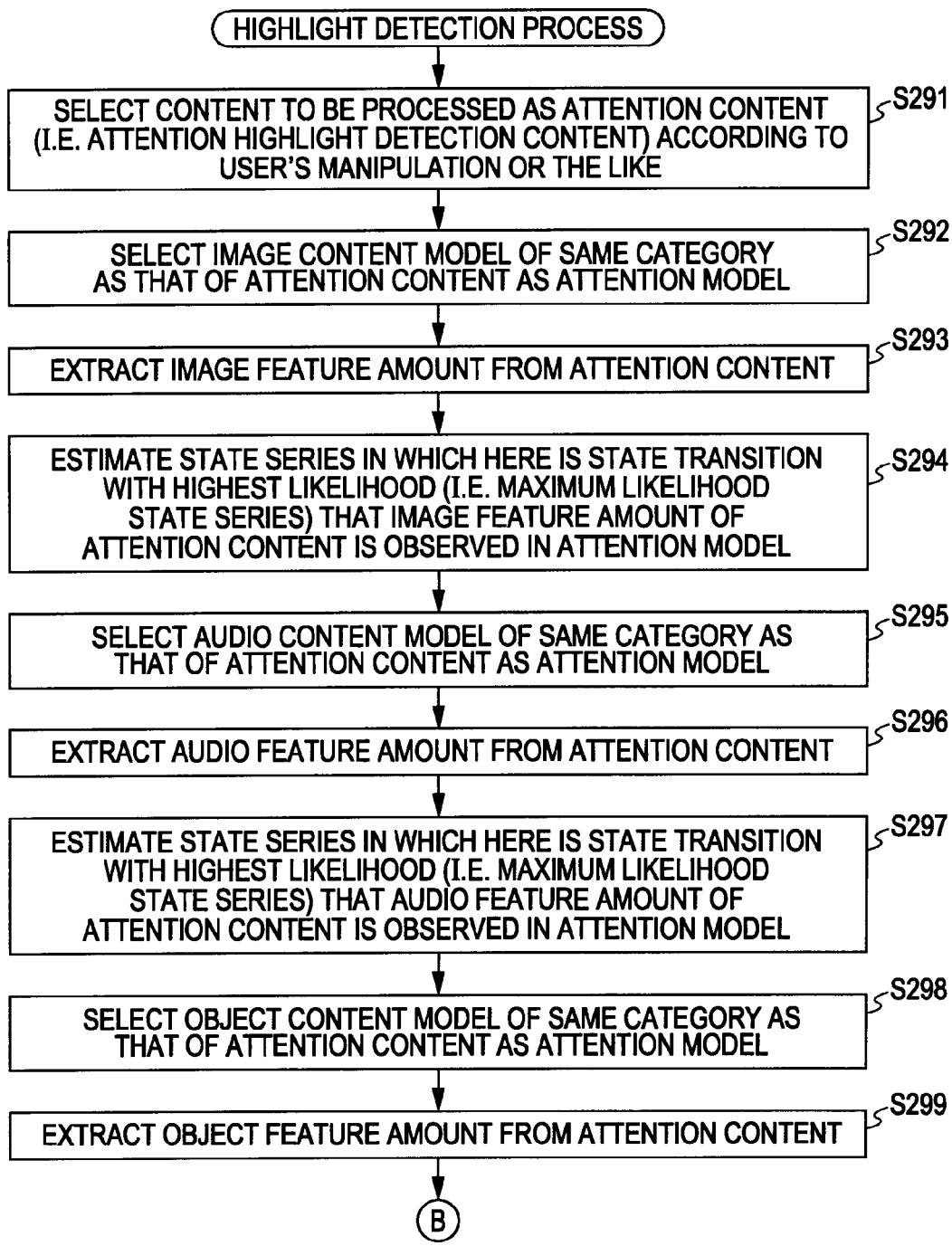
FIG. 46 is a flowchart illustrating the highlight detection processed by a highlight detection unit.
Figure 46B:
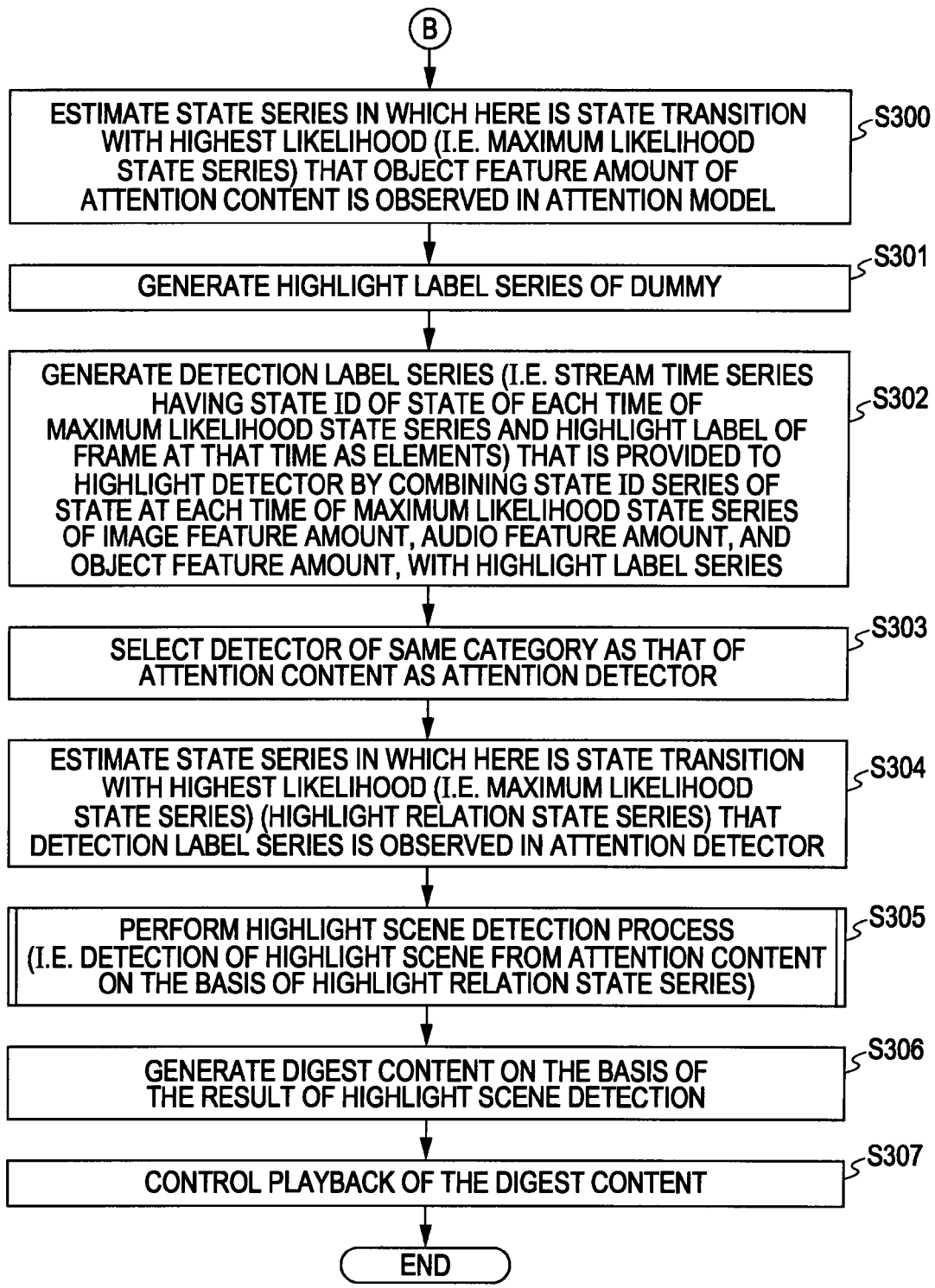

FIG. 46 is a flowchart illustrating the processing (i.e. highlight detection processing) performed by the highlight detection unit 293 of FIG. 45.

In step S291, the content selection unit 71 selects the attention content (i.e. the attention highlight detection content) that is the content for which the highlight scene is detected among the content stored in the content storage unit 11.

The content selection unit 71 provides the attention content to the image feature amount extraction unit 342, the audio feature amount extraction unit 351 and the objection feature amount extraction unit 354. Also, the content selection unit 71 recognizes and provides the category of the attention content to the image model selection unit 341, the audio model selection unit 350, the object model selection unit 353, and the detector selection unit 345, and proceeds from step S291 to step S292.

In step S292, the image model selection unit 341 selects the content model that corresponds to the category of the attention content provided from the content selection unit 71 among the image content models stored in the image model storage unit 202a as the attention model.

Then, the image model selection unit 341 provides the attention model to the image maximum likelihood state series estimation unit 343, and proceeds from step S292 to step S293.

In step S293, the image feature amount extraction unit 342 extracts the image feature amounts of the respective frames of the attention content provided from the content selection unit 71, provides the extracted feature amounts to the image maximum likelihood state series estimation unit 343, and proceeds to step S294.

In step S294, the image maximum likelihood state series estimation unit 343 estimates the image maximum likelihood state series (i.e. the image maximum likelihood state series of the attention model for the attention content) which is the state series where there is a state transition with a highest likelihood that the (time series) of the image feature amounts of the attention content provided from the image feature amount extraction unit 342 is observed in the attention model provided from the image model selection unit 341.

Then, the maximum likelihood state series estimation unit 294 provides the image maximum likelihood state series of the attention model for the attention content to the detection label generation unit 344, and proceeds from step S294 to step S295.

In step S295, the audio model selection unit 350 selects the content model that corresponds to the category of the attention content provided from the content selection unit 71 among the image content models stored in the audio model storage unit 202b as the attention model.

Then, the audio model selection unit 350 provides the attention model to the audio maximum likelihood state series estimation unit 352, and proceeds from step S295 to step S296.

In step S296, the audio feature amount extraction unit 351 extracts the audio feature amounts of the respective frames of the attention content provided from the content selection unit 71, provides the extracted feature amounts to the audio maximum likelihood state series estimation unit 352, and proceeds to step S297.

In step S297, the audio maximum likelihood state series estimation unit 352 estimates the audio maximum likelihood state series (i.e. the audio maximum likelihood state series of the attention model for the attention content) which is the state series where there is a state transition with a highest likelihood that the (time series) of the audio feature amounts of the attention content provided from the audio feature amount extraction unit 351 is observed in the attention model provided from the audio model selection unit 350.

Then, the audio maximum likelihood state series estimation unit 352 provides the audio maximum likelihood state series of the attention model for the attention content to the detection label generation unit 344, and proceeds from step S297 to step S298.

In step S298, the object model selection unit 353 selects the content model that corresponds to the category of the attention content provided from the content selection unit 71 among the image content models stored in the object model storage unit 202*c* as the attention model.

Then, the object model selection unit 353 provides the attention model to the object maximum likelihood state series estimation unit 355, and proceeds from step S298 to step S299.

In step S299, the object feature amount extraction unit 354 extracts the object feature amounts of the respective frames of the attention content provided from the content selection unit 71, provides the extracted feature amounts to the object maximum likelihood state series estimation unit 355, and proceeds to step S300.

In step S300, the object maximum likelihood state series estimation unit 355 estimates the object maximum likelihood state series (i.e. the object maximum likelihood state series of the attention model for the attention content) which is the state series where there is a state transition with a highest likelihood that the (time series) of the object feature amounts of the attention content provided from the object feature amount extraction unit 353 is observed in the attention model provided from the object model selection unit 353.

Then, the object maximum likelihood state series estimation unit 355 provides the object maximum likelihood state series of the attention model for the attention content to the detection label generation unit 344, and proceeds from step S300 to step S301.

In step S301, the detection label generation unit 344 generates the highlight label series with only the highlight label indicating that the scene is not the highlight scene (i.e. the highlight label having a value of "0") as the dummy highlight label series, and proceeds to step S302.

In step S302, the detection label generation unit 344 generates the detection label series that is each state ID series of the image maximum likelihood state series, the audio maximum likelihood state series and the object maximum likelihood state series, and the dummy highlight label series.

Then, the detection label generation unit 344 provides the detection label series to the maximum likelihood state series estimation unit 346, and proceeds from step S302 to step S303.

In step S303, the detector selection unit 345 selects the highlight detector that corresponds to the category of the attention content provided from the content selection unit 71 among the highlight detectors stored in the detector storage unit 292 as the attention detector. Then, the detector selection unit 345 acquires the attention detector among the highlight detectors stored in the detector storage unit 292, provides the acquired attention detector to the maximum likelihood state series estimation unit 346 and the highlight scene detection unit 347, and proceeds from step S303 to step S304.

In step S304, the maximum likelihood state series estimation unit 346 estimates the maximum likelihood state series (i.e. highlight relation state series) which is the state series where there is a state transition with a highest likelihood that the detection label series provided from the detection label generation unit 344 is observed in the attention detector provided from the detector selection unit 345.

Then, the maximum likelihood state series estimation unit 346 provides the highlight relation state series to the highlight scene detection unit 347, and proceeds from step S304 to step S305.

In step S305, the highlight scene detection unit 347 detects the highlight scene from the attention content on the basis of the highlight relation state series provided from the maximum likelihood state series estimation unit 346, and processes the highlight scene detection that outputs the highlight flag.

After the completion of the highlight scene detection processing in step S305, the digest content generation unit 348 proceeds from step S305 to step S306, and extracts the frames of the highlight scene that is specified by the highlight flag provided from the highlight scene detection unit 347 from the frames of the attention content provided from the content selection unit 71.

Also, the digest content generation unit 348 generates the digest content of the attention content using the frames of the highlight scene that is extracted from the frames of the attention content, provides the generated digest content to the playback control unit 349, and proceeds from step S306 to step S307.

In step S307, the playback control unit 49 performs the playback control of the digest content provided from the digest content generation unit 348.

In this instance, the highlight scene detection process in step S305 is similar to the process of step S89 in FIG. 20, that is, the process described with reference to the flowchart of FIG. 21, and the description thereof will be omitted.

As described above, the highlight detection unit 293 estimates the state ID series of the image, audio and object maximum likelihood state series and the highlight relation state series that is the maximum likelihood state series when the detection label series that is a pair to the dummy highlight label series is observed. The highlight detection unit 293 detects the highlight scene frames from the attention content on the basis of the observation probability of the highlight label of the respective states of the highlight relation state series, and generates the digest content using the highlight scene frames.

Also, the highlight detector 293 is obtained by performing the learning of the HMM using the learning label series constituted of four series combination of the state ID series of the image maximum likelihood state series, the audio maximum likelihood state series and the object maximum likelihood state series of the content model for the content, and the likelihood state series generated according to the user's manipulation.

Accordingly, if the learning of the content model, which uses the content of the same category as that of the attention content, and the highlight detector is performed even in a state in which the attention content that generates the digest content is not used to learn the content model or the highlight detector, it possible to easily obtain a digest (i.e. digest content) in which scenes that have interest for a user are collected as highlight scenes, using the content model and the highlight detector.

[Configuration Example of the Scrapbook Generation Unit 205]

Figure 47:
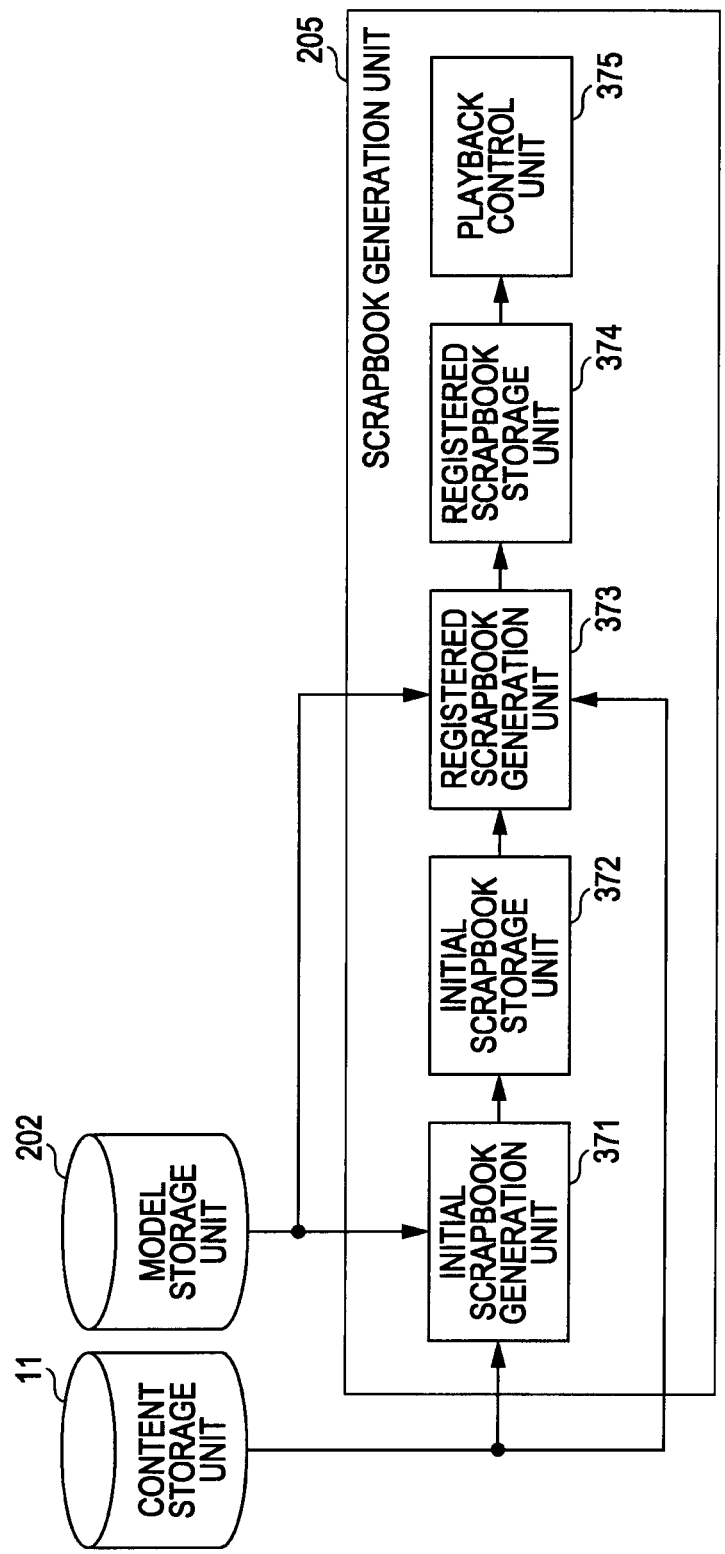
FIG. 47 is a block diagram illustrating a configuration example of a scrapbook generation unit.

FIG. 47 is a block diagram illustrating a configuration example of the scrapbook generation unit 205 of FIG. 35.

The scrapbook generation unit 205 includes an initial scrapbook generation unit 371, an initial scrapbook storage unit 372, a registered scrapbook generation unit 373, a registered scrapbook storage unit 374, and a playback control unit 375.

The initial scrapbook generation unit 371, the initial scrapbook storage unit 372, the registered scrapbook generation unit 373, the registered scrapbook storage unit 374, and the playback control unit 375 are substantially similar to the initial scrapbook generation unit 101 to the playback control unit 105. Any of them performs the process corresponding to the image content model based on the image feature amount, the audio content model based on the audio feature amount and the object content model based on the object feature amount.

[Configuration Example of the Initial Scrapbook Generation Unit 371]

Figures 48, 48A:
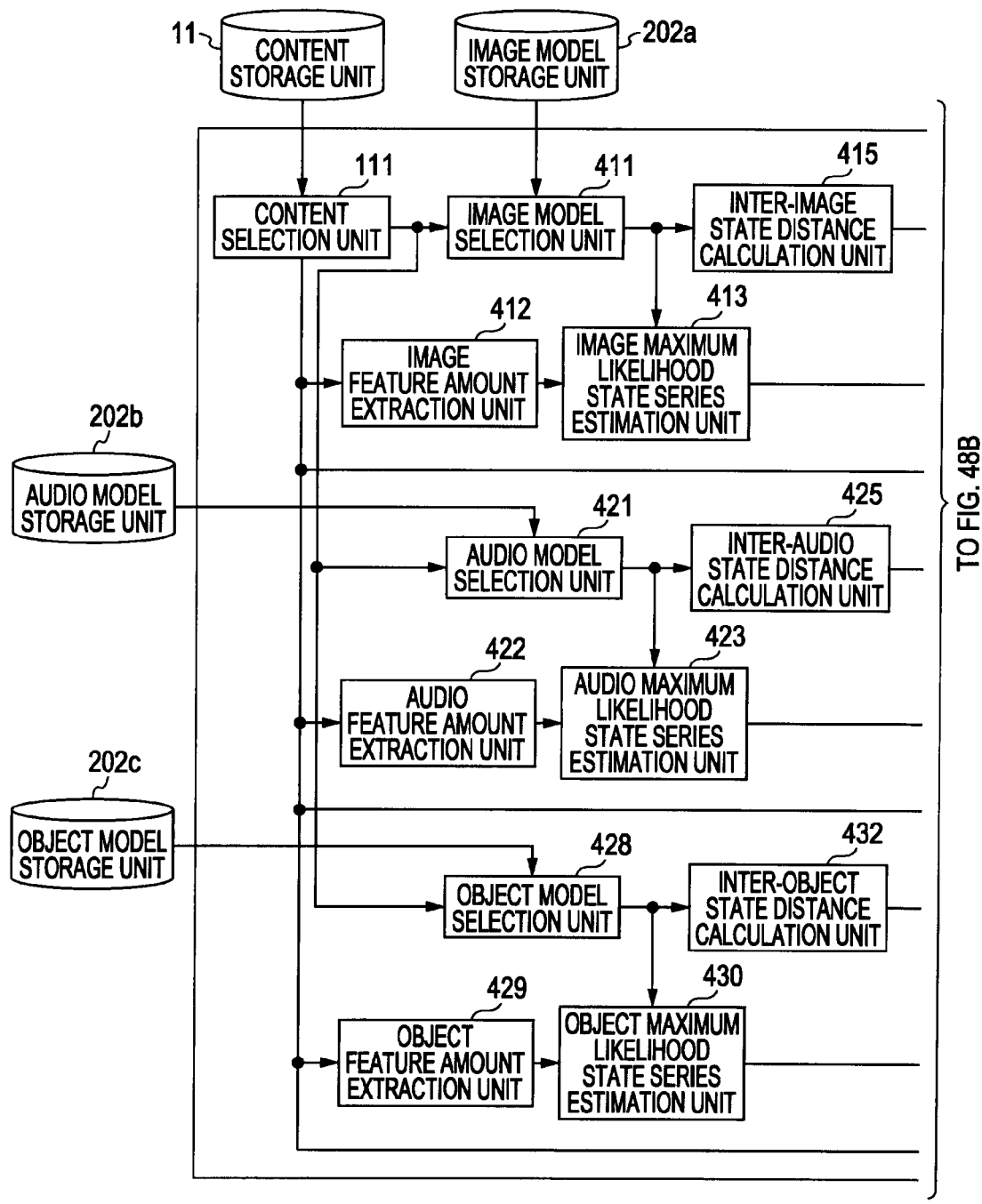
FIG. 48 is a block diagram illustrating a configuration example of an initial scrapbook generation unit.
Figure 48B:
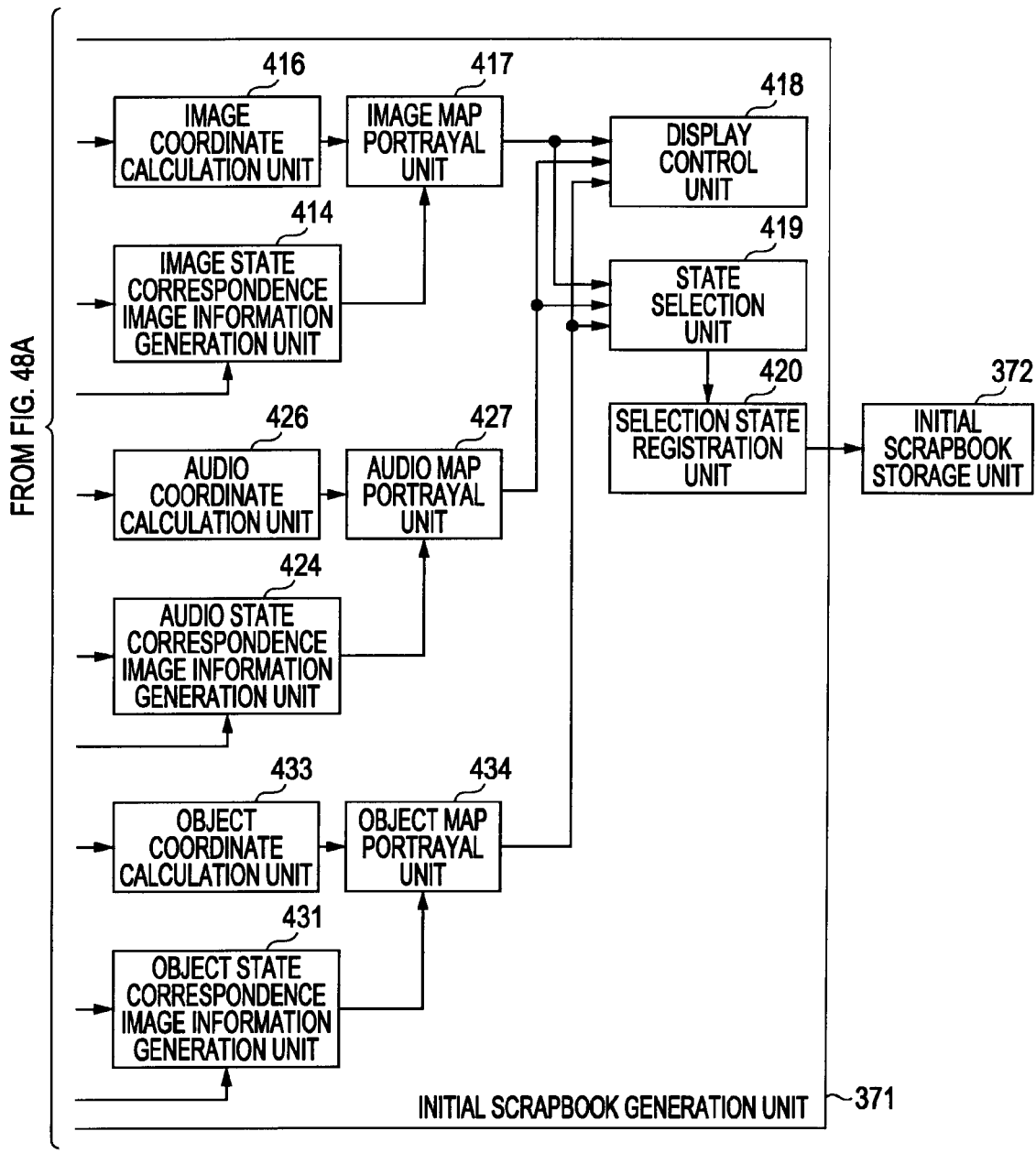

FIG. 48 is a block diagram illustrating a configuration example of the initial scrapbook generation unit 371 of FIG. 47. In this instance, the configuration of the initial scrapbook generation unit 371 of FIG. 48 which is similar to the function of the initial scrapbook generation unit 101 in FIG. 23 is dented by the same reference numeral, and the description thereof will be omitted herein.

Further, in FIG. 48, an image model selection unit 411, an image feature amount extraction unit 412, an image maximum likelihood state series estimation unit 413, an image state correspondence image information generation unit 414, an image inter-state distance calculation unit 415, an image coordinate calculation unit 416, and an image map portrayal unit 417 of the initial scrapbook generation unit 371 are similar to the model selection unit 112, the feature amount extraction unit 113, the maximum likelihood state series estimation unit 114, the state correspondence image information generation unit 115, the inter-state distance calculation unit 116, the coordinate calculation unit 117, and the map portrayal unit 118, respectively, and the description thereof will be omitted herein.

That is, the image model selection unit 411 to the image map portrayal unit 417 are similar to the image model selection unit 32 to the image map portrayal unit 38 of the content structure representation unit 14 (FIG. 9), and perform the content structure representation process based on the image feature amount described in FIG. 13.

Further, an audio model selection unit 421, an audio feature amount extraction unit 422, an audio maximum likelihood state series estimation unit 423, an audio state correspondence image information generation unit 424, an audio inter-state distance calculation unit 425, an audio coordinate calculation unit 426, and an audio map portrayal unit 427 process the audio feature amount as a target, and are similar to the image selection unit 411, the image feature amount extraction unit 412 to the image map portrayal unit 417, respectively, except that a target to be processed is the image feature amount.

In addition, an object model selection unit 428, an object feature amount extraction unit 429, an object maximum likelihood state series estimation unit 430, an object state correspondence image information generation unit 431, an object inter-state distance calculation unit 432, an object coordinate calculation unit 433, and an object map portrayal unit 434 process the object feature amount as a target, and are similar to the image selection unit 411 to the image map portrayal unit 417, respectively, except that a target to be processed is the image feature amount.

Consequently, the initial scrapbook generation unit 371 performs the content structure representation process to represent the model map (FIGS. 11 and 12) on a display (not illustrated) according to the image feature amount, the audio feature amount and the object feature amount. If the state of the model map corresponding to the image feature amount, the audio feature amount and the object feature amount is designated by manipulation of the user, the state ID of the designated state (selection ID) is registered on the (empty) scrapbook.

Figure 49:
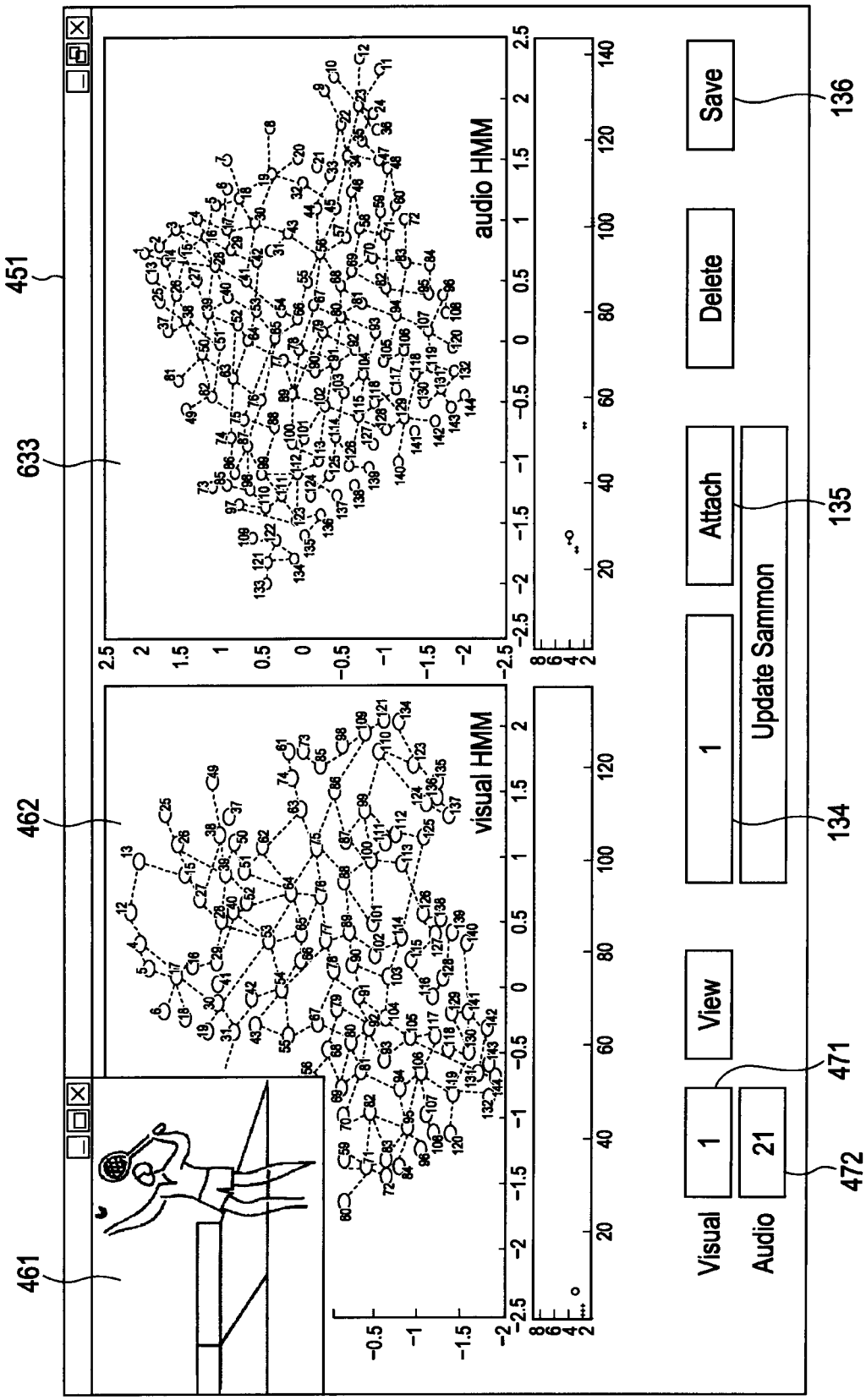
FIG. 49 is a diagram illustrating an example of a user interface for a user to designate the state on a model map.

FIG. 49 is a diagram illustrating an example of a user interface for a user to designate the state on a model map, which is displayed as the display control unit 418 performs the display control. In this instance, the display having the same function as that of the display in the window 131 of FIG. 24 is denoted by the same reference numeral, and the description thereof will be omitted.

In FIG. 49, the window 451 is represented by the model map 462 corresponding to the image feature amount and the model map 463 corresponding to the audio feature amount which are generated by the map portrayal unit 417. In this instance, in the example shown in FIG. 49, the model map corresponding to the object feature amount may be displayed, although it is not illustrated. Further, in the case of handling other feature amount other than the image feature amount, the audio feature amount and the object feature amount, a model map corresponding to other feature amount may be displayed. In addition, the respective model maps may be displayed as other window.

The state on the model maps 462 and 463 in the window 451 is designated by a user, and thus so called focus match can be achieved. The user's designation of the state may be performed by clicking with a pointing device such as a mouse, moving a cursor to a position where the focus match can be achieved according to the manipulation of the pointing device, or the like.

Also, the state having already been selected and the state having not yet been selected among the states on the model maps 462 and 463 may be displayed with different display types such as different colors.

On the lower part of the window 451, an image state ID input column 471 and an audio state ID input column 472 are installed, instead of the state ID input column 133, which is different from the window 131 of FIG. 24.

In the image state ID input column 471, the state ID of the focus match state among the states on the model map 462 based on the image feature amount is displayed.

In the audio state ID input column 472, the state ID of the focus match state among the states on the model map 463 based on the audio feature amount is displayed.

In this instance, a user may directly input the state ID in the image state ID input column 471 and the audio state ID input column 472. Further, in the case where the model map based on the object feature amount is displayed, an object state ID input column is displayed.

The window 461, if the state correspondence image information generated in the content structure presentation processing is linked in a focus match state among the states on the model maps 462 and 463, is opened. Also, in the window 461, the state correspondence image information that is linked with the focus match state is displayed.

In this case, in the window 461, the focus link state on the model maps 462 and 463, the state correspondence image information linked with the states in positions close to the states, the state correspondence image information linked with all the states. Further, in the window 461, the state correspondence image formation linked with all states on the model maps 462 and 463 may be displayed sequentially in time or in parallel in space.

The user can designate a certain state on the model maps 462 and 463 displayed in the window 451 by clicking the corresponding state.

If the state is designated by the user, the display control unit 418 (see FIG. 48) displays in the window 461 the state correspondence image information linked with the state designated by the user.

Accordingly, the user can acquire an image of frames corresponding to the state on the model maps 462 and 463.

That is, in the case of the process by the initial scrapbook generation unit 371 of FIG. 48, the state ID of the selection state of the image model map, the audio model map and the object model map is registered in a collected state as the initial scrapbook by the selection state registration unit 420.

In this instance, the initial scrapbook generation process by the initial scrapbook generation unit 371 of FIG. 48 is similar to the process which is described with reference to FIG. 25, for the image model map, the audio model map and the object model map, and the description thereof will be omitted herein.

[Configuration Example of the Registered Scrapbook Generation Unit 373]

Figure 50:
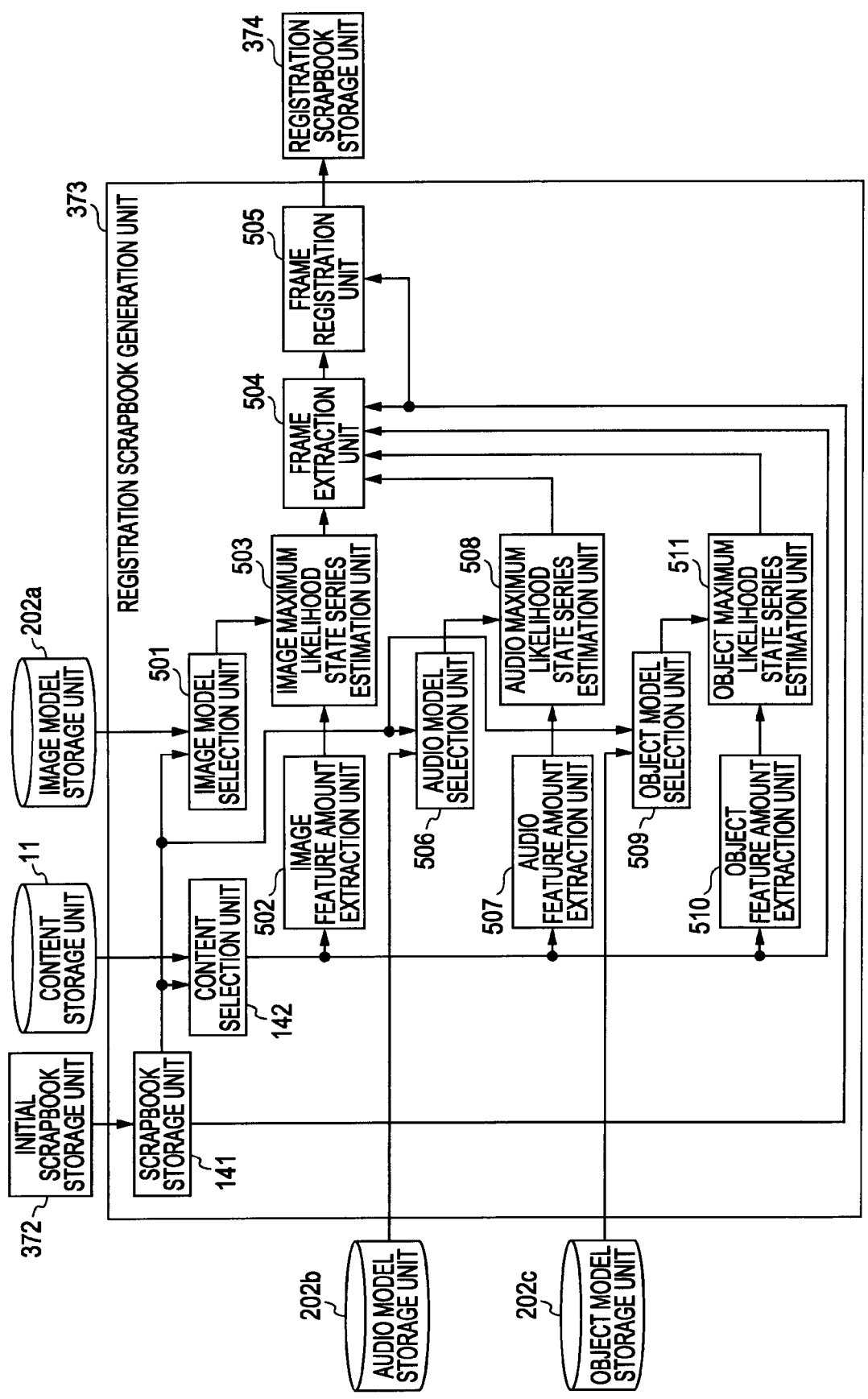
FIG. 50 is a block diagram illustrating a configuration example of a registered scrapbook generation unit.

FIG. 50 is a block diagram illustrating a configuration example of the registered scrapbook generation unit 373 of FIG. 47. In this instance, in the registered scrapbook generation unit 373 of FIG. 50, the configuration having the same function as the registered scrapbook generation unit 103 of FIG. 26 is designated by the same reference numeral, and the description thereof will be omitted herein.

In FIG. 50, an image model selection unit 501, an image feature amount extraction unit 502, an image maximum likelihood state series estimation unit 503, and an image frame registration unit 505 are similar to the model selection unit 143 to the frame registration unit 147 in FIG. 26, and the description thereof will be omitted herein.

An audio model selection unit 506, an audio feature amount extraction unit 507, and an audio maximum likelihood state series estimation unit 508 are similar to the image model selection unit 501 to the image maximum likelihood state series estimation unit 503, except that a target to be processed is the image feature amount, and the description thereof will be omitted herein.

In addition, an object model selection unit 509, an object feature amount extraction unit 510, and an object maximum likelihood state series estimation unit 511 are similar to the image model selection unit 501 to the image maximum likelihood state series estimation unit 503, except that a target to be processed is the object feature amount, and the description thereof will be omitted herein.

The frame extraction unit 504 basically has the same function as that of the frame extraction unit 146 of FIG. 26, except for the treated state series. That is, the frame extraction unit 504 determines whether each state ID of the image maximum likelihood state series, the audio maximum likelihood state series and the object maximum likelihood state series coincides with the state ID of the selection state registered in the attention scrapbook provided from the scrapbook selection unit 141.

Further, the frame extraction unit 504 extracts the frame that corresponds to the state in which the state ID coincides with the state ID of the selection state registered in the attention scrapbook provided from the scrapbook selection unit 141 from the attention content, and provides the extracted frame to the frame registration unit 505.

[Registered Scrapbook Generation Processing by the Registered Scrapbook Generation Unit 373]

Figure 51B:
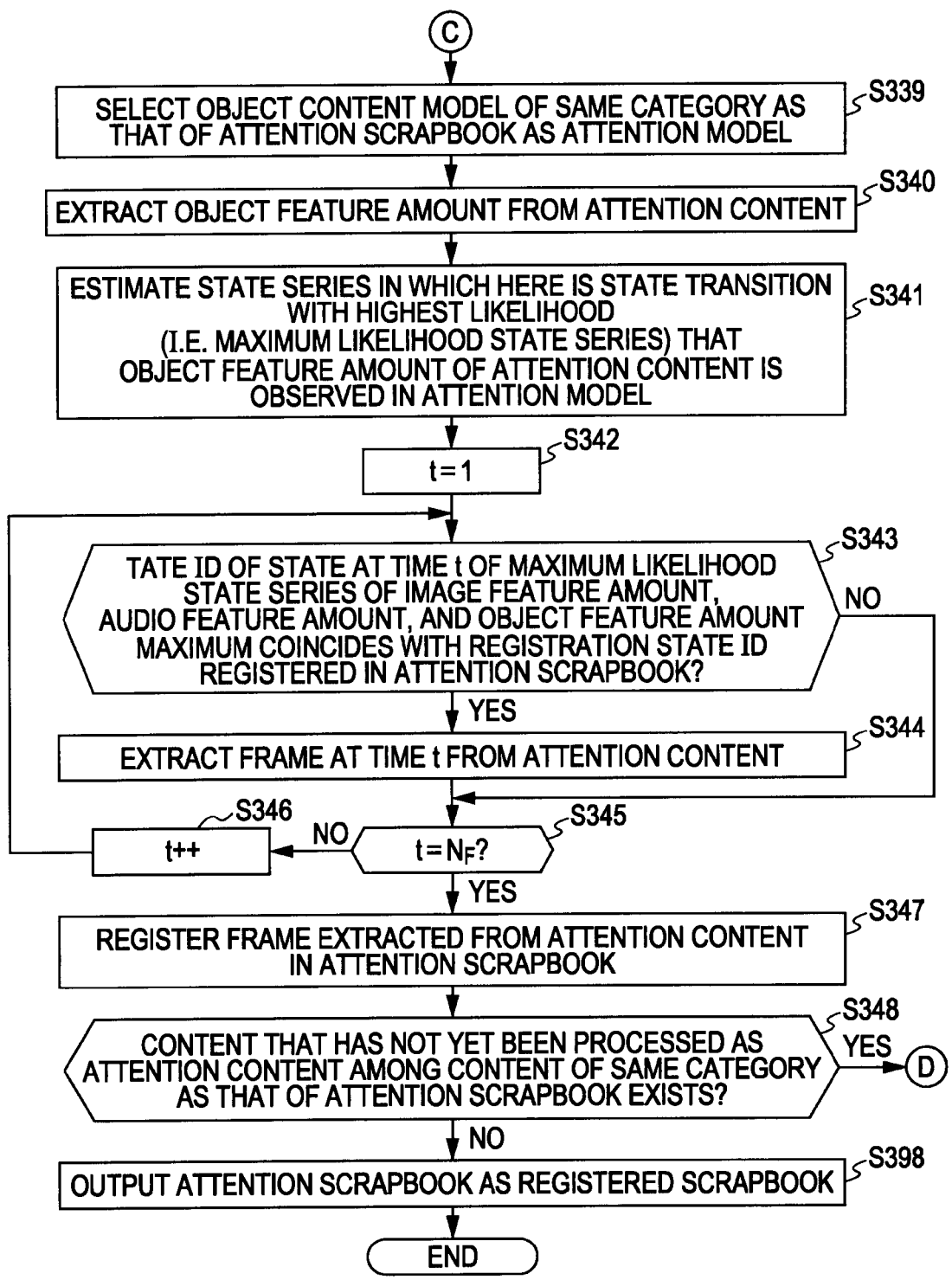
FIG. 51 is a flowchart illustrating the registered scrapbook generation processed by a registered scrapbook generation unit.

FIG. 51 is a flowchart illustrating the registered scrapbook generation processing that is performed by the registered scrapbook generation unit 373 of FIG. 50.

In step S331, the scrapbook selection unit 141 selects one initial scrapbook which has not yet been selected as the attention scrapbook among the initial scrapbooks stored in the initial scrapbook storage unit 372.

The scrapbook selection unit 141 provides the attention scrapbook to the frame extraction unit 504 and the frame registration unit 505. Also, the scrapbook selection unit 141 provides the category corresponding to the attention scrapbook to the content selection unit 142, the image model selection unit 501, the audio model selection unit 506, and the object model selection unit 509, and proceeds from step S331 to step S332.

In step S332, the content selection unit 142 selects the content which has not yet been selected as the attention content among content of the category provided from the scrapbook selection unit 141 among the content stored in the content storage unit 11 as the attention content.

Then, the content selection unit 142 provides the attention content to the image feature amount extraction unit 502, the audio feature amount extraction unit 507, the object feature amount extraction unit 510, and the frame extraction unit 504, and proceeds from step S332 to step S333.

In step S333, the image model selection unit 501 selects the image content model corresponding to the category provided from the scrapbook selection unit 141 among the content models stored in the image model storage unit 202a as the attention model.

Then, the image model selection unit 501 provides the attention model to the image maximum likelihood state series estimation unit 503, and proceeds from step S333 to step S334.

In step S334, the image feature amount extraction unit 502 extracts the image feature amounts of the respective frames of the attention content provided from the content selection unit 142, and provides the (time series of the) image feature amounts of the respective frames of the attention content to the image maximum likelihood state series estimation unit 503.

After that, it proceeds from step S334 to step S335. In step S335, the image maximum likelihood state series estimation unit 503 estimates the image maximum likelihood state series which is the state series where there is a state transition with a highest likelihood that the (time series) image feature amount of the attention content provided from the image feature amount extraction unit 502 is observed in the attention model provided from the image model selection unit 501.

Then, the image maximum likelihood state series estimation unit 503 provides the maximum likelihood state series of the attention model for the attention content to the image frame extraction unit 504, and proceeds from step S335 to step S336.

In step S336, the audio model selection unit 506 selects the audio content model corresponding to the category provided from the scrapbook selection unit 141 among the audio content model stored in the audio model storage unit 202b as the attention content.

Then, the audio model selection unit 506 provides the attention content to the audio maximum likelihood state series estimation unit 508, and proceeds from step S336 to step S337.

In step S337, the audio feature amount extraction unit 507 extracts the audio feature amounts of the respective frames of the attention content provided from the content selection unit 142, and provides the (time series of the) audio feature amounts of the respective frames of the attention content to the audio maximum likelihood state series estimation unit 508.

After that, it proceeds from step S337 to step S338. In step S338, the audio maximum likelihood state series estimation unit 508 estimates the audio maximum likelihood state series which is the state series where there is a state transition with a highest likelihood that the (time series) audio feature amount of the attention content provided from the audio feature amount extraction unit 507 is observed in the attention model provided from the audio model selection unit 506.

Then, the audio maximum likelihood state series estimation unit 508 provides the maximum likelihood state series of the attention model for the attention content to the frame extraction unit 504, and proceeds from step S338 to step S339.

In step S339, the object model selection unit 509 selects the object content model corresponding to the category provided from the scrapbook selection unit 141 among the object content model stored in the object model storage unit 202c as the attention content.

Then, the object model selection unit 509 provides the attention content to the object maximum likelihood state series estimation unit 511, and proceeds from step S339 to step S340.

In step S340, the object feature amount extraction unit 510 extracts the object feature amounts of the respective frames of the attention content provided from the content selection unit 142, and provides the (time series of the) object feature amounts of the respective frames of the attention content to the object maximum likelihood state series estimation unit 511.

After that, it proceeds from step S340 to step S341. In step S341, the object maximum likelihood state series estimation unit 511 estimates the object maximum likelihood state series which is the state series where there is a state transition with a highest likelihood that the (time series) object feature amount of the attention content provided from the object feature amount extraction unit 510 is observed in the attention model provided from the object model selection unit 509.

Then, the object maximum likelihood state series estimation unit 511 provides the maximum likelihood state series of the attention model for the attention content to the frame extraction unit 504, and proceeds from step S341 to step S342.

In step S342, the frame extraction unit 504 sets "1" as an initial value of a variable t that counts time (i.e. the number of frames of the attention content), and proceeds to step S343.

In step S343, the frame extraction unit 504 determines whether the state ID of the state at time t (i.e. t-th state from the front end) of the image maximum likelihood state series, the audio maximum likelihood state series and the object maximum likelihood state series coincides with any one of the registration state IDs of the selection states registered in the attention scrapbook provided from the scrapbook selection unit 141.

Accordingly, if it is determined that the state ID of the state at time t of the image maximum likelihood state series, the audio maximum likelihood state series and the object maximum likelihood state series of the attention model for the attention content coincides with any one of the registration state IDs of the selection states registered in the attention scrapbook, it proceeds to step S344.

In step S344, the frame extraction unit 504 extracts the frame of time t from the attention contents from the content selection unit 142, provides the frame to the frame registration unit 505, and proceeds to step S345.

Also, in step S343, if it is determined that the state ID of the state at time t of the image maximum likelihood state series, the audio maximum likelihood state series and the object maximum likelihood state series of the attention model for the attention content does not coincide with any one of the registration state IDs of the selection states registered in the attention scrapbook, it proceeds to step S345. That, step S344 is skipped.

In step S345, the frame extraction unit 504 determines whether the variable t is equal to the total number $N_F$ of frames of the attention content.

In step S345, if it is determined that the variable t is equal to the total number $N_F$ of frames of the attention content, the frame extraction unit 504 proceeds to step S346, and increases the variable t by "1". After that, the process is returned from step S346 to step S343, and the same process is repeated.

Further, in step S345, if it is determined that the variable t is equal to the total number $N_F$ of frames of the attention content, it proceeds to step S347.

In step S347, the frame registration unit 505 registers frames provided from the frame extraction unit 504, i.e. all the frames extracted from the attention content, in the attention scrapbook provided from the scrapbook selection unit 141.

Then, after that, the process proceeds from the step S347 to step S348. In step S348, the content selection unit 142 determines whether there is any content that has not yet been selected as the attention content among the content of which the category stored in the content storage unit 11 is equal to the category corresponding to the attention scrapbook.

In step S348, if it is determined that there is the content that has not yet been selected as the attention content among the content of which the category stored in the content storage unit 11 is equal to the category corresponding to the attention scrapbook, the process is returned to Step S332.

Also, in step S348, if it is determined that there is no content that has not yet been selected as the attention content among the content of which the category stored in the content storage unit 11 is equal to the category corresponding to the attention scrapbook, the step goes to step S349.

In step S349, the frame registration unit 505 outputs the attention scrapbook to the registered scrapbook storage unit 374 as the registered scrapbook to terminate the registered scrapbook generation processing.

Figure 52:
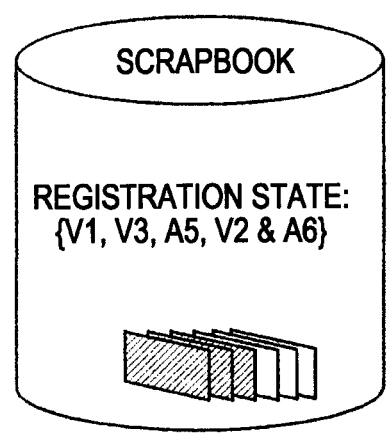
FIG. 52 is a diagram illustrating the registered scrapbook generation processing.

Referring to FIG. 52, the difference between the registered scrapbook generation processing that is performed by the registered scrapbook generation unit 373 and the scrapbook generation process that is performed only by using the image feature amount by the registered scrapbook generation unit 103 described with reference to FIGS. 28A to 28E will be described.

That is, in FIG. 28D, "1" and "3" are registered as the registered state IDs of the attention scrapbook, and respective frames having state IDs of "1" and "3" are extracted from the attention content.

As shown in FIG. 28E, the frame extracted from the attention content is registered in the scrapbook in the temporal before-after relation maintaining form, for example, a moving picture.

In this instance, in the case of using a feature amount other than the image feature amount, for example, as shown in FIG. 52, "V1", "V3", "A3", and "V2&A6" may be registered as the registration ID of the attention scrapbook. In this instance, since the stage ID based on the image feature amount is registered as "V1" and "V3", the state ID based on the audio feature amount is registered as "A5", and the state ID based on the audio feature amount is registered as "V2&A6", the corresponding frame is extracted.

Namely, since the frame is selected base on the state ID in view of the plural feature amounts, it is possible to obtain the scrapbook with corrected frames that have interest for a user, with high precision.

In this instance, in FIG. 52, although an example of using the state ID obtained by the image feature amount and the audio feature amount is shown, of course, the state ID containing the object feature amount may be further used.

In addition, although the example of using the image feature amount, the audio feature amount and the object feature amount is described, other feature amounts may be used solely or in combination thereof. Further, according to the kind of the objects, the object feature amount may be set and distinguishably used. For example, the whole shape, an upper body, and face image of a character may be used as individual object feature amount.

[Description of a Computer to which the Invention is Applied]

A series of the above-described process can be performed by hardware or performed by software. In the case of performing a series of the process by the software, a program constituting the software is installed in a general purpose computer.

Figure 53:
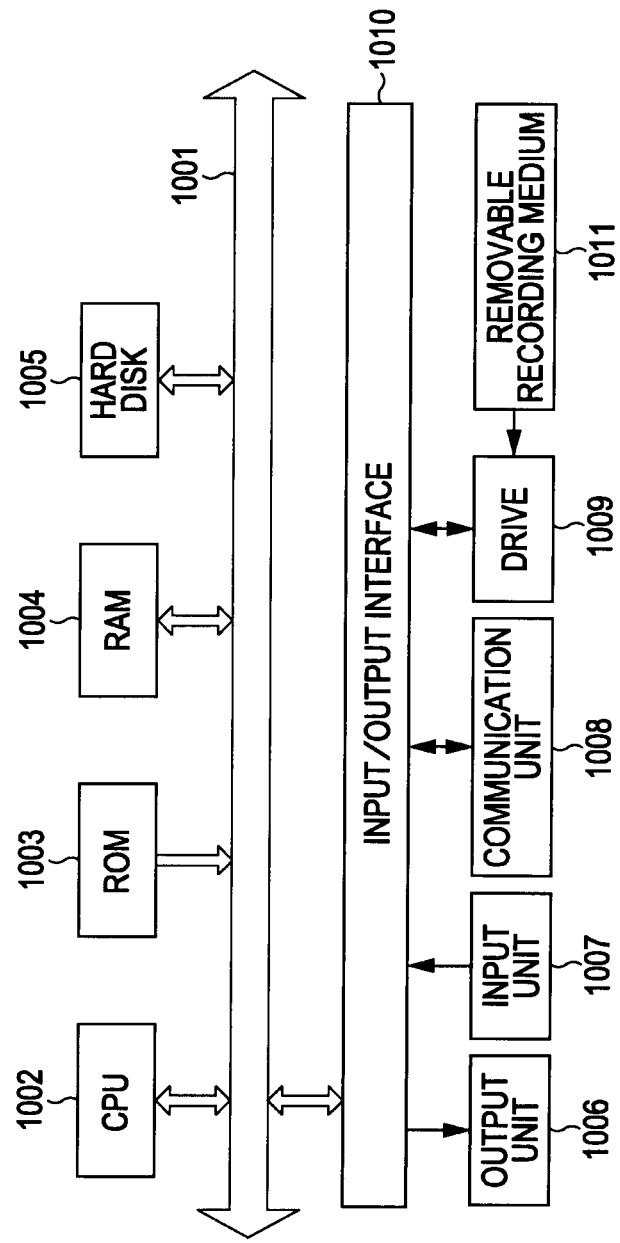
FIG. 53 is a block diagram illustrating a configuration example of a computer to which an embodiment of the present invention is applied according to an embodiment of the present invention.

FIG. 53 is a block diagram illustrating a configuration example of a computer according to an embodiment of the present invention, in which a program executing the series of process is installed.

The program can be previously recorded on a hard disc 1005 or an ROM 1003 which is built in the computer as a recording medium.

Alternatively, the program may be recorded in a removable recording medium 1011 mounted on a drive 1009. The removable recording medium 1011 may be provided as so-called package software. The removable recording medium 1011 includes a flexible disc, CD-ROM (Compact Disc Read Only Memory), MO (Magneto Optical) disc, DVD (Digital Versatile Disc), a magnetic disc, a semiconductor memory, and the like.

In this instance, the program is not only installed in the computer from the removable recording medium 1011, as described above, but also can be downloaded in the computer via a communication network or a broadcasting network to be installed in the hard disc 1005 built in the computer. That is, the program is transmitted to the computer in wireless via an artificial satellite for digital satellite broadcasting, or can be transmitted to the computer in cable via a network such as LAN (Local Area Network) or Internet.

The computer may be equipped with a CPU (Central Processing Unit) 1002, and the CPU 1002 is connected to an input/output interface 1010 via a bus 1001.

If the CPU 1002 is input with a command via the input/output interface 1010 by manipulating an input unit 1007 by a user, the program stored in the ROM (Read Only Memory) 1003 is executed. Alternatively, the CPU 1002 loads the program stored in the hard disc 1005 in an RAM (Random Access Memory) 1004 to execute the program.

In this way, the CPU 1002 performs the process according to the flowchart described above or the process by the configuration of the block diagram described above. The CPU 1002 outputs process result from an output 1006 via the input/output interface 1010, or transmits from a communication unit 1008 to be recorded on the hard disc 1005.

Also, the input 1007 includes a keyboard, a mouse, a microphone, and the like. The output 1006 includes an LCD (Liquid Crystal Display), a speaker, and the like.

In the specification, the process of the computer performed by the program is not necessarily carried out in time series according to the order set forth in the flowchart. That is, the process of the computer performed by the program includes parallel processing or independent processing (e.g. parallel processing or object processing).

Further, the program may be processed by single computer (process), or distribution processed by plural computers. In addition, the program may be transmitted to a remote computer so as to be executed.

The present application contains subject matter related to that disclosed in Japanese Priority Patent Application JP 2009-110292 filed in the Japan Patent Office on Apr. 30, 2009, and Japanese Priority Patent Application JP 2009-277055 filed in the Japan Patent Office on Dec. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   feature amount extraction means for extracting a feature amount of each frame of an image of attention detector learning content used to learn a content model that is used by a highlight detector to detect a scene that is of interest to a user as a highlight scene;
   maximum likelihood state series estimation means for estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content;
   highlight label generation means for generating a highlight label series that provides each frame of the attention detector learning content with a highlight label indicating whether the scene is the highlight scene according to a user's manipulation; and
   learning means for learning the content model that is the state transition probability model using the maximum likelihood state series obtained from the attention detector learning content and the highlight label series that indicates whether each frame of the attention detector learning content is the highlight scene according to the user's manipulation.

2. The information processing apparatus according to claim 1, further comprising:
   highlight detection means for extracting the feature amount of each frame of the image of the attention highlight detection content from which the highlight scene is detected,
   estimating the maximum likelihood state series which is the state series where the state transition having the highest likelihood occurs and from which the feature amount of the attention highlight detection content is observed in the content model,
   estimating maximum likelihood state series which is state series where there is a state transition with a highest likelihood that the maximum likelihood state series obtained from the attention highlight detection content and detection label series corresponding to the highlight label series of the highlight label that indicates whether the scene is the highlight scene are observed in the highlight detector, detecting a frame of the highlight scene from the attention highlight detection content on the basis of an observation probability of the highlight label of each state of highlight relation state series that is the maximum likelihood state series obtained from the detection label series, and generating digest content that is a digest of the attention highlight detection content using the frame of the highlight scene.

3. The information processing apparatus according to claim 2, wherein the highlight detection means detects the frame of the attention highlight detection content that corresponds to the state at a predetermined time if a difference between the observation probability of the highlight label indicating that the scene is the highlight scene and the observation probability of the highlight label indicating that the scene is not the highlight scene is larger than a predetermined threshold value in a state at the predetermined time of the highlight relation state series.

4. The information processing apparatus according to claim 1, further comprising:

scrapbook generation means for extracting the feature amounts of the respective frames of the image of the content, estimating the maximum likelihood state series which is the state series where the state transition having the highest likelihood occurs and from which the feature amount of the content is observed in the content model, extracting the frames corresponding to the state that coincides with the state indicated by a user among states of the maximum likelihood state series, and registering the frames extracted from the content in the scrapbook in which the highlight scene is registered.

5. The information processing apparatus according to claim 1, further comprising:

inter-state distance calculation means for obtaining an inter-state distance between one state and another state of the content model on the basis of a state transition probability from one state to another state;

coordinate calculation means for obtaining state coordinates that are coordinates of a position of the state on the model map so as to decrease an error between an Euclid distance from one state to another state on a model map that is a two-dimensional (2D) or three-dimensional (3D) map on which states of the content model are arranged and the inter-state distance; and display control means for performing display control to display the model map on which the states are arranged in the positions of the state coordinates.

6. The information processing apparatus according to claim 5, wherein the coordinate calculation means obtains the state coordinates so as to minimize an error function of a Sammon map that is in proportion to a statistical error between the Euclid distance and the inter-state distance, and performs a calculation of the error function by making the Euclid distance from one state to another state equal to the inter-state distance from one state to another state if the Euclid distance is larger than a predetermined threshold value.

7. The information processing apparatus according to claim 5, further comprising:

scrapbook generation means for extracting the feature amounts of the respective frames of the image of the content, estimating the maximum likelihood state series which is the state series where there is a state transition with a highest likelihood that the feature amount of the content is observed in the content model, extracting the frames corresponding to the state that coincides with the state of the model map indicated by a user among the states of the maximum likelihood state series, and registering the frames extracted from the content in the scrapbook for registering the highlight scenes.

8. The information processing apparatus according to claim 1, wherein the feature amount of the frame is obtained by dividing the frame into a plurality of sub regions that are small regions, extracting the respective feature amounts of the plurality of sub regions, and combining the respective feature amounts of the plurality of sub regions.

9. The information processing apparatus according to claim 1, wherein the feature amount of the frame is obtained by combining audio energy, zero cross energy, or an average value in the spectrum center, and dispersion within a predetermined time that corresponds to the frame.

10. The information processing apparatus according to claim 1, wherein the feature amount of the frame is obtained by detecting a display region of an object in the frame, dividing the frame into a plurality of sub regions that are small regions, extracting a ratio of the number of pixels in the display region of the object in the sub region to the number of pixels in the plurality of sub regions as the feature amount, and combining the respective feature amounts of the plurality of sub regions.

11. The information processing apparatus according to claim 1, further comprising:

content model learning means for generating the content model by performing the learning of the state transition probability model using the feature amount of the learning content.

12. An information processing method comprising the steps of:

extracting a feature amount of each frame of an image of an attention detector learning content used to learn a content model that is used by a highlight detector to detect a scene that is of interest to a user as a highlight scene;

estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content;

generating a highlight label series that provides each frame of the attention detector learning content with a highlight label indicating whether the scene is the highlight scene according to a user's manipulation; and learning the content model that is the state transition probability model using the maximum likelihood state series obtained from the attention detector learning content and the highlight label series that indicates whether each frame of the attention detector learning content is the highlight scene according to the user's manipulation.

13. A non-transitory, computer-readable storage medium storing a computer program that, when executed by a computer, causes the computer to perform an information processing method, the method comprising:

extracting a feature amount of each frame of an image of attention detector learning content used to learn a content model that is used by a highlight detector to detect a scene that is of interest to a user as a highlight scene;

estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content;

generating a highlight label series that provides each frame of the attention detector learning content with a highlight label indicating whether the scene is the highlight scene according to a user's manipulation; and learning the content model that is the state transition probability model using the maximum likelihood state series obtained from the attention detector learning content and the highlight label series that indicates whether each frame of the attention detector learning content is the highlight scene according to the user's manipulations.

14. An information processing apparatus comprising:
acquisition means for:
acquiring a highlight detector obtained by extracting a feature amount of each frame of an image of attention detector learning content used to learn a content model that is used by the highlight detector to detect a scene that is of interest to a user as a highlight scene, estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content;

generating a highlight label series that provides each frame of the attention detector learning content with a highlight label indicating whether the scene is the highlight scene according to a user's manipulation, and learning the content model that is the state transition probability model using the maximum likelihood state series obtained from the attention detector learning content and the highlight label series that indicates whether each frame of the attention detector learning content is the highlight scene according to the user's manipulation;

feature amount extraction means for extracting a feature amount of each frame of an image of attention highlight detection content which is content from which the highlight scene is detected;

first maximum likelihood state series estimation means for estimating a first maximum likelihood state series which is state series where there is a state transition with a highest likelihood that the feature amount of the attention highlight detection content is observed in the content model;

second maximum likelihood state series estimation means for estimating a second maximum likelihood state series which is state series where there is a state transition with a highest likelihood that the maximum likelihood state series obtained from the attention highlight detection content and detection label series corresponding to the highlight label series of the highlight label that indicates whether the scene is the highlight scene are observed in the highlight detector;

highlight scene detection means for detecting a frame of the highlight scene from the attention highlight detection contents on the basis of an observation probability of the highlight label of each state of highlight relation state series that is the maximum likelihood state series obtained from the detection label series; and digest content generation means for generating digest content that is a digest of the attention highlight detection content using the frame of the highlight scene.

15. The information processing apparatus according to claim 14,
wherein the highlight scene detection means detects the frame of the attention highlight detection content that corresponds to the state at a predetermined time if a difference between the observation probability of the highlight label indicating that the scene is the highlight scene and the observation probability of the highlight label indicating that the scene is not the highlight scene is larger than a predetermined threshold value in a state at the predetermined time of the highlight relation state series.

16. The information processing apparatus according to claim 14,
wherein the feature amount of the frame is obtained by combining audio energy, zero cross energy, or an average value in the spectrum center, and dispersion within a predetermined time that corresponds to the frame.

17. An information processing method comprising the steps of:
acquiring a highlight detector by:
extracting a feature amount of each frame of an image of attention detector learning content used to learn a content model that is used by the highlight detector to detect a scene that is of interest to a user as a highlight scene, estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content, generating a highlight label series that provides each frame of the attention detector learning content with a highlight label indicating whether the scene is the highlight scene according to a user's manipulation, and learning the content model that is the state transition probability model using the maximum likelihood state series obtained from the attention detector learning content and the highlight label series that indicates whether each frame of the attention detector learning content is the highlight scene according to the user's manipulation;

extracting a feature amount of each frame of an image of attention highlight detection content from which the highlight scene is detected;

estimating a first maximum likelihood state series which is state series where there is a state transition with a highest likelihood that the feature amount of the attention highlight detection content is observed in the content model;

estimating a second maximum likelihood state series which is state series where there is a state transition with a highest likelihood that the maximum likelihood state series obtained from the attention highlight detection content and detection label series corresponding to the highlight label series of the highlight label that indicates whether the scene is the highlight scene are observed in the highlight detector;

detecting a frame of the highlight scene from the attention highlight detection contents on the basis of an observation probability of the highlight label of each state of highlight relation state series that is the maximum likelihood state series obtained from the detection label series; and generating digest content that is a digest of the attention highlight detection content using the frame of the highlight scene.

18. A non-transitory, computer-readable storage medium storing a computer program that, when executed by a computer, causes the computer to perform an information processing method, the method comprising:

acquiring a highlight detector by:
extracting a feature amount of each frame of an image of an attention detector learning content used to learn a content model that is used by the highlight detector to detect a scene that is of interest to a user as a highlight scene, estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content, generating a highlight label series that provides each frame of the attention detector learning content with a highlight label indicating whether the scene is the highlight scene according to a user's manipulation, and learning the content model that is the state transition probability model using the maximum likelihood state series obtained from the attention detector learning content and the highlight label series that indicates whether each frame of the attention detector learning content is the highlight scene according to the user's manipulation;

extracting a feature amount of each frame of an image of attention highlight detection content from which the highlight scene is detected;

estimating a first maximum likelihood state series which is state series where there is a state transition with a highest likelihood that the feature amount of the attention highlight detection content is observed in the content model;

estimating a second maximum likelihood state series which is state series where there is a state transition with a highest likelihood that the maximum likelihood state series obtained from the attention highlight detection content and detection label series corresponding to the highlight label series of the highlight label that indicates whether the scene is the highlight scene are observed in the highlight detector;

detecting a frame of the highlight scene from the attention highlight detection contents on the basis of an observation probability of the highlight label of each state of highlight relation state series that is the maximum likelihood state series obtained from the detection label series; and generating digest content that is a digest of the attention highlight detection content using the frame of the highlight scene.

19. An information processing apparatus comprising:
a feature amount extraction unit for extracting a feature amount of each frame of an image of attention detector learning content used to learn a content model that is used by a highlight detector to detect a scene that is of interest to a user as a highlight scene;

a maximum likelihood state series estimation unit for estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content;

a highlight label generation unit for generating a highlight label series that provides each frame of the attention detector learning content with a highlight label indicating whether the scene is the highlight scene according to a user's manipulation; and a learning unit for learning the content model that is the state transition probability model using the maximum likelihood state series obtained from the attention detector learning content and the highlight label series that indicates whether each frame of the attention detector learning content is the highlight scene according to the user's manipulation.

20. An information processing apparatus comprising:
an acquisition unit for acquiring a highlight detector by:
extracting a feature amount of each frame of an image of attention detector learning content used to learn a content model that is used by the highlight detector to detect a scene that is of interest to a user as a highlight scene, estimating a maximum likelihood state series where there is a state transition with a highest likelihood that the feature amount of the attention detector learning content is observed in the content model that is a state transition probability model prescribed as an observation probability of observing a predetermined observed value from the state and obtained by extracting and learning a state transition probability and a feature amount of each frame of an image of learning content, generating a highlight label series that provides each frame of the attention detector learning content with a highlight label indicating whether the scene is the highlight scene according to a user's manipulation, and learning the content model that is the state transition probability model using the maximum likelihood state series obtained from the attention detector learning content and the highlight label series that indicates whether each frame of the attention detector learning content is the highlight scene according to the user's manipulation;

a feature amount extraction unit for extracting a feature amount of each frame of an image of attention highlight detection content which is content from which the highlight scene is detected;

a first maximum likelihood state series estimation unit for estimating a first maximum likelihood state series which is state series where there is a state transition with a highest likelihood that the feature amount of the attention highlight detection content is observed in the content model;

a second maximum likelihood state series estimation unit for estimating a second maximum likelihood state series which is state series where there is a state transition with a highest likelihood that the maximum likelihood state series obtained from the attention highlight detection content and detection label series corresponding to the highlight label series of the highlight label that indicates whether the scene is the highlight scene are observed in the highlight detector;

a highlight scene detection unit for detecting a frame of the highlight scene from the attention highlight detection contents on the basis of an observation probability of the highlight label of each state of highlight relation state series that is the maximum likelihood state series obtained from the detection label series; and a digest content generation unit for generating digest content that is a digest of the attention highlight detection content using the frame of the highlight scene.

* * * * *